INVENTOR
C. W. ZEBE
BY
SE Hollander
ATTORNEY

SWITCH A

April 29, 1969 C. W. ZEBE 3,441,680

TELEPHONE LINE CONCENTRATOR SIGNALING SYSTEM

Filed Oct. 22, 1965 Sheet 5 of 62

April 29, 1969 C. W. ZEBE 3,441,680

TELEPHONE LINE CONCENTRATOR SIGNALING SYSTEM

Filed Oct. 22, 1965 Sheet 6 of 62

April 29, 1969 C. W. ZEBE 3,441,680

TELEPHONE LINE CONCENTRATOR SIGNALING SYSTEM

Filed Oct. 22, 1965 Sheet 7 of 62

SEQUENCE CONTROL

April 29, 1969 C. W. ZEBE 3,441,680

TELEPHONE LINE CONCENTRATOR SIGNALING SYSTEM

Filed Oct. 22, 1965 Sheet 11 of 62

April 29, 1969 C. W. ZEBE 3,441,680

TELEPHONE LINE CONCENTRATOR SIGNALING SYSTEM

Filed Oct. 22, 1965 Sheet 13 of 62

RECEIVE CIRCUIT

April 29, 1969 C. W. ZEBE 3,441,680

TELEPHONE LINE CONCENTRATOR SIGNALING SYSTEM

Filed Oct. 22, 1965 Sheet 22 of 62

April 29, 1969 C. W. ZEBE 3,441,680

TELEPHONE LINE CONCENTRATOR SIGNALING SYSTEM

Filed Oct. 22, 1965 Sheet 23 of 62

April 29, 1969 C. W. ZEBE 3,441,680

TELEPHONE LINE CONCENTRATOR SIGNALING SYSTEM

Filed Oct. 22, 1965 Sheet 24 of 62

FIG. 30 CALL PREFERENCE CIRCUIT

CLOCK AND CLOCK CONTROL

TRUNK PREFERENCE

April 29, 1969 C. W. ZEBE 3,441,680

TELEPHONE LINE CONCENTRATOR SIGNALING SYSTEM

Filed Oct. 22, 1965

Sheet 45 of 62

FIG. 48

| | | | | | | | | | | | |
|---|---|---|---|---|---|---|---|---|---|---|---|
| FIG. 2 | FIG. 6 | FIG. 10 | FIG. 14 | FIG. 18 | FIG. 22 | FIG. 26 | FIG. 30 | FIG. 34 | FIG. 37 | FIG. 41 | FIG. 45 |
| FIG. 3 | FIG. 7 | FIG. 11 | FIG. 15 | FIG. 19 | FIG. 23 | FIG. 27 | FIG. 31 | FIG. 35 | FIG. 38 | FIG. 42 | FIG. 46 |
| FIG. 4 | FIG. 8 | FIG. 12 | FIG. 16 | FIG. 20 | FIG. 24 | FIG. 28 | FIG. 32 | FIG. 36 | FIG. 39 | FIG. 43 | FIG. 65 |
| FIG. 5 | FIG. 9 | FIG. 13 | FIG. 17 | FIG. 21 | FIG. 25 | FIG. 29 | FIG. 33 | | FIG. 40 | FIG. 44 | FIG. 47 |

ONE INPUT OR NOT GATE (INVERTER)

TWO INPUT OR NOT GATE

MULTI-INPUT OR NOT GATE

April 29, 1969 C. W. ZEBE 3,441,680

TELEPHONE LINE CONCENTRATOR SIGNALING SYSTEM

Filed Oct. 22, 1965 Sheet 58 of 62

April 29, 1969 C. W. ZEBE 3,441,680

TELEPHONE LINE CONCENTRATOR SIGNALING SYSTEM

Filed Oct. 22, 1965 Sheet 62 of 62

United States Patent Office 3,441,680
Patented Apr. 29, 1969

3,441,680
TELEPHONE LINE CONCENTRATOR SIGNALING SYSTEM

Charles W. Zebe, New Shrewsbury, N.J., assignor to Bell Telephone Laboratories, Incorporated, New York, N.Y., a corporation of New York Filed Oct. 22, 1965, Ser. No. 500,972
Int. Cl. H04m 3/20; H04q 3/66
U.S. Cl. 179—18 19 Claims

ABSTRACT OF THE DISCLOSURE

A priority preempt telephone line concentrator system is disclosed having a plurality of priority orders. A line concentrator is located distant from a central office but contiguous to the substations of the system. Initiation of a normal service request seizes a speech trunk from the remote line concentrator to the distant central office. Signals transmitted over the seized trunk operate a relay at the central office which identifies the initiating line. Under an all-speech-trunks-busy condition, it is still possible to initiate a priority call. Operation of a key at a substation, corresponding to the order of priority of the call being initiated, causes signals to be transmitted to the central office over a control trunk. These signals cause additional relays at the central office to operate, which identify not only the initiating line but also the priority of the call being initiated. A line having a call in progress of the lowest priority below that of the initiated call will then be selected. Tone signals will be applied to the line, the line will be "bumped" and the call disconnected, and the higher priority call will then be completed over the now idle line.

This invention relates to telephone line concentrator systems and more particularly to telephone concentrator systems having priority preempt arrangements for use in extending a connection by a calling line although an all-trunks-busy condition exists.

Telephone line concentrators have been employed extensively to couple a relatively larger number of substation lines over a smaller number of trunks to a telephone central office. Advantageously, the concentrator is disposed in an area remote from the office but contiguous to the center of substation density and affords a vehicle for reducing outside plant costs by precluding the necessity for coupling each line to the telephone central office over a separate pair of conductors. Instead, the substations which are terminated at the remote concentrator unit share the trunks which extend from the remote unit to the central office. Traffic requirements, of course, dictate the ratio of concentration of lines to trunks in order to effect an acceptable quality of service during the peak load periods.

Nevertheless, the number of lines connected to a concentrator is significantly higher than the number of trunks coupled to the office and, in consequence, it is possible for an all-trunks-busy condition to exit although ample common equipment remains available in the office to service any call which was extended thereto. The disadvantage of such a situation is manifest since it is conceivable that a concentrator may be fully loaded (i.e., have an all-trunks-busy condition) at a time when additional subscribers coupled to the concentrator are attempting to extend a connection.

While this situation is distressing under ordinary circumstances to a would-be calling customer, the difficulty is enhanced in the case of urgent calls for medical service or emergency calls which relate to fire or police matters. As an illustration, it is conceivable that in a widespread disaster situation due to flood, bombing, etc., a large number of calls may be generated thereby overloading the concentrator facilities and preventing the extension of official calls by civil or military authorities.

It is therefore an object of this invention to provide a concentrator system including facilities for extending emergency or priority calls through a concentrator although all of the concentrator trunks are occupied.

Still another object of this invention is to provide for the extension of a calling connection over a concentrator trunk in accordance with a priority preempt arrangement although an all-trunks-busy condition exists.

Still another object of this invention is to provide for the extension of a connection through a line concentrator during an all-trunks-busy condition under control of a priority calling substation.

Although it is highly desirable to insure the availability of channels to a telephone central office over a telephone line concentrator in order to transmit emergency messages, it may be seen that gross preemption arrangements which arbitrarily permit the caller to abruptly and prematurely terminate an existing conversation connection may lead to substantial difficulty. For example, if during the course of a natural disaster, such as a hurricane, a call is effected, by officials in the city which has suffered the disaster, specifying relief requirements, such as medicine, food, etc., it would be in the nature of a handicap to permit a call of such moment to be preempted by a "priority" call which relates to matters respecting the reestablishment of such ancillary municipal services, for example, those connected with the municipal transit services. It is apparent that the latter, since it is connected with the restoration of facilities after the disastrous event has subsided, may properly await those more immediate functions which must be discharged by the authorities to relieve the current situaiton including the dispatch of necessary medical supplies as described above.

It would seem apparent, therefore, that the opportunity for an indiscriminate preemption may be partially self-defeative if it permits the "bumping" of a relatively high priority call by a relatively lower priority call.

It is therefore a further object of this invention to provide for the extension of a calling connection through a line concentrator, although all trunks are busy, by priority calling substations in accordance with the relative priority accorded to those stations.

Since the condition which prevents the extension of additional calls is the fact that all of the trunks are busy serving other calls, the problem of communicating to the central office the origination of a priority call which must be served is a formidable one. Obviously, since all of the speech trunks, by definition, are occupied, the only channel which remains available for delivering information representative of the identification of the calling priority substation and the degree of priority which such substation is accorded is the control channel. It is apparent, however, that the facilities at each remote unit for translating and recording the advent of a priority call would ordinarily require complex and expensive equipment. These disadvantages are intensified in view of the curtailed space availability at the remote unit of the concentrator which latter is sometimes pole mounted or enclosed in an underground vault.

It is therefore an additional object of this invention to provide for the transmission to the telephone office of information indicative of the initiation of a priority call together with the relative degree of priority of the call.

Still another object of this invention is to simulate to the central office receiving equipment, information for priority line identification which is similar to that for conventional line identification.

These and other objects and features of the invention are achieved in a specific illustrative embodiment in which forty telephone substations are terminated at a remote concentrator unit and extended over twenty trunks to a telephone central office. Each of the substations has an individual line relay at the remote unit associated therewith which is responsive to an off-hook condition at the respective substation. Operation of the line relay results in a translation into a code identification which is delivered by solid-state signaling equipment to the telephone central office.

In addition to the line relays adverted to above, a separate group of "theoretical" line relays are utilized to generate information respecting calling line identification on priority calls together with the relative degree of priority for the call. The latter theoretical relays are not provided with individual physical speech conductors which extend to substations. Instead, they are connected to control conductors associated with the physical lines and are energized by buttons or keys at the substations.

Illustratively, when substation 00 initiates a priority call, the calling customer may depress one of a number of keys indicative of the relative priority of the call. Depression of the key results in the actuation of a particular theoretical line relay associated with the key. In response to the operation of the theoretical relay, the translator equipment at the remote unit and the signaling equipment respond in a manner similar to that described above for a conventional line calling condition. Thus, a particular line identification is transmitted to the central office which converts this information into signals representative of the calling priority line as well as the degree of priority of the call.

Thereafter, the concentrator trunks are examined. If upon examination of the trunks it is determined that an all-trunks-busy condition exists, a check is made to determine if any of the existing calls is of a lower grade of priority than the call being initiated and, if so, the trunk servicing the lower priority call is selected and the sleeve conductor thereof opened at the central office to simulate a disconnect condition thereby arbitrarily "dumping" the lower priority connection. Prior thereto, however, a distinctive warning tone may optionally be delivered over the trunk to the parties engaged in conversation thereon to warn them of the impending involuntary termination of the connection.

Following simulated disconnect operation, the trunk is now freed for the priority call under consideration. In consequence, the central office thereafter extends a terminating connection over the selected trunk to the calling substation which initiated the priority call. The calling line is thereupon connected to a dial pulse register in the central office and the connection may be completed in a conventional manner.

These and other objects and features of the invention may be more readily understood from an examination of the following specification, appended claims and attached drawing in which:

FIGS. 1A and 1B, respectively, disclose in outline form the remote portion and central office portion of a concentrator system in accordance with the present invention;

FIG. 2 shows a portion of the 6-wire crossbar switch at the remote unit;

Figure 3:
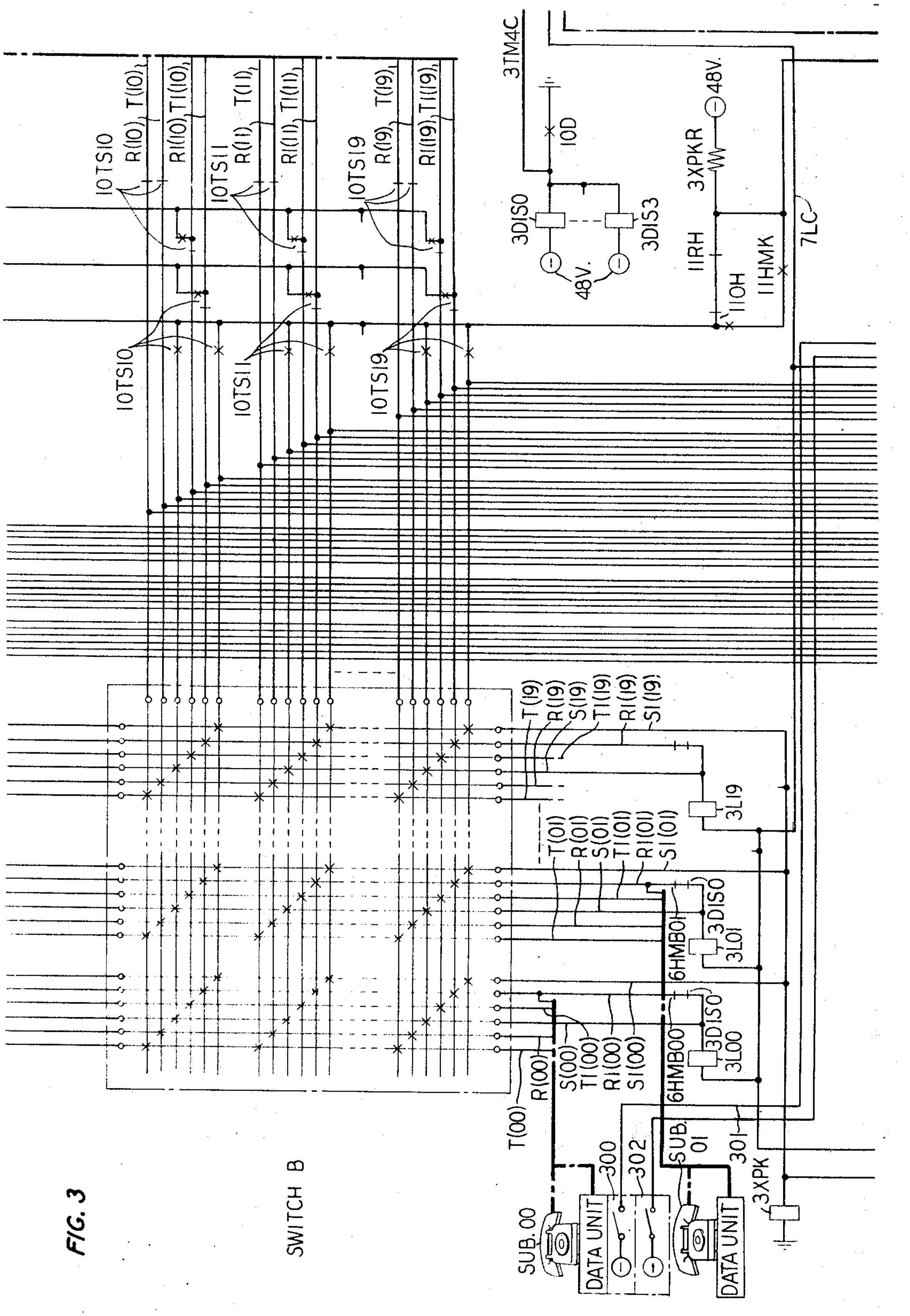
Figure 4:
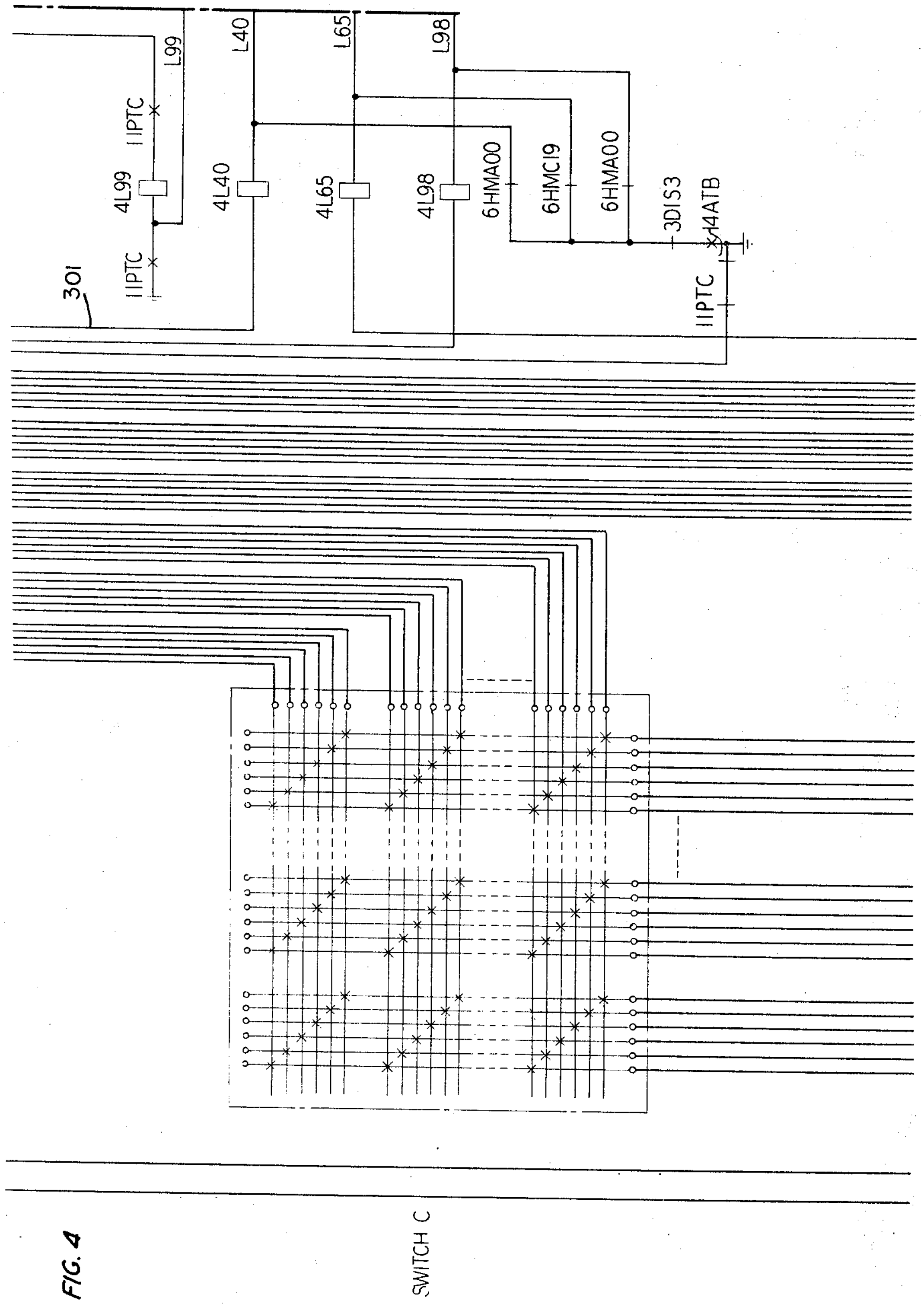
Figure 5:
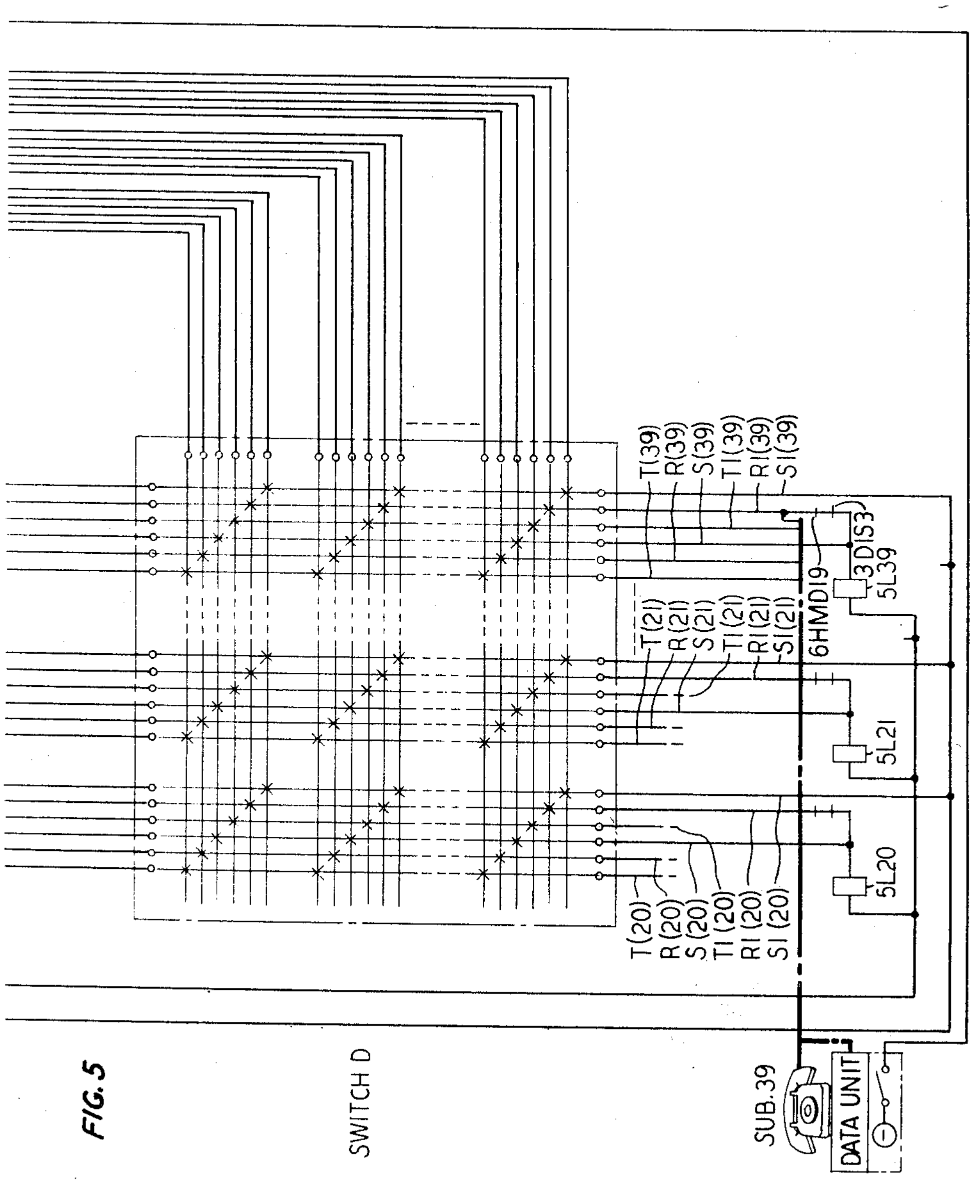
Figure 6:
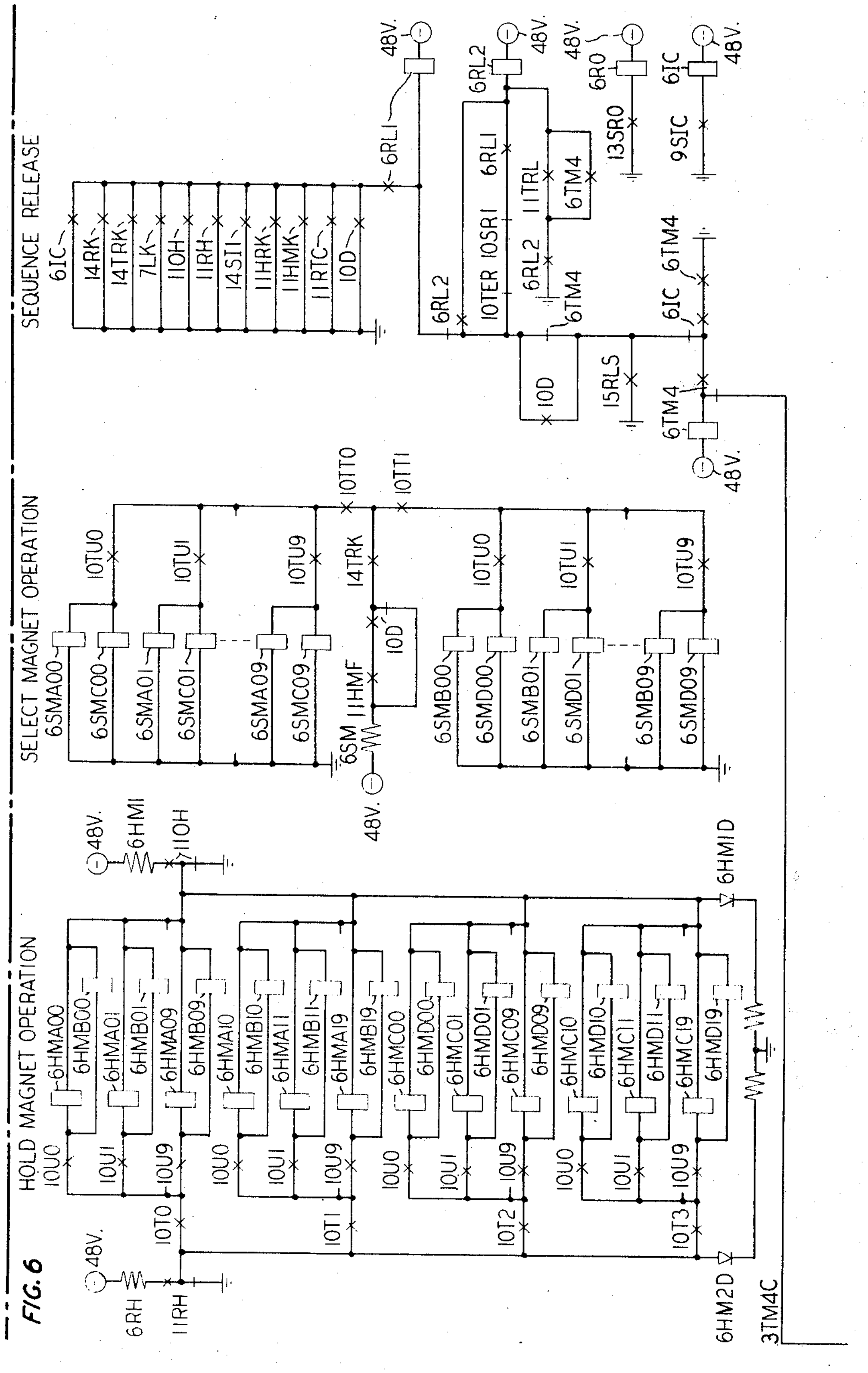
Figure 7:
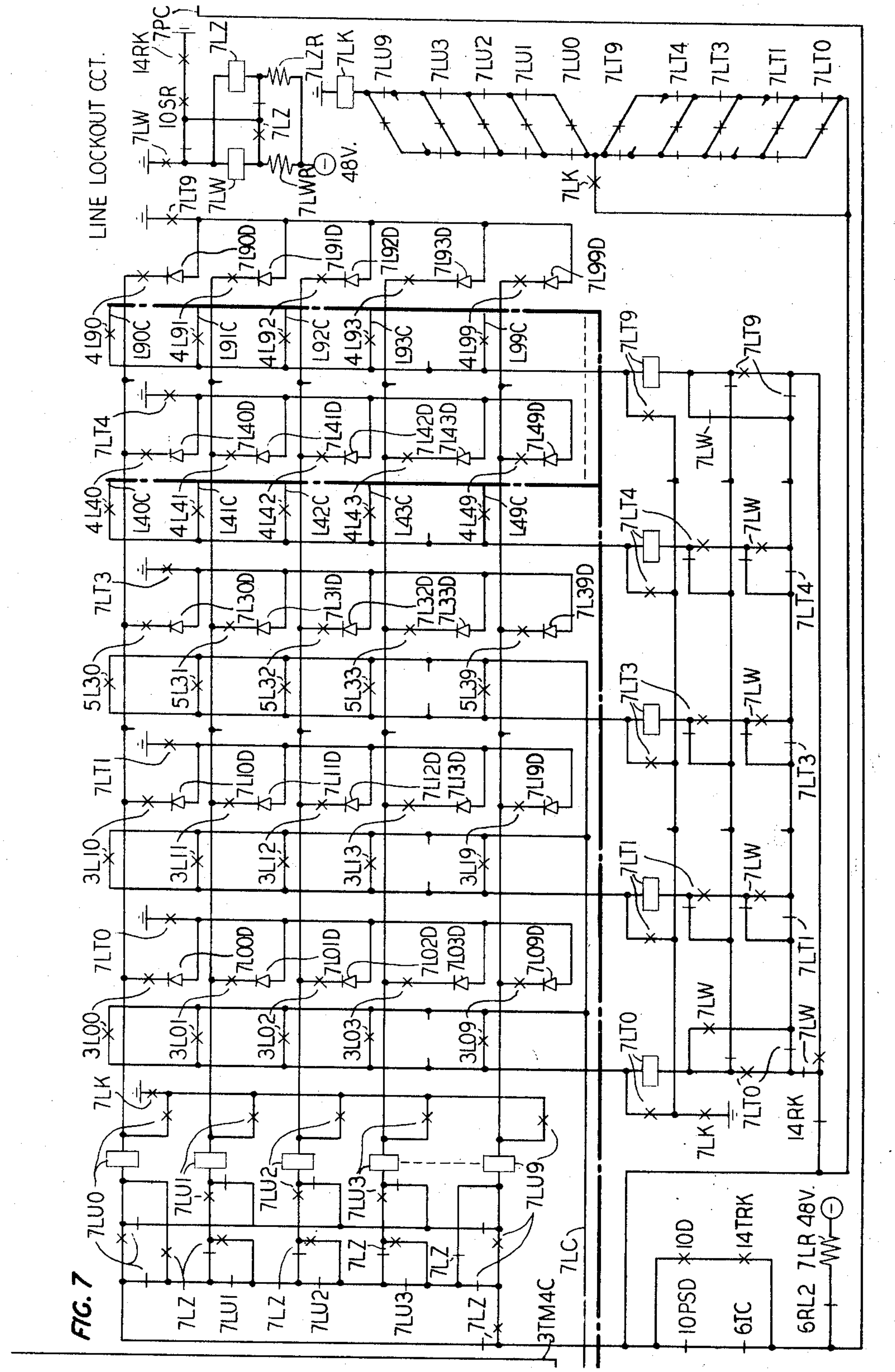
Figure 8:
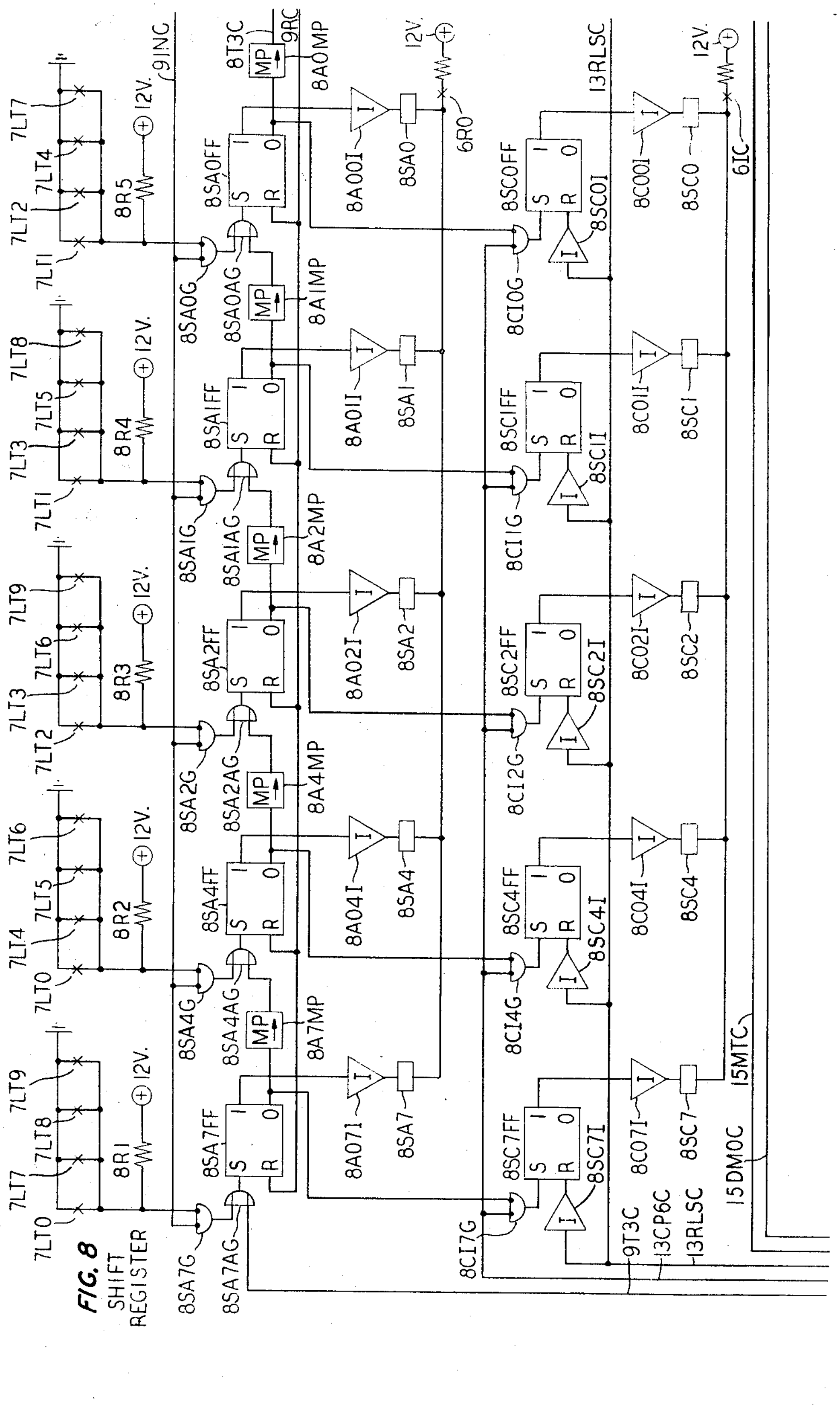
Figure 9:
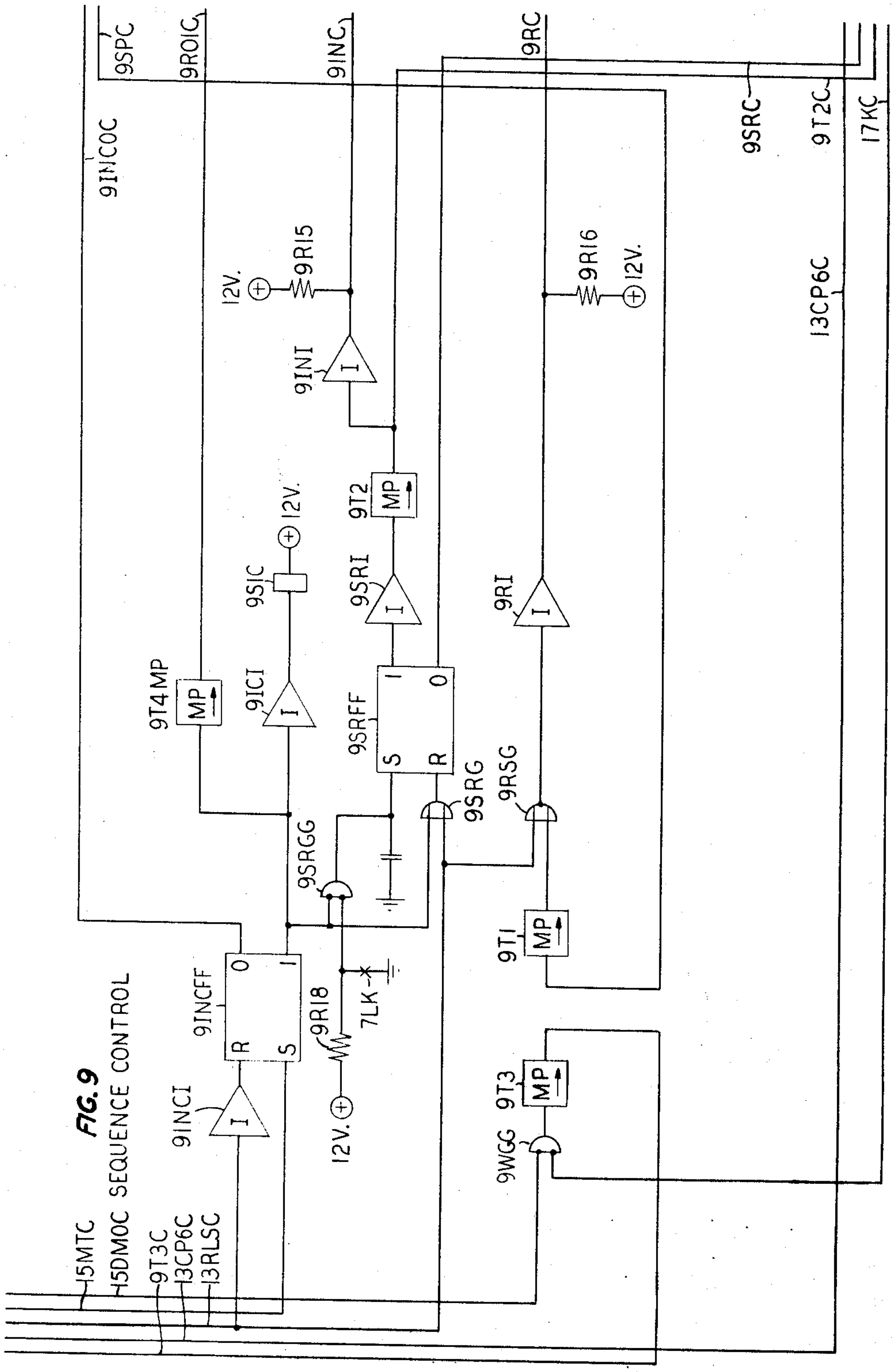
Figure 10:
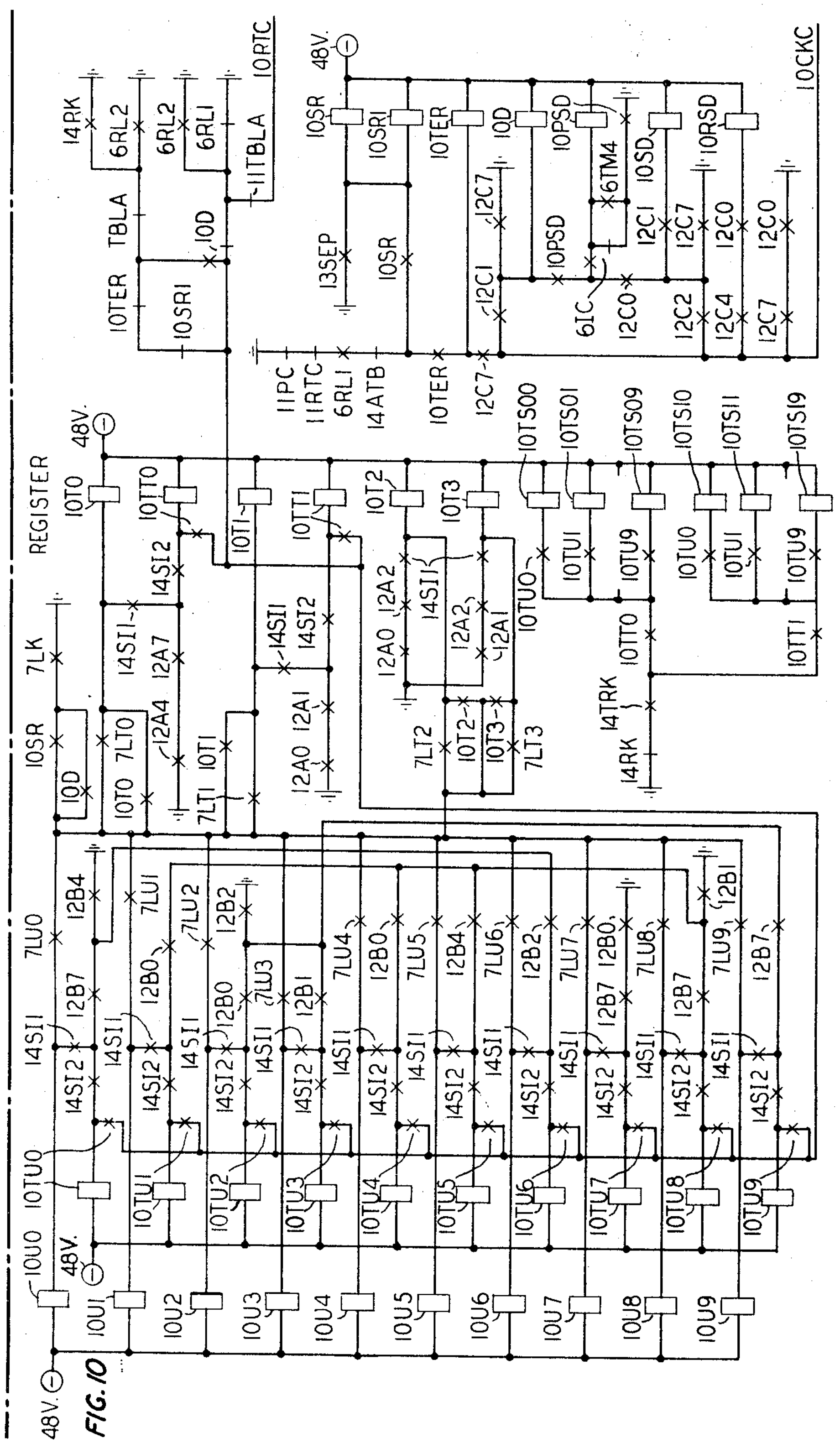
Figure 11:
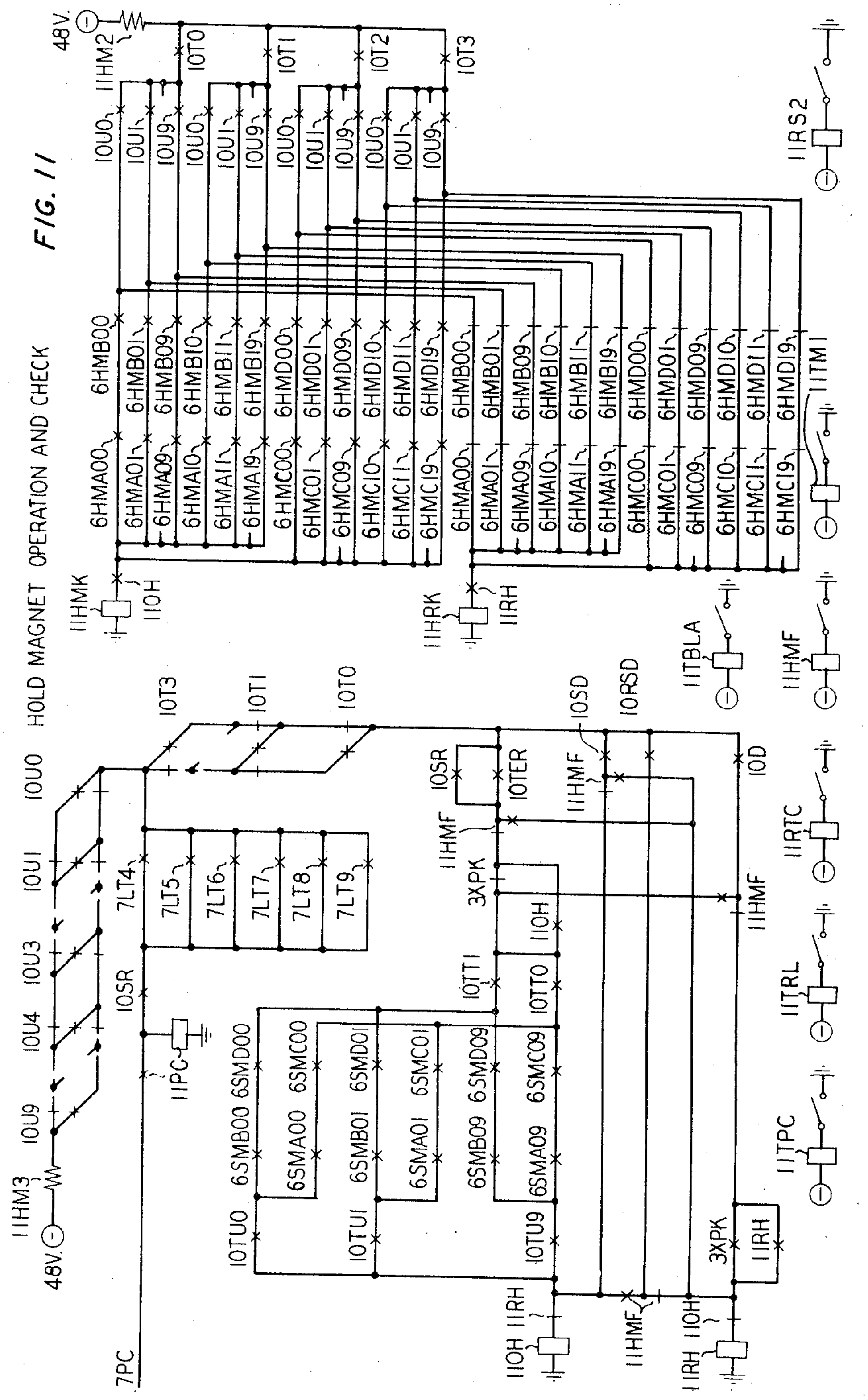
Figure 12:
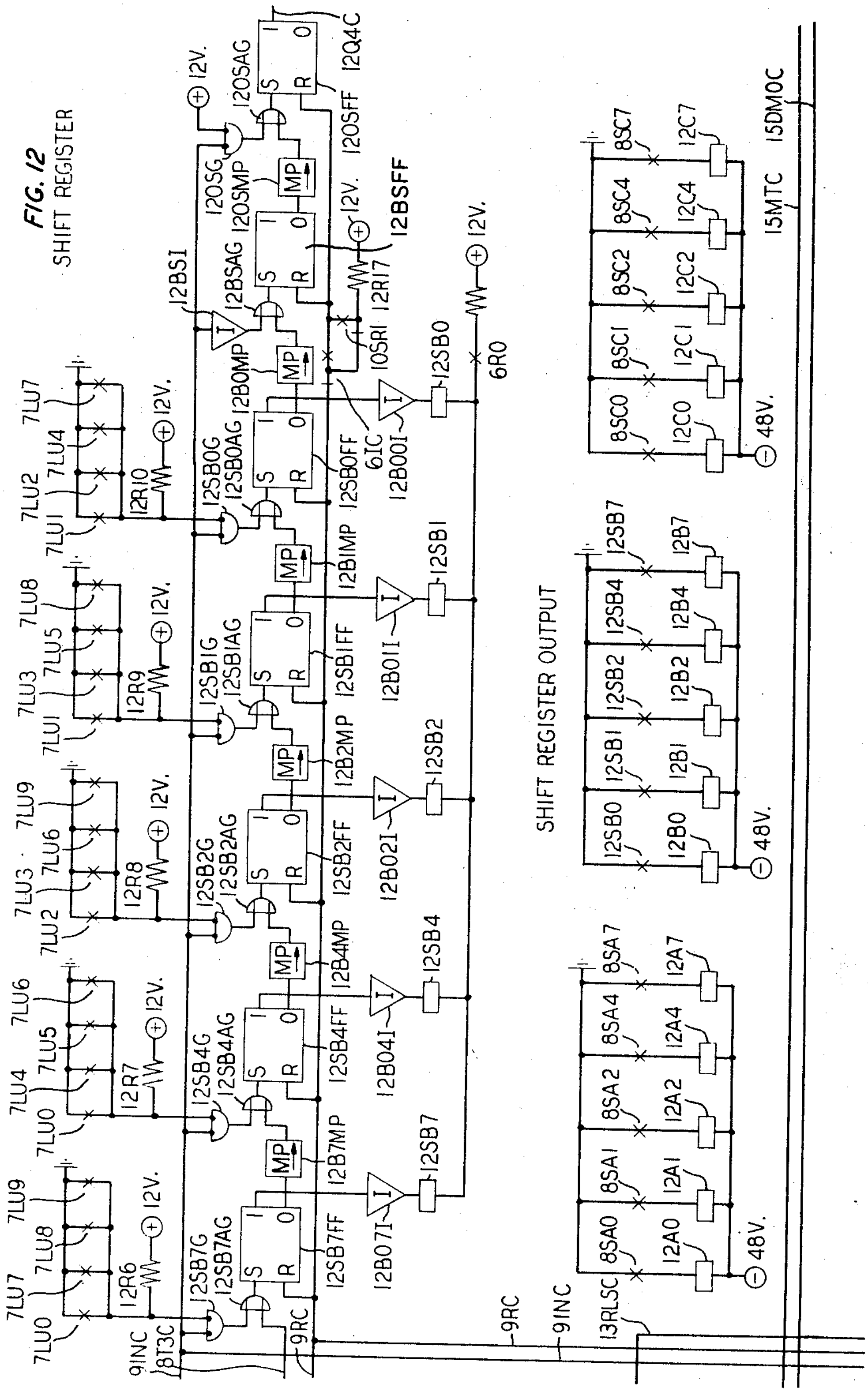
Figure 13:
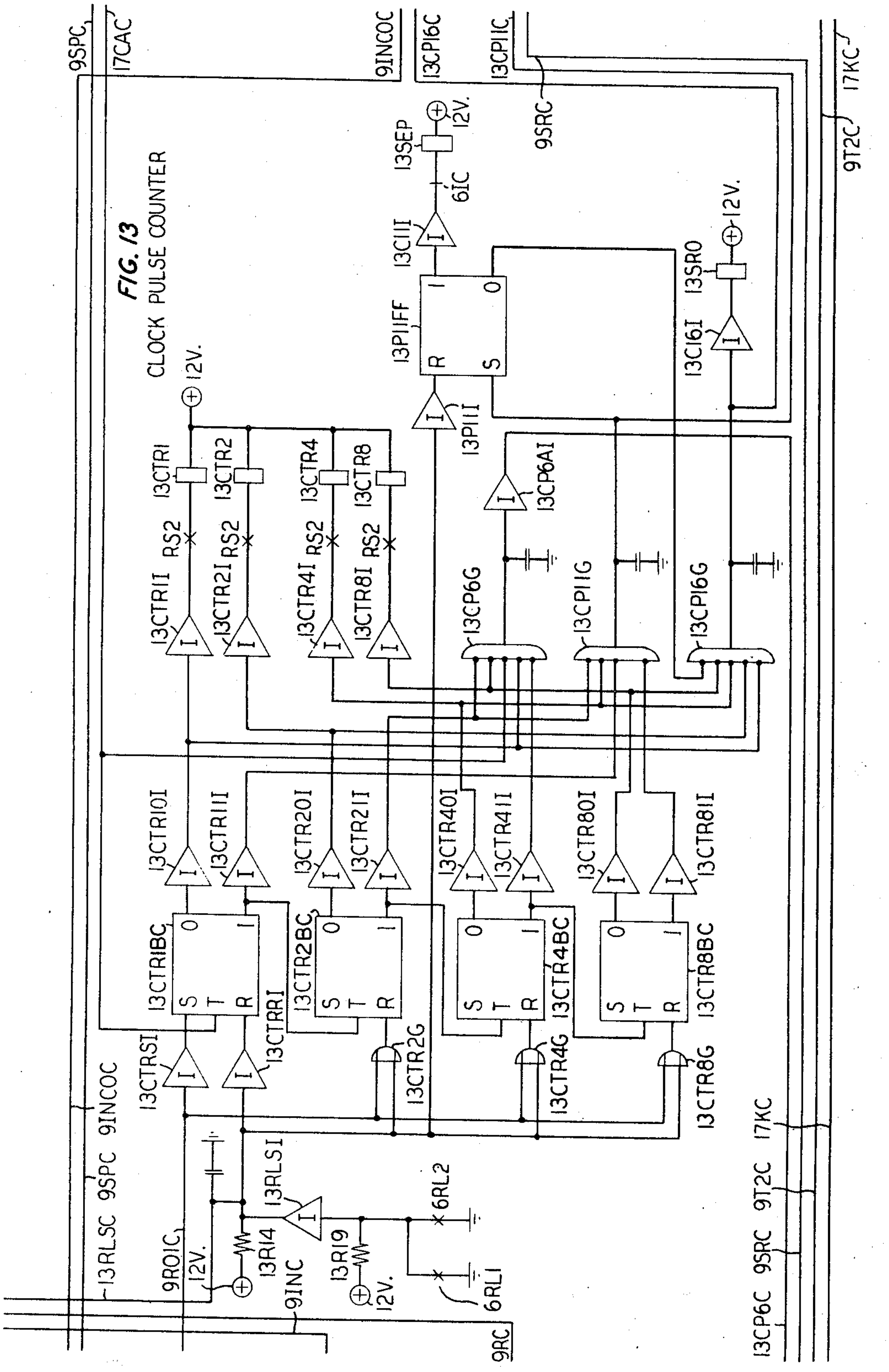
Figure 14:
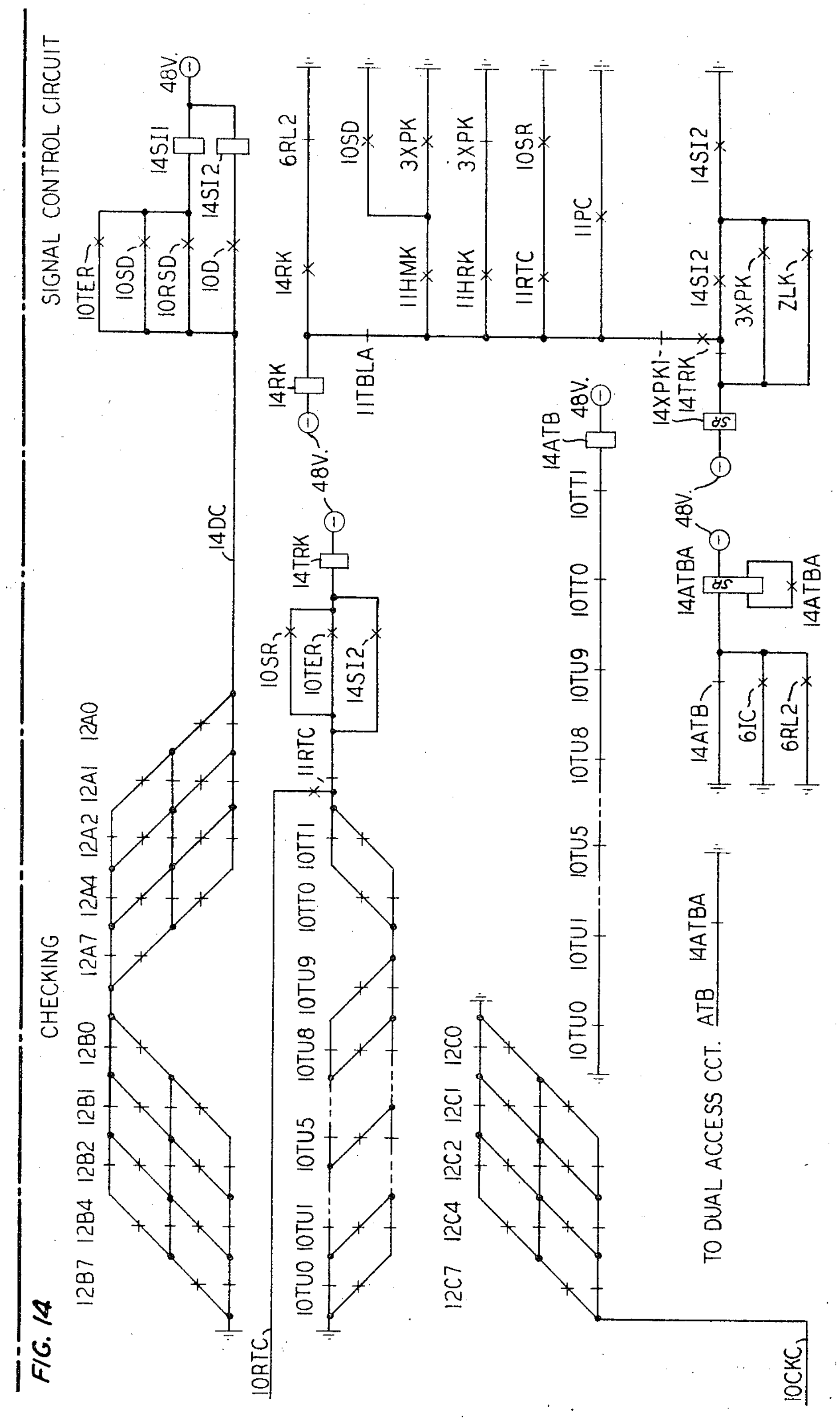
Figure 15:
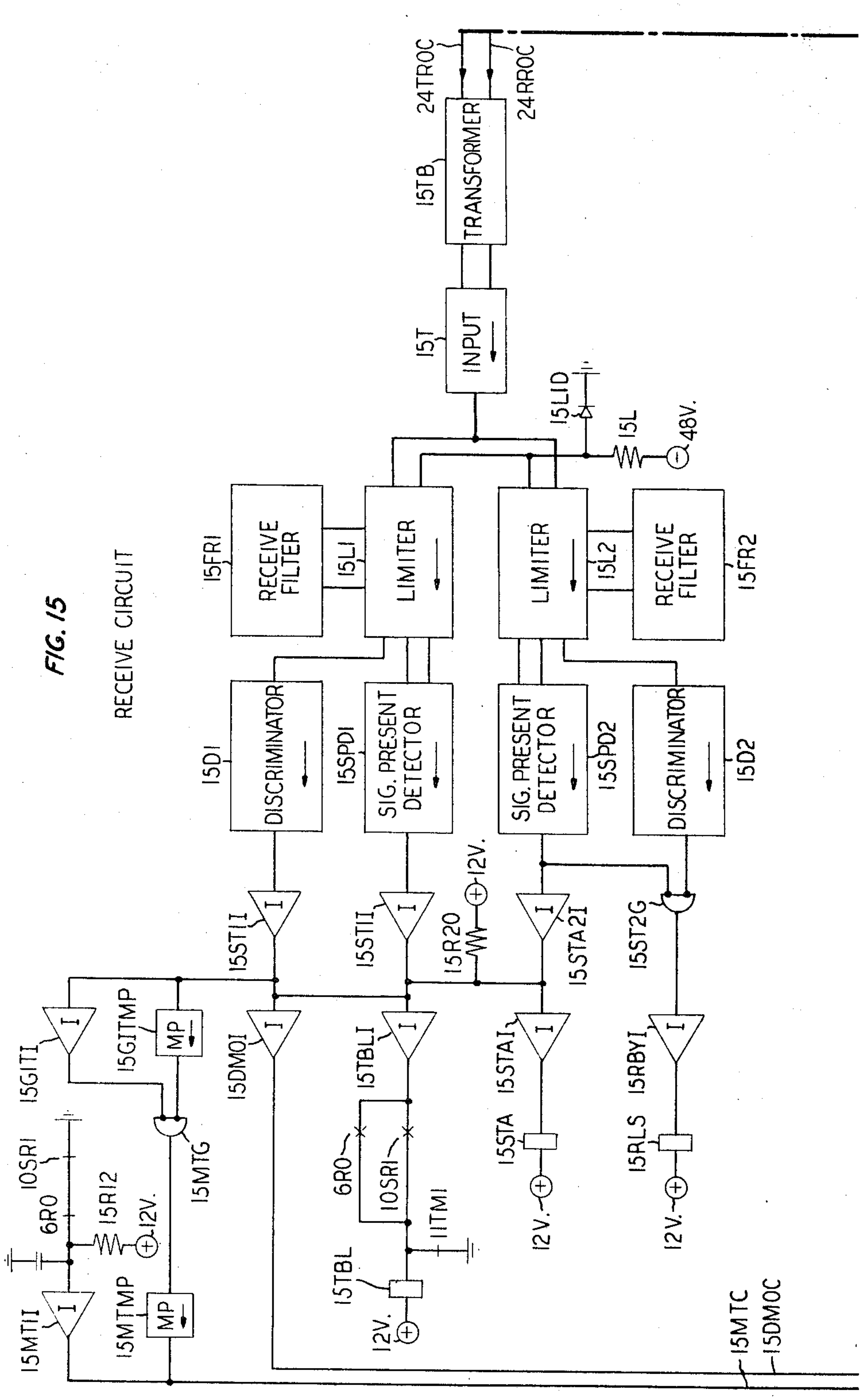
Figure 16:
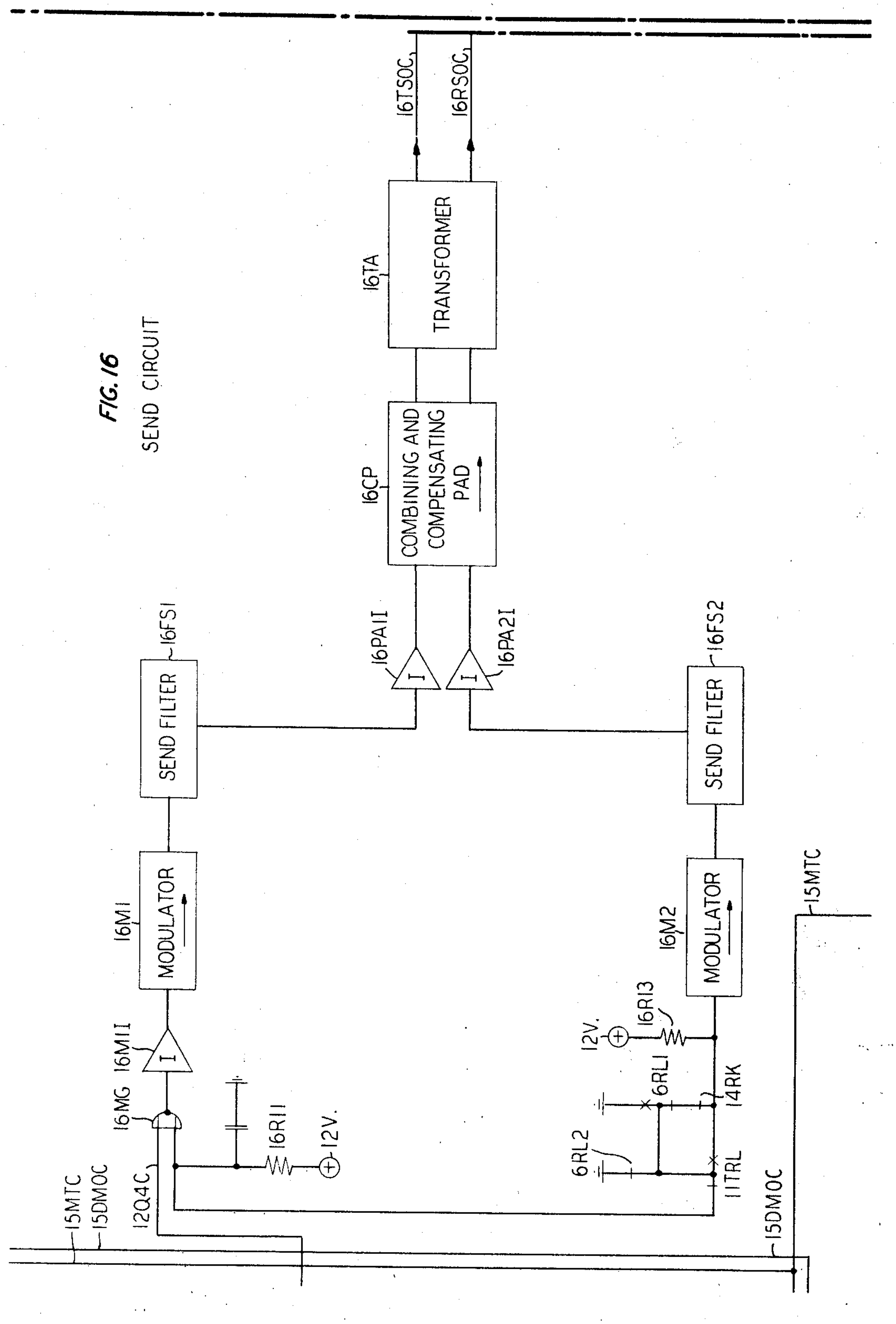
Figure 17:
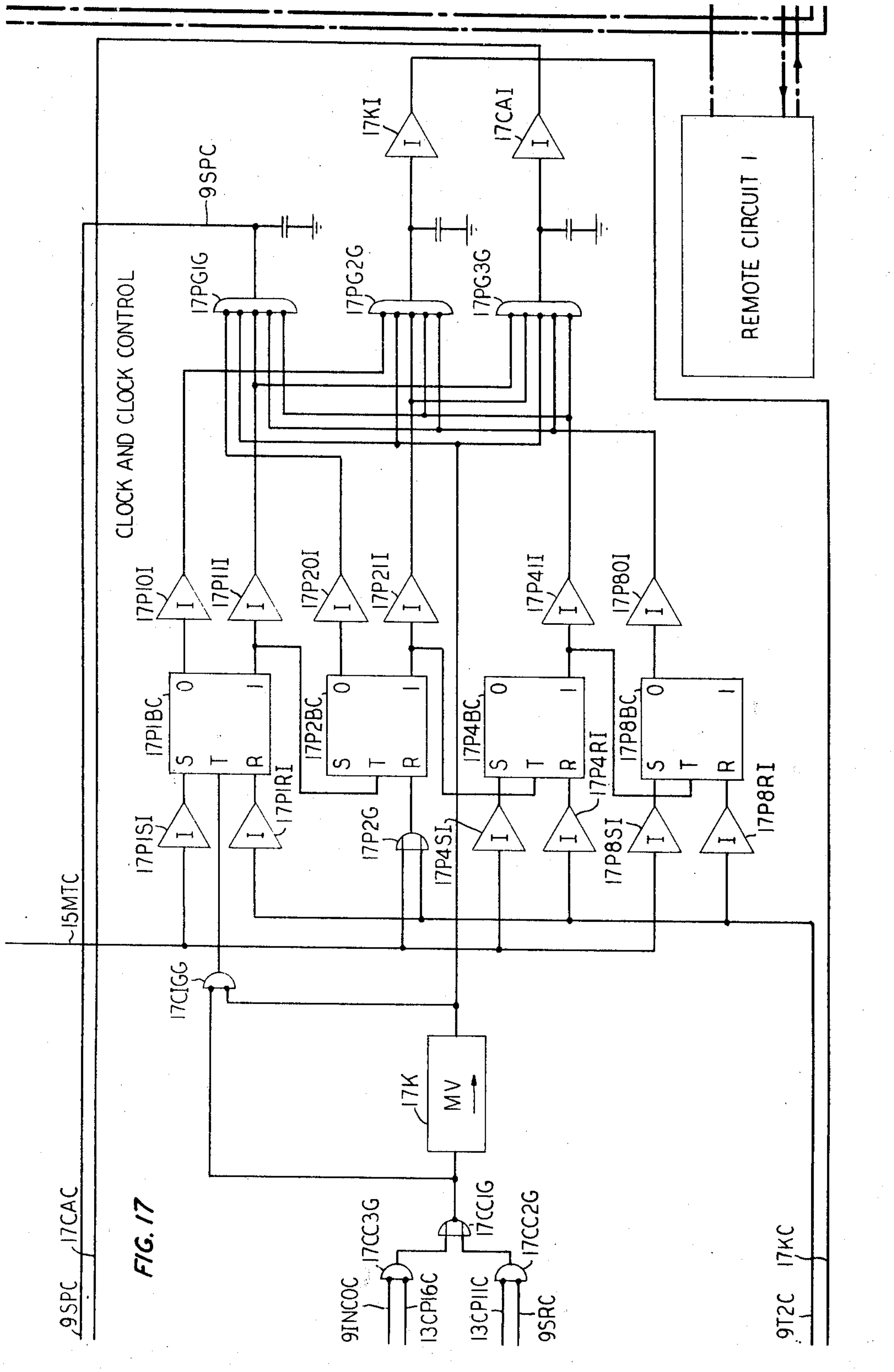
Figure 18:
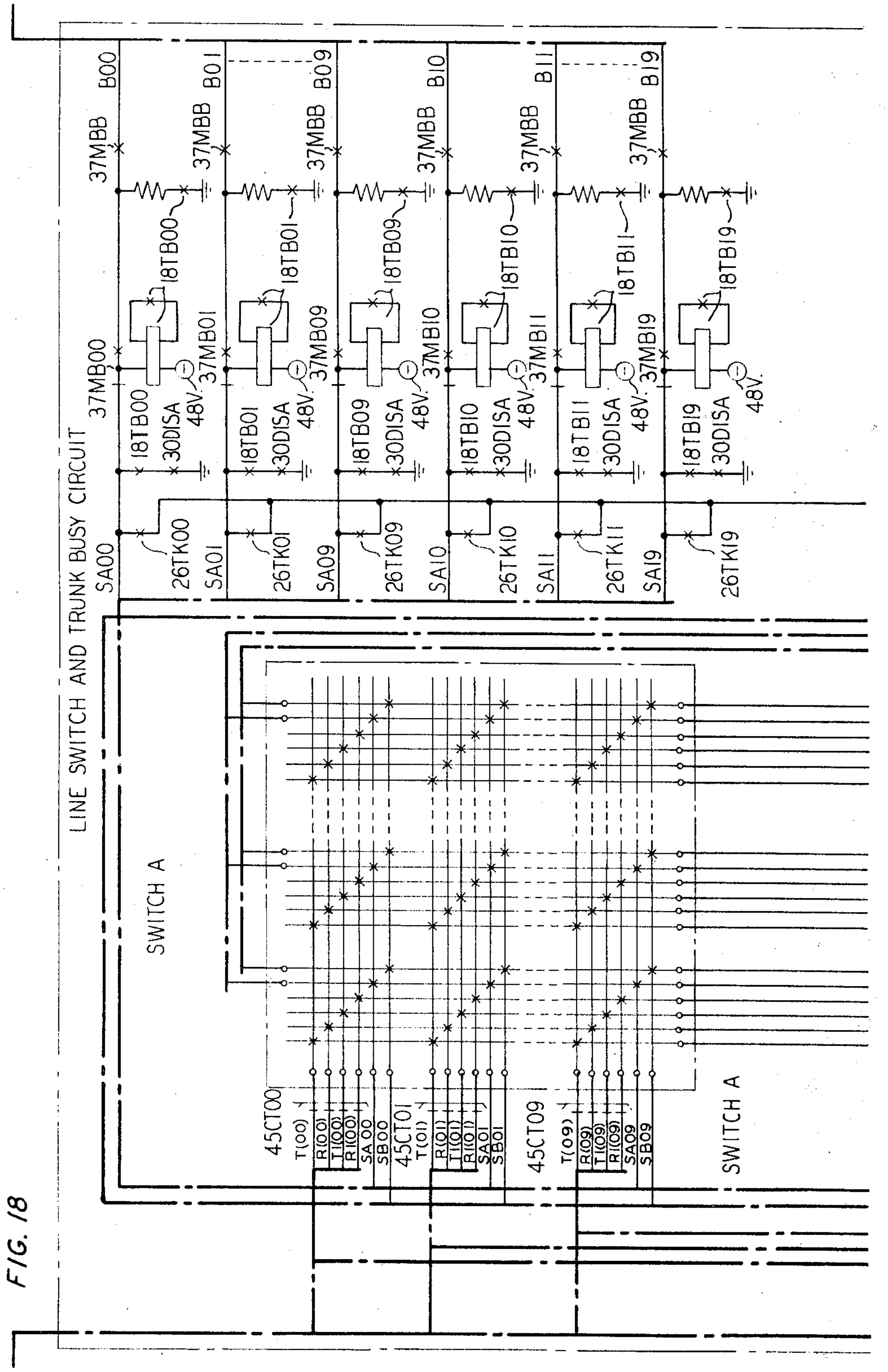
Figure 19:
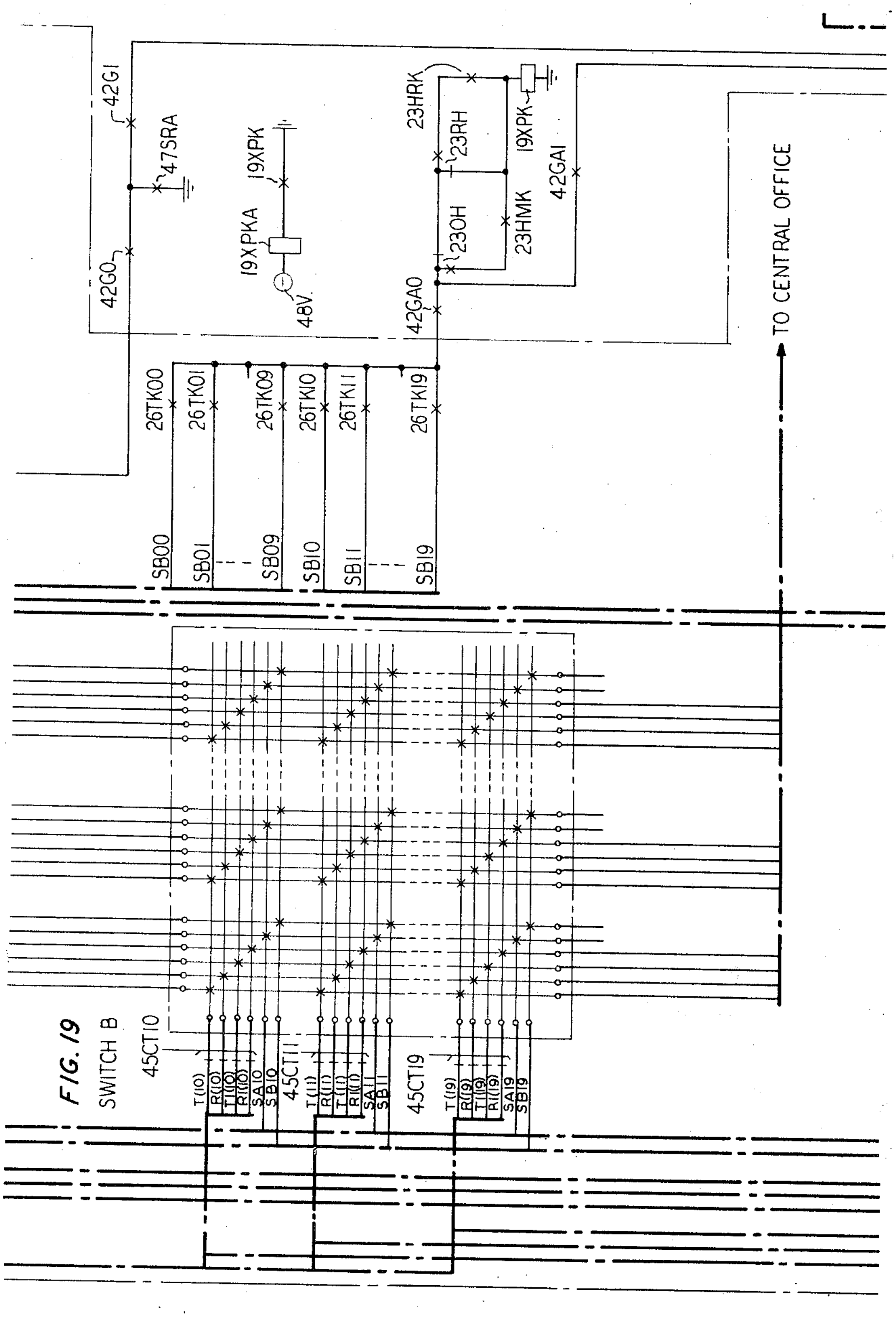
Figure 20:
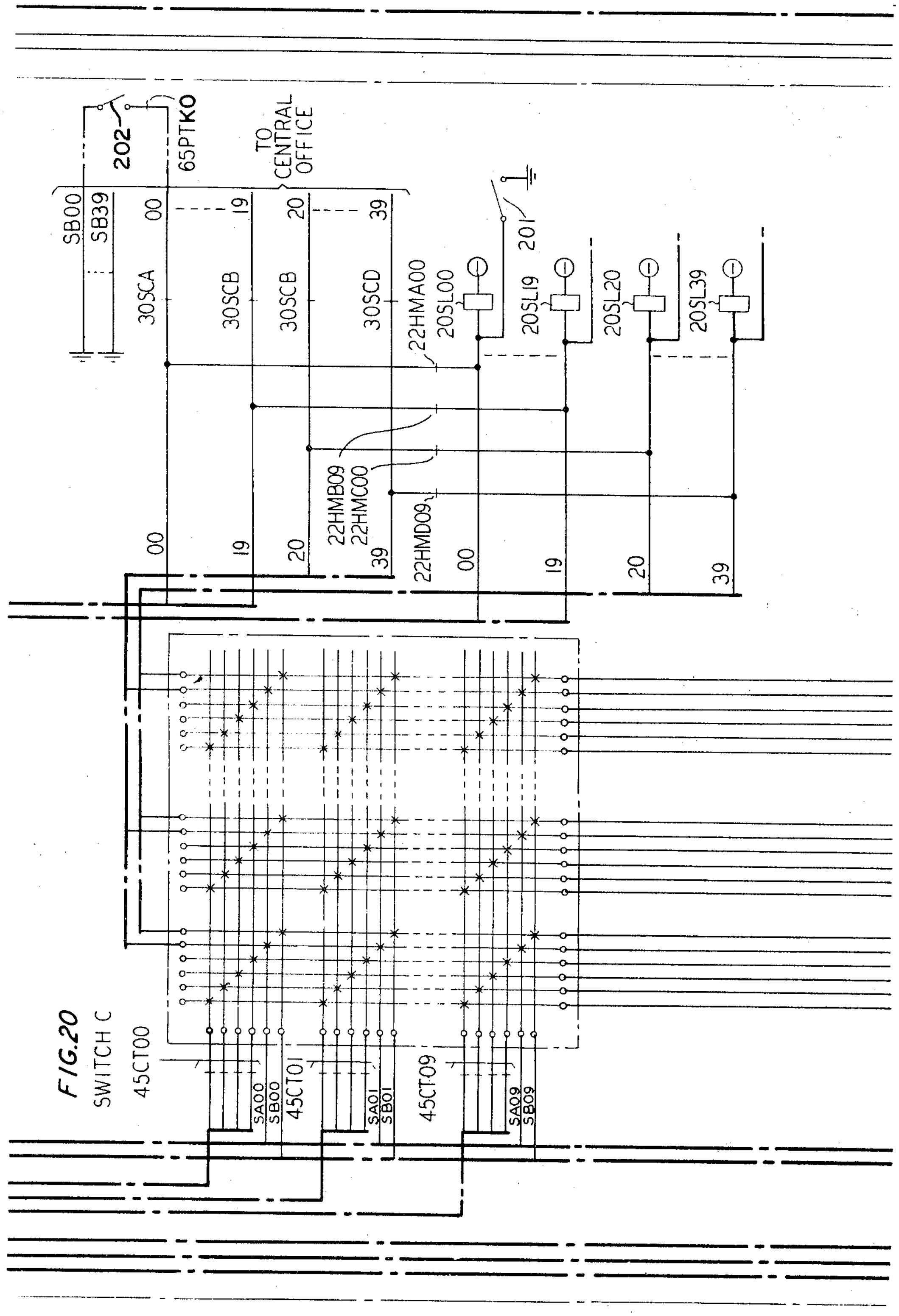
Figure 21:
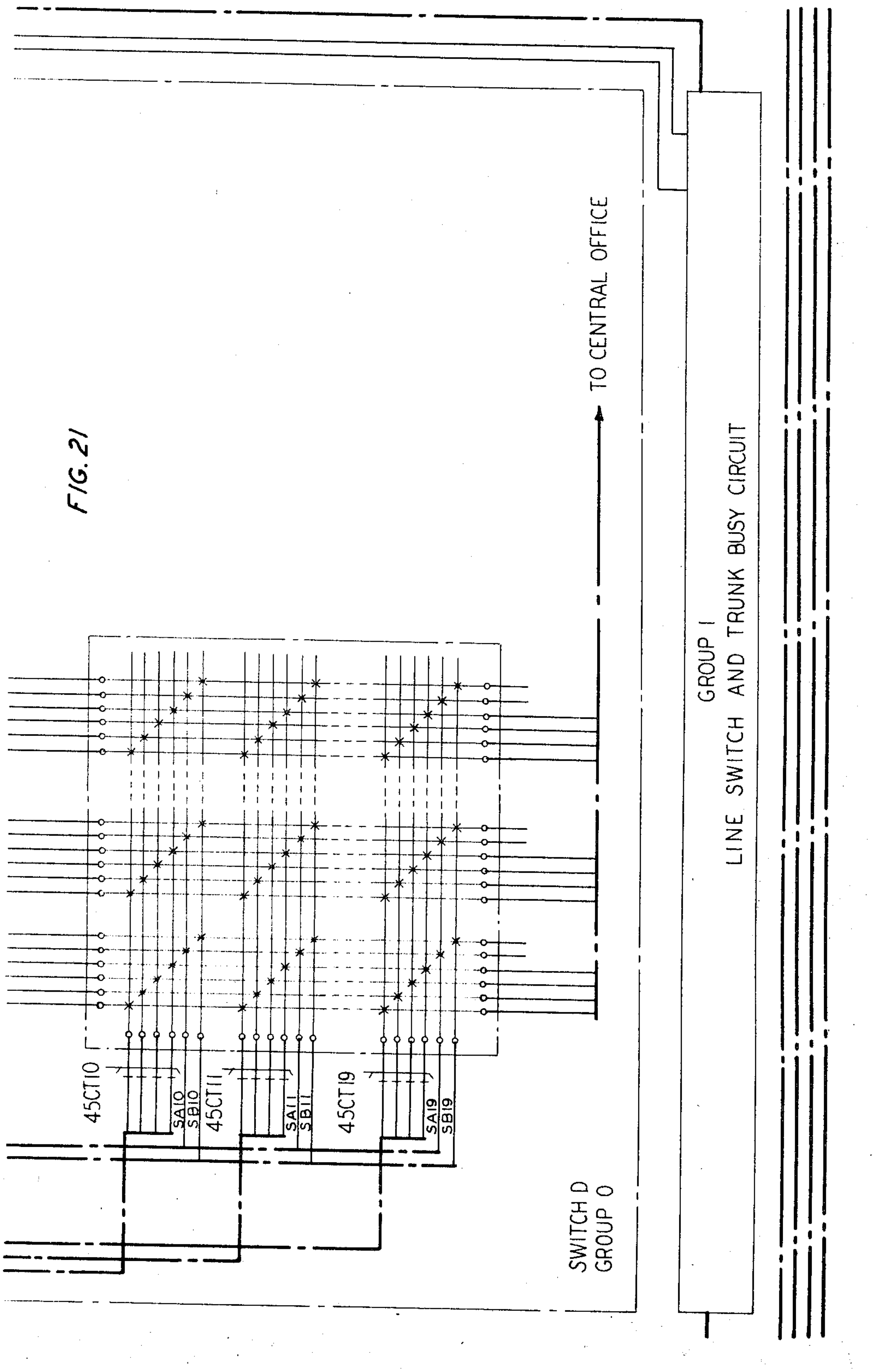
Figure 22:
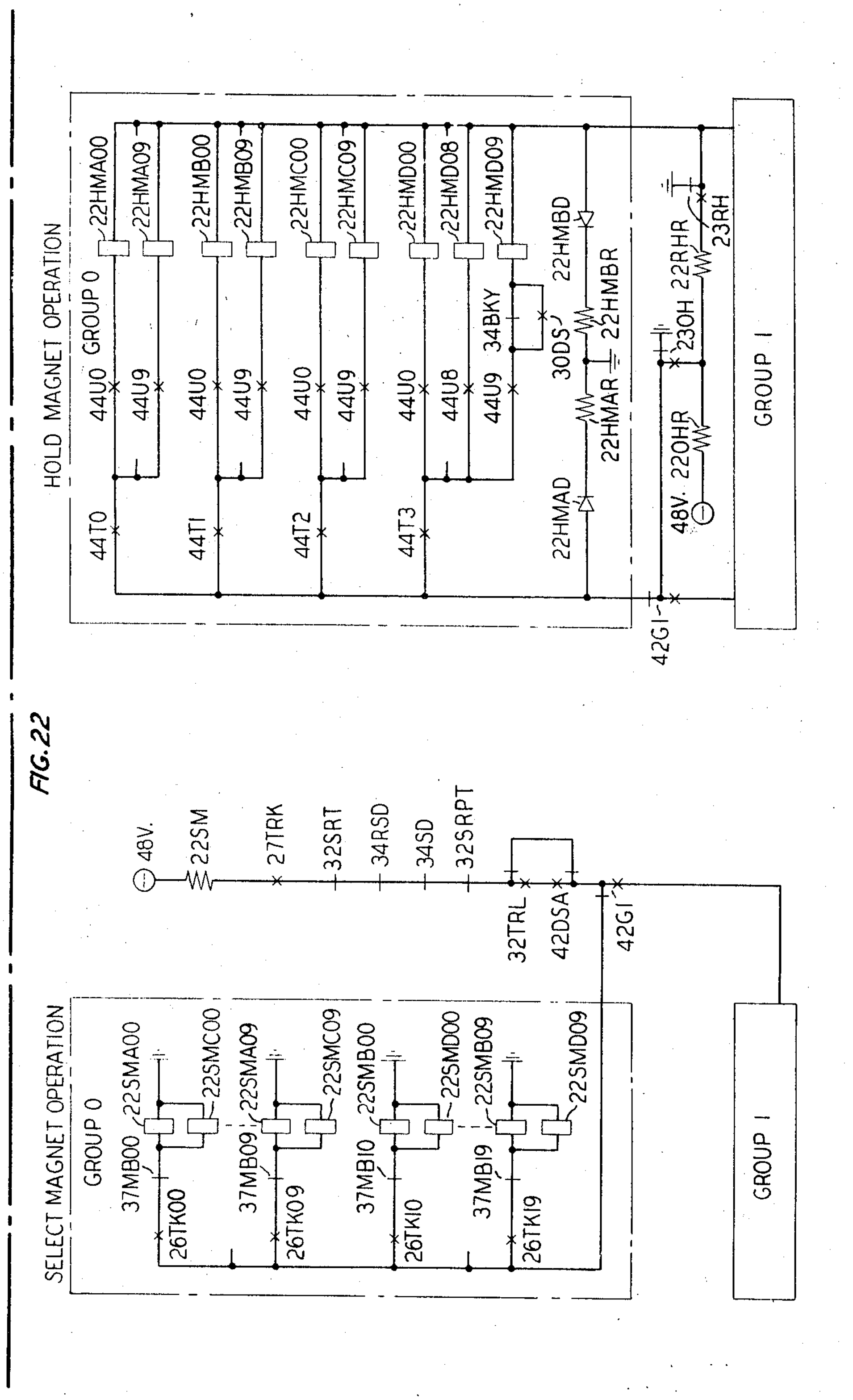
Figure 23:
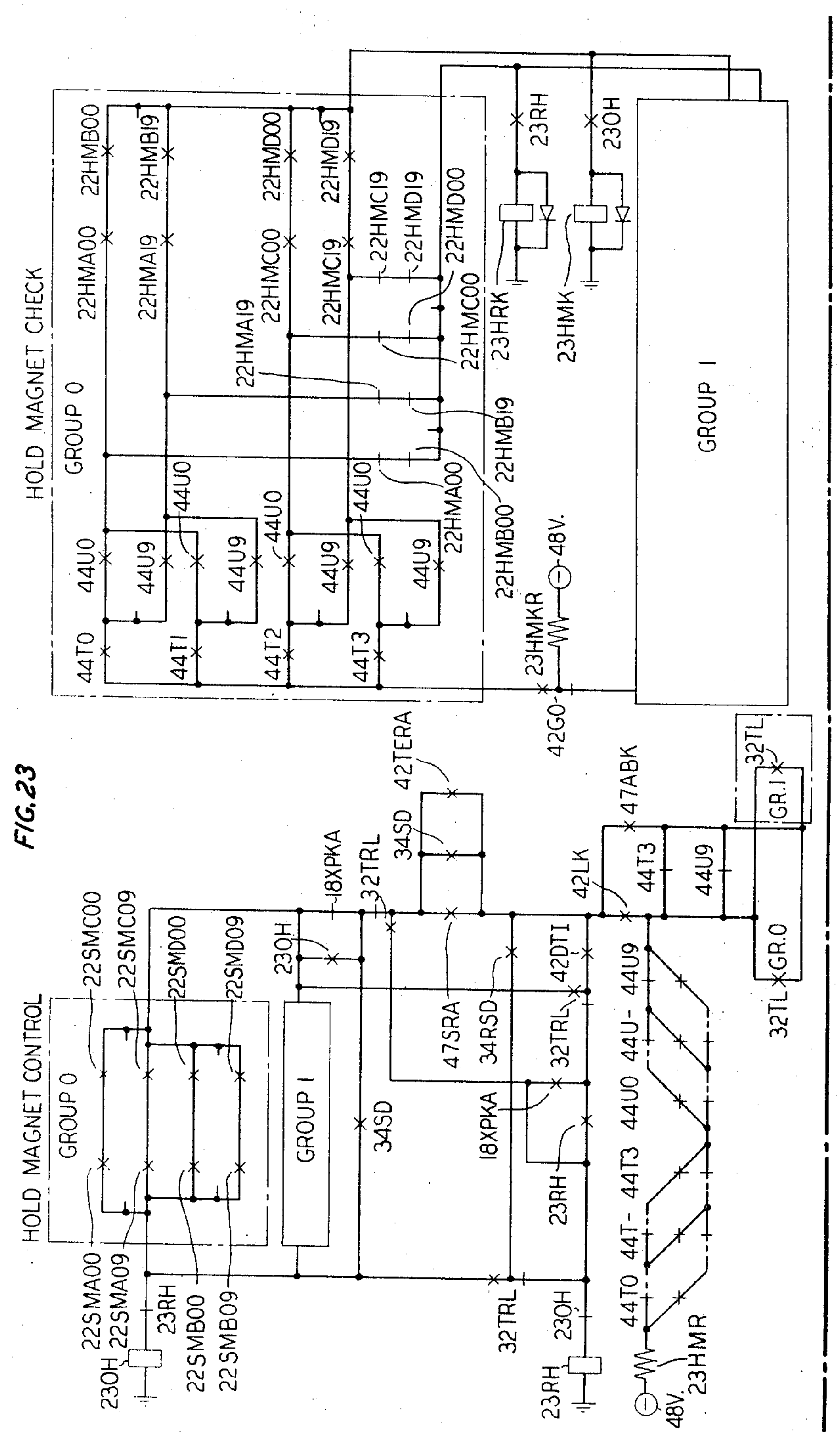
Figure 24:
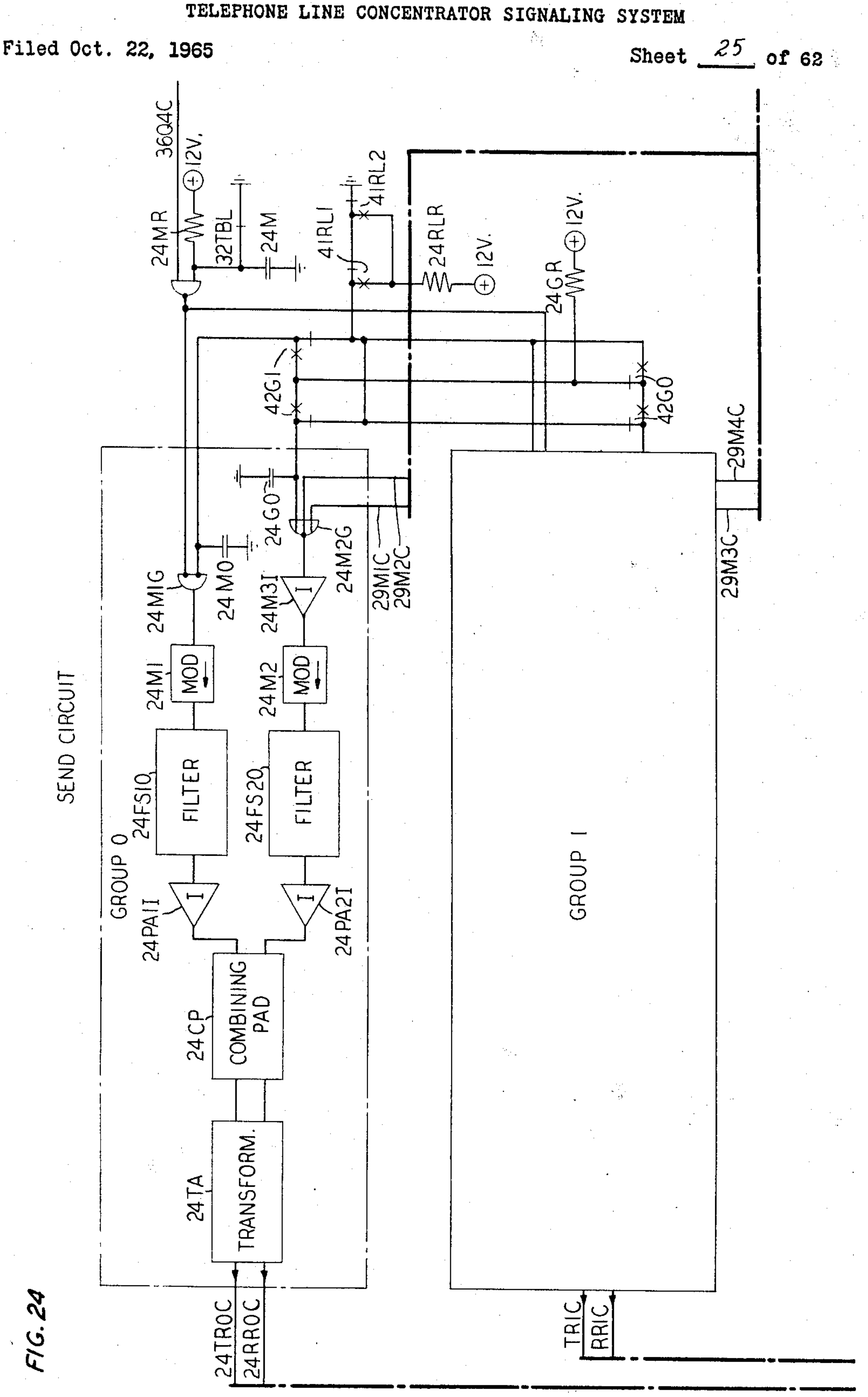
Figure 25:
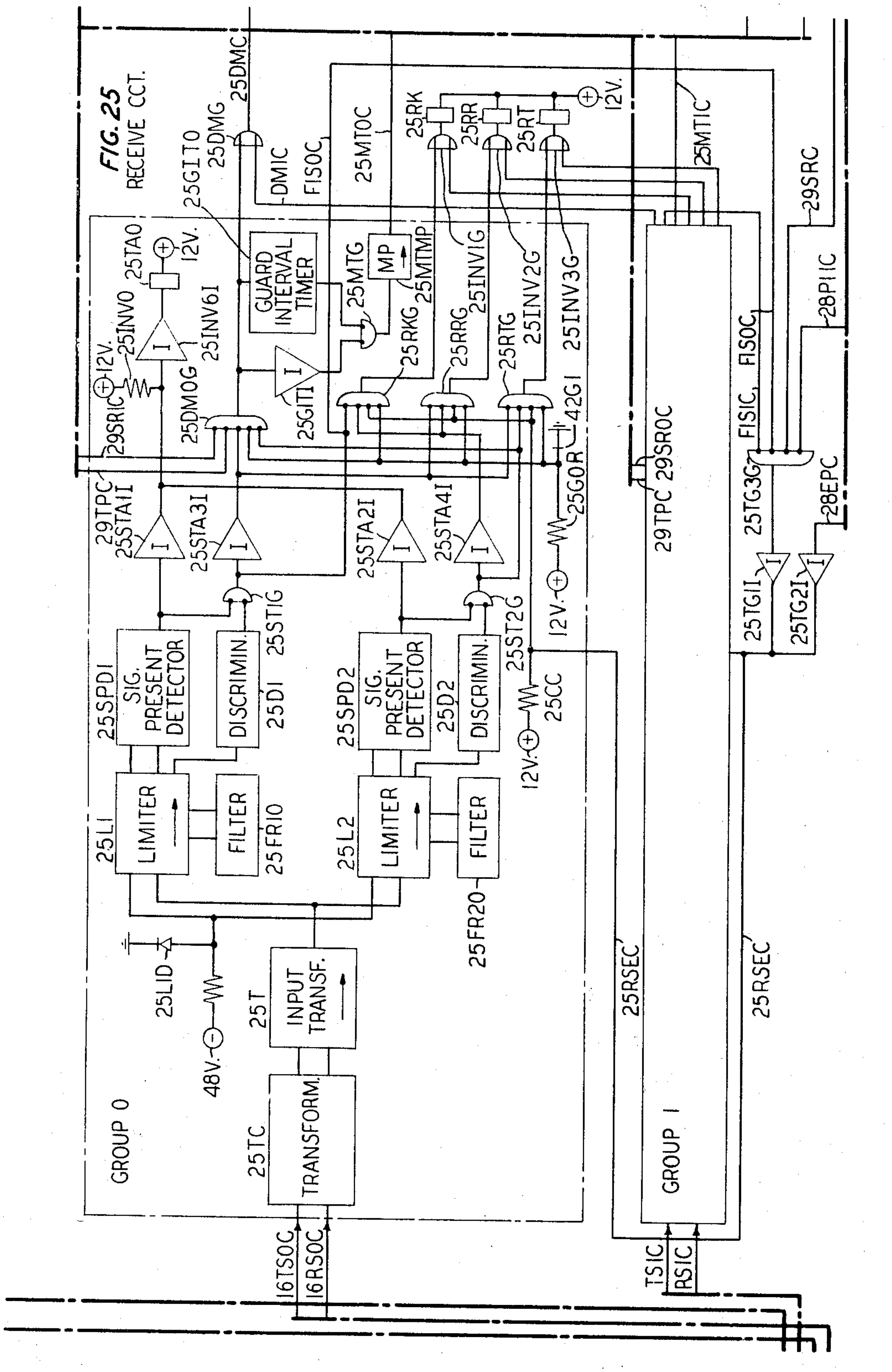
Figure 26:
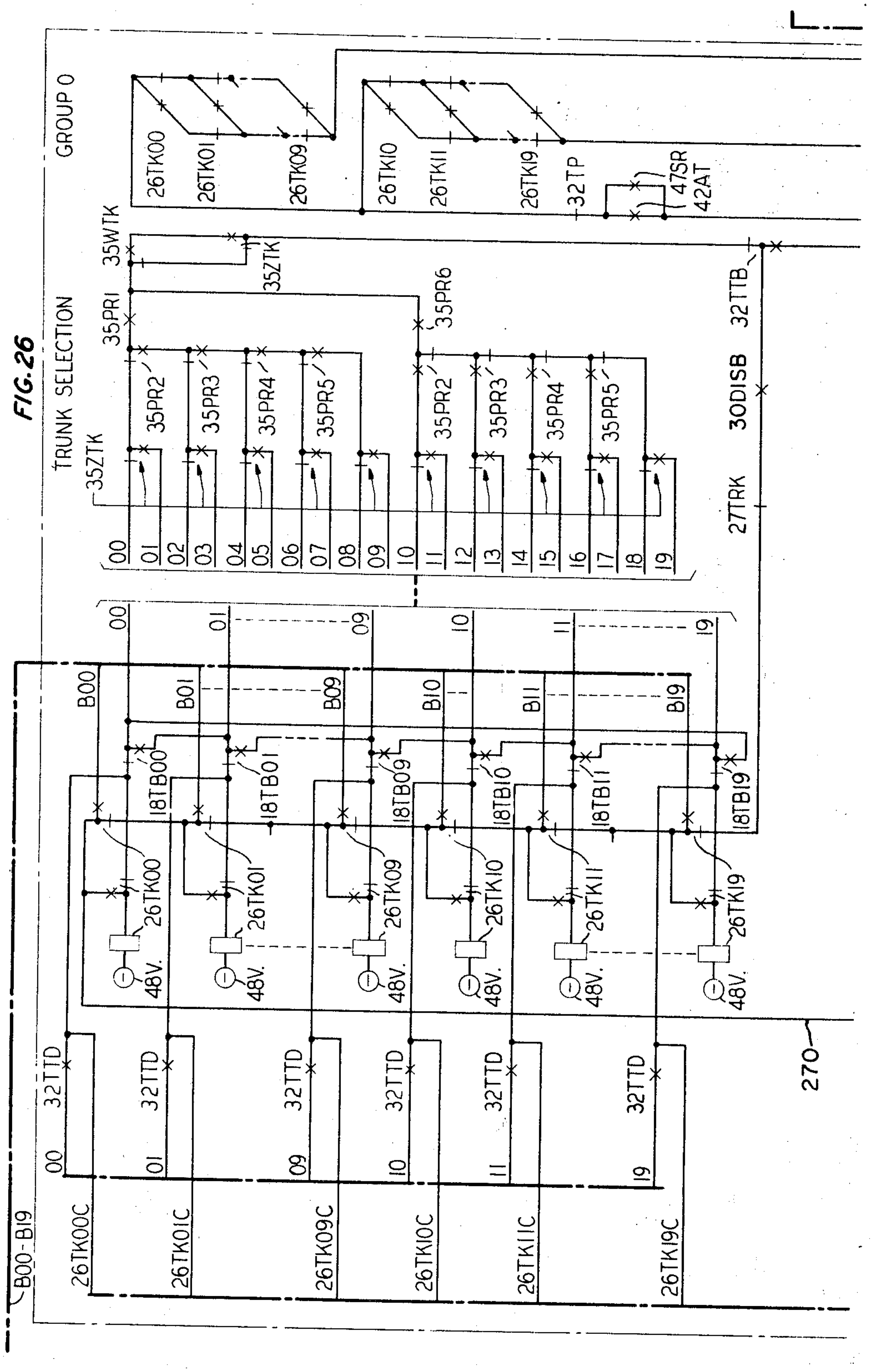
Figure 27:
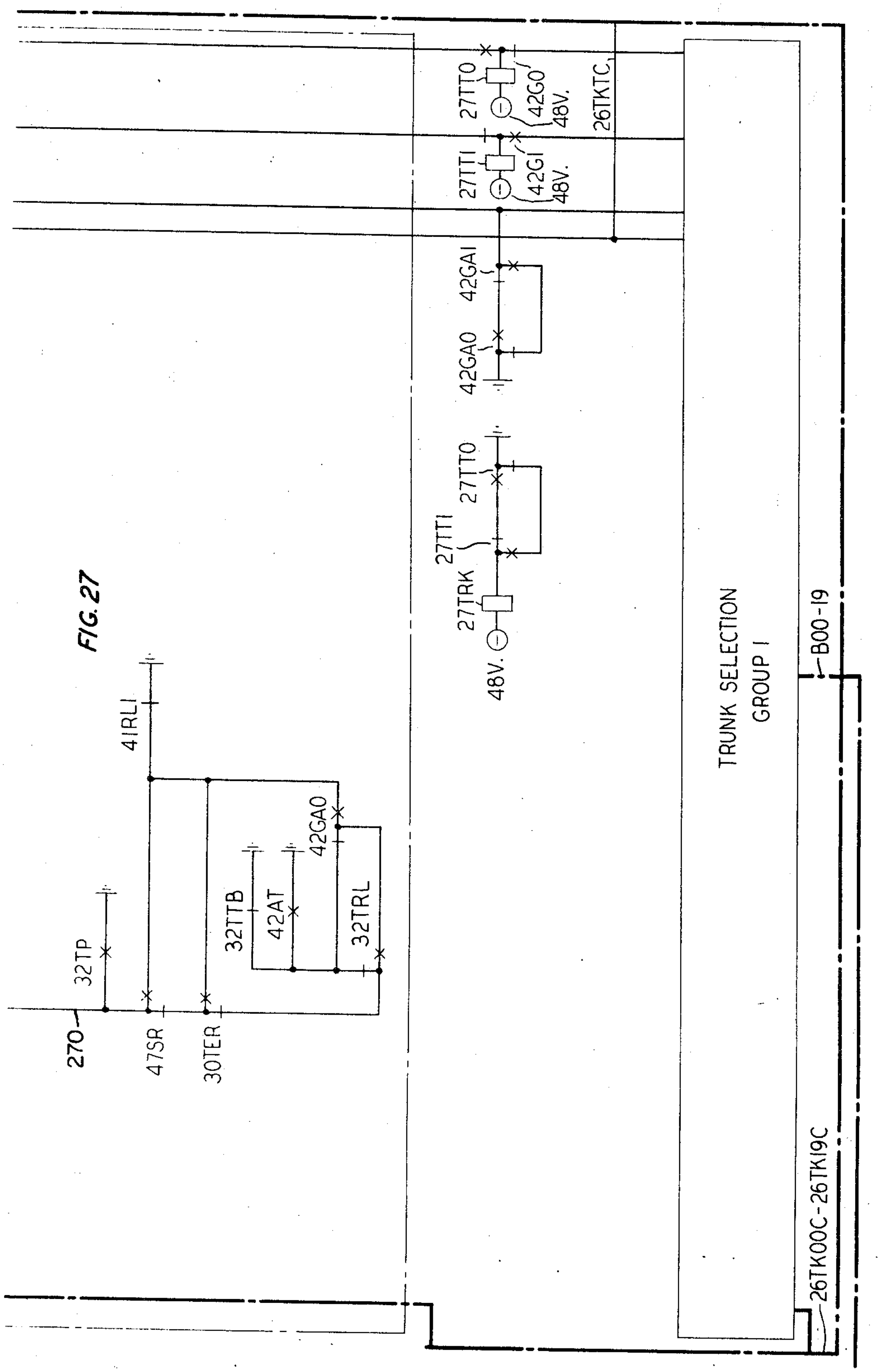
Figure 28:
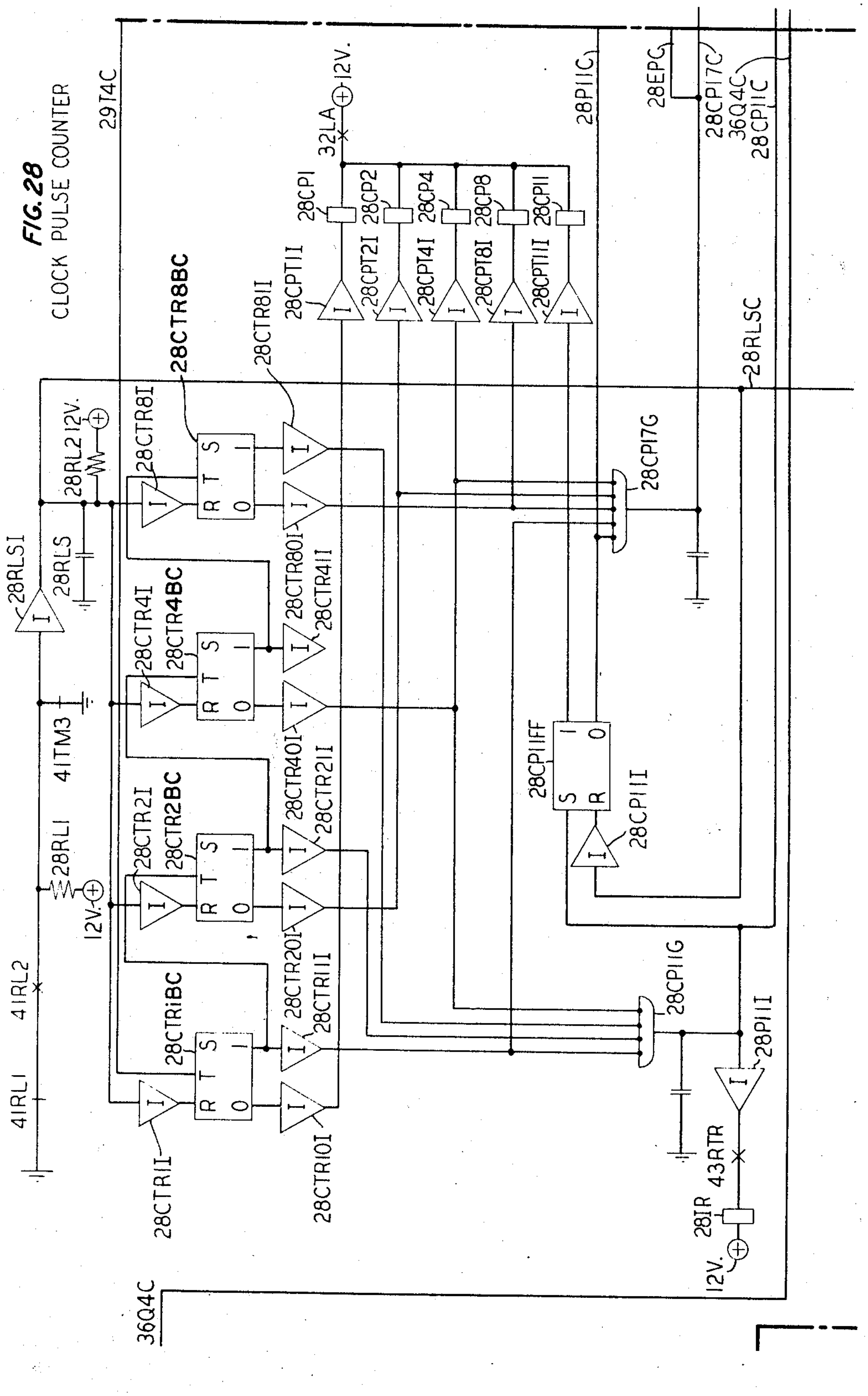
Figure 29:
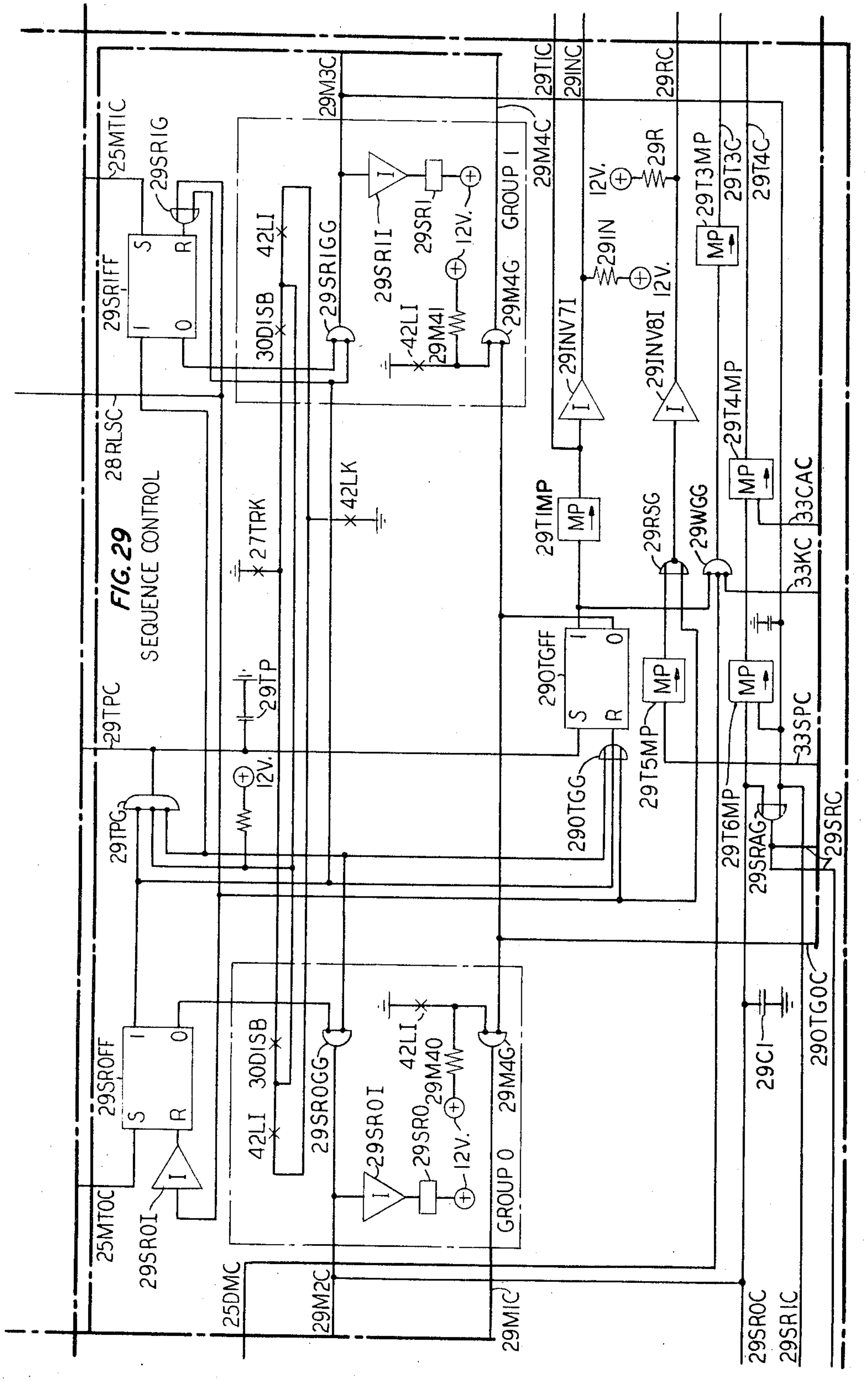
Figure 30:
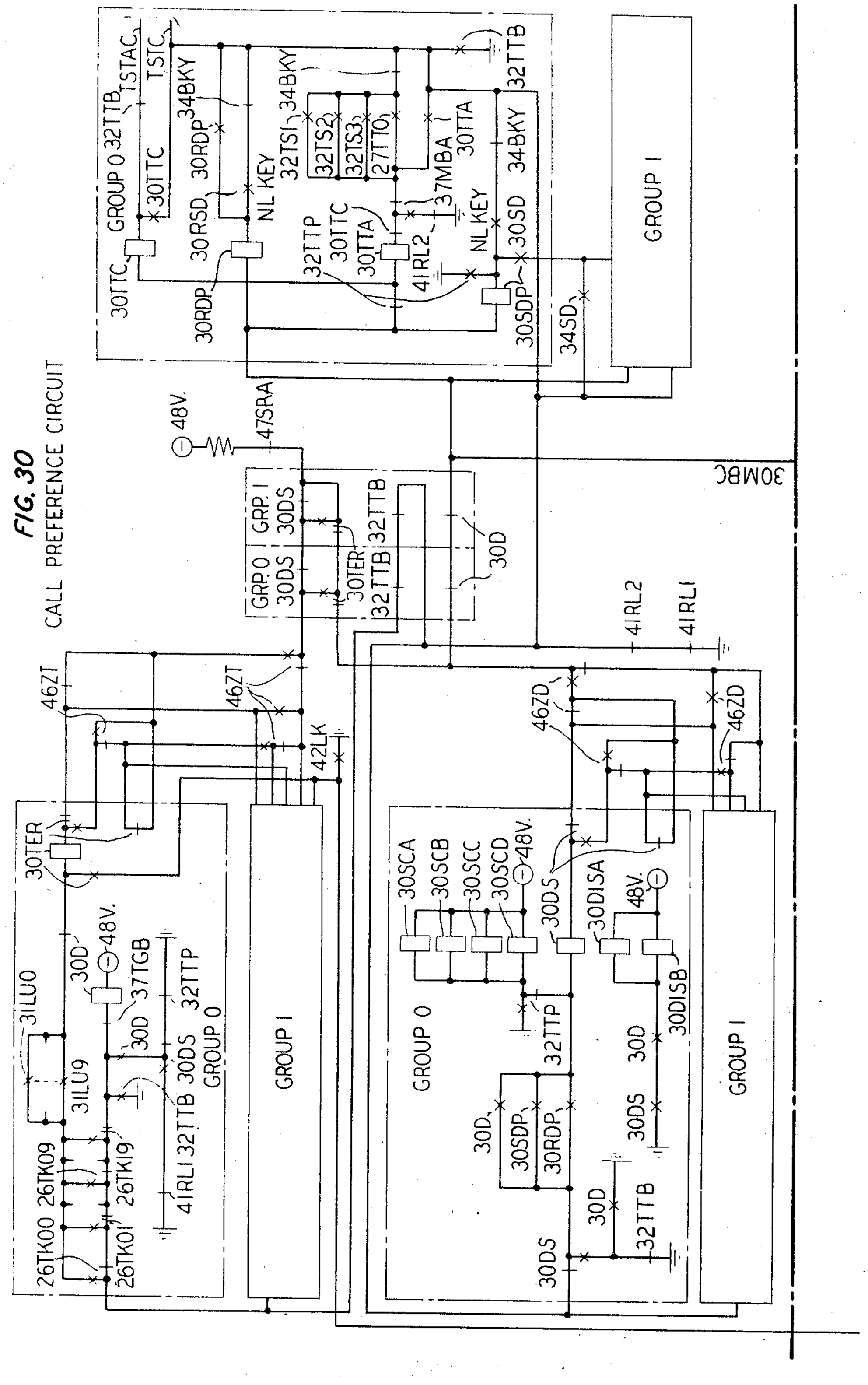
Figure 31:
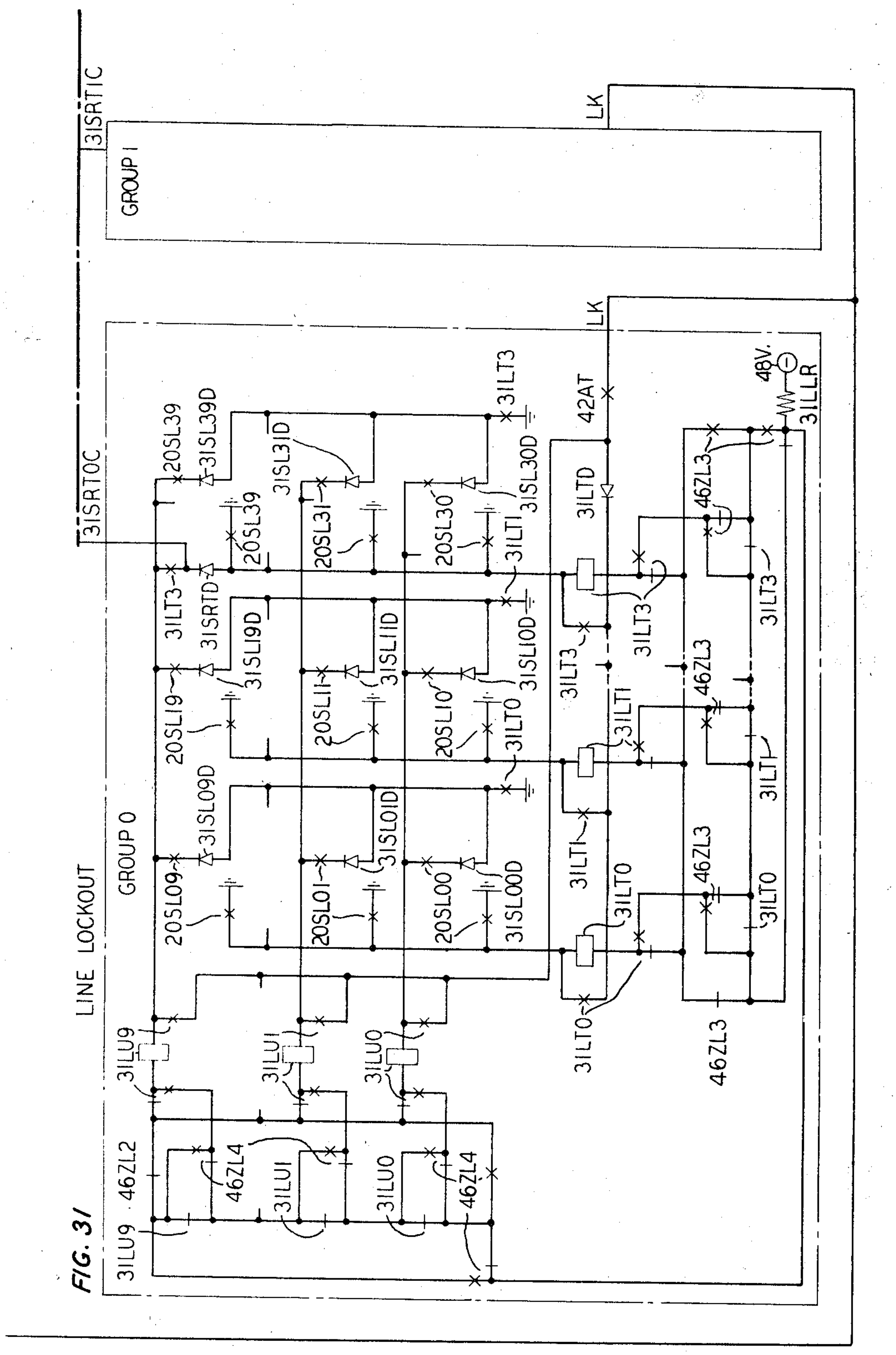
Figure 32:
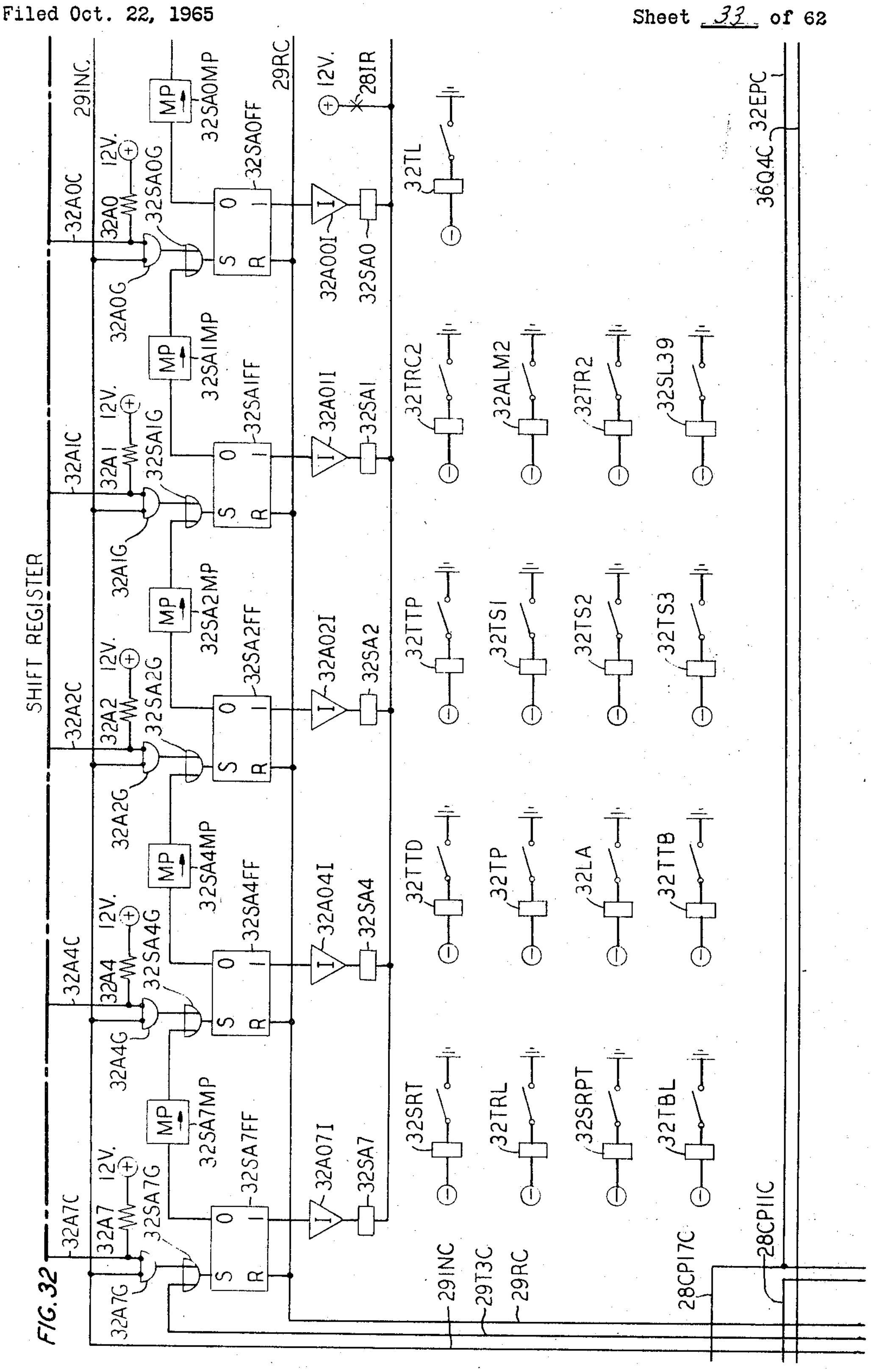
Figure 33:
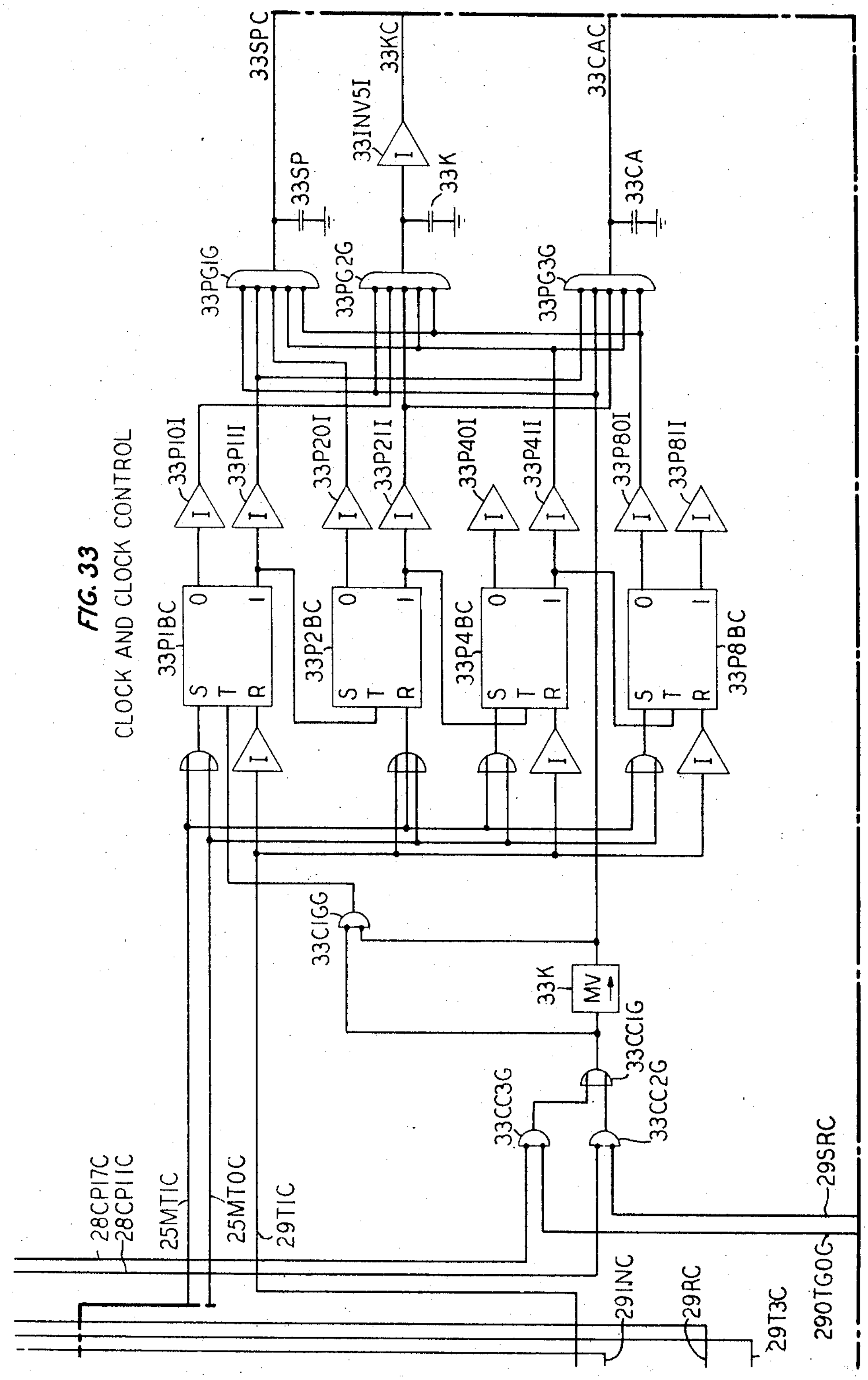
Figure 34:
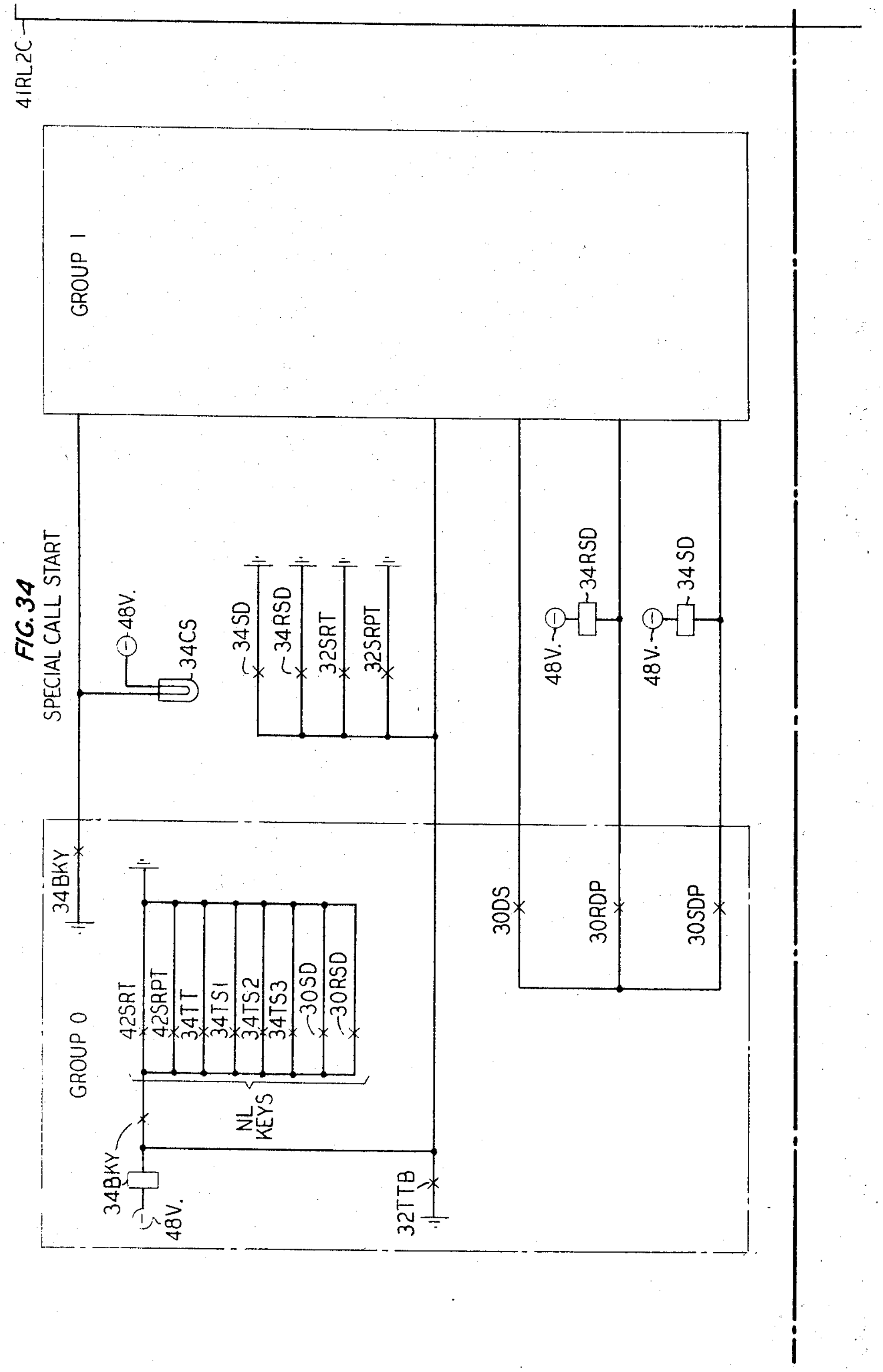
Figure 35:
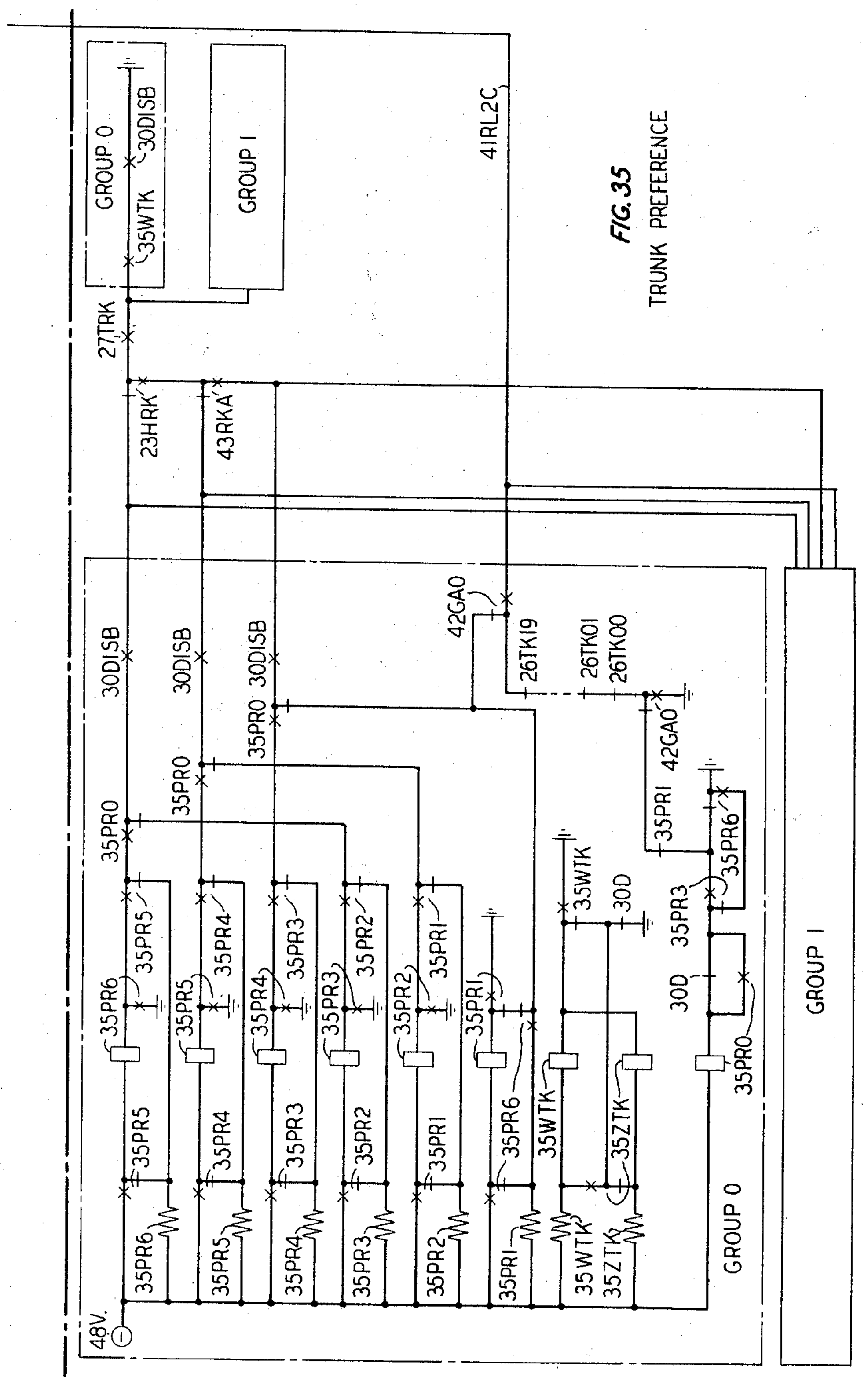
Figure 36:
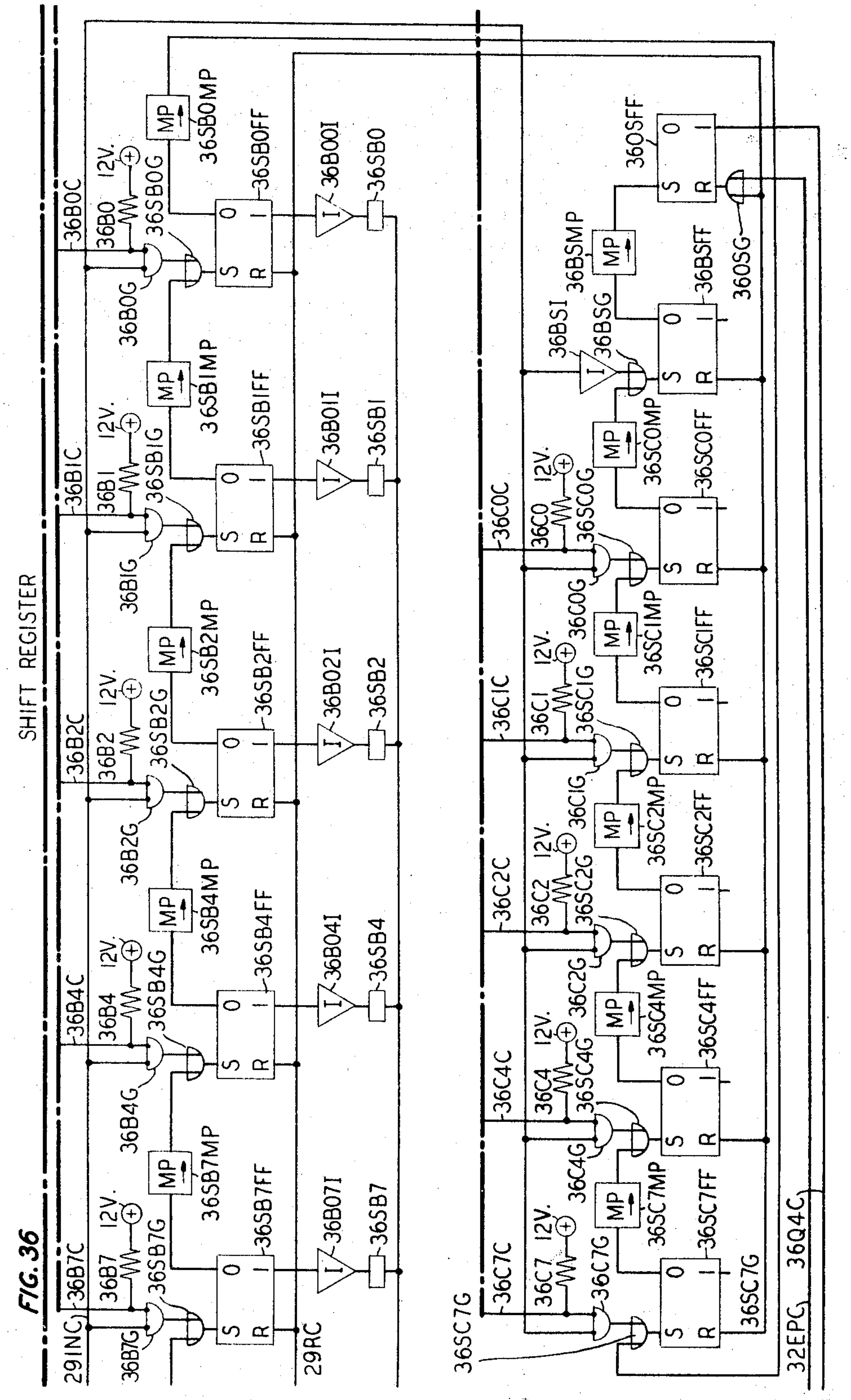
Figure 37:
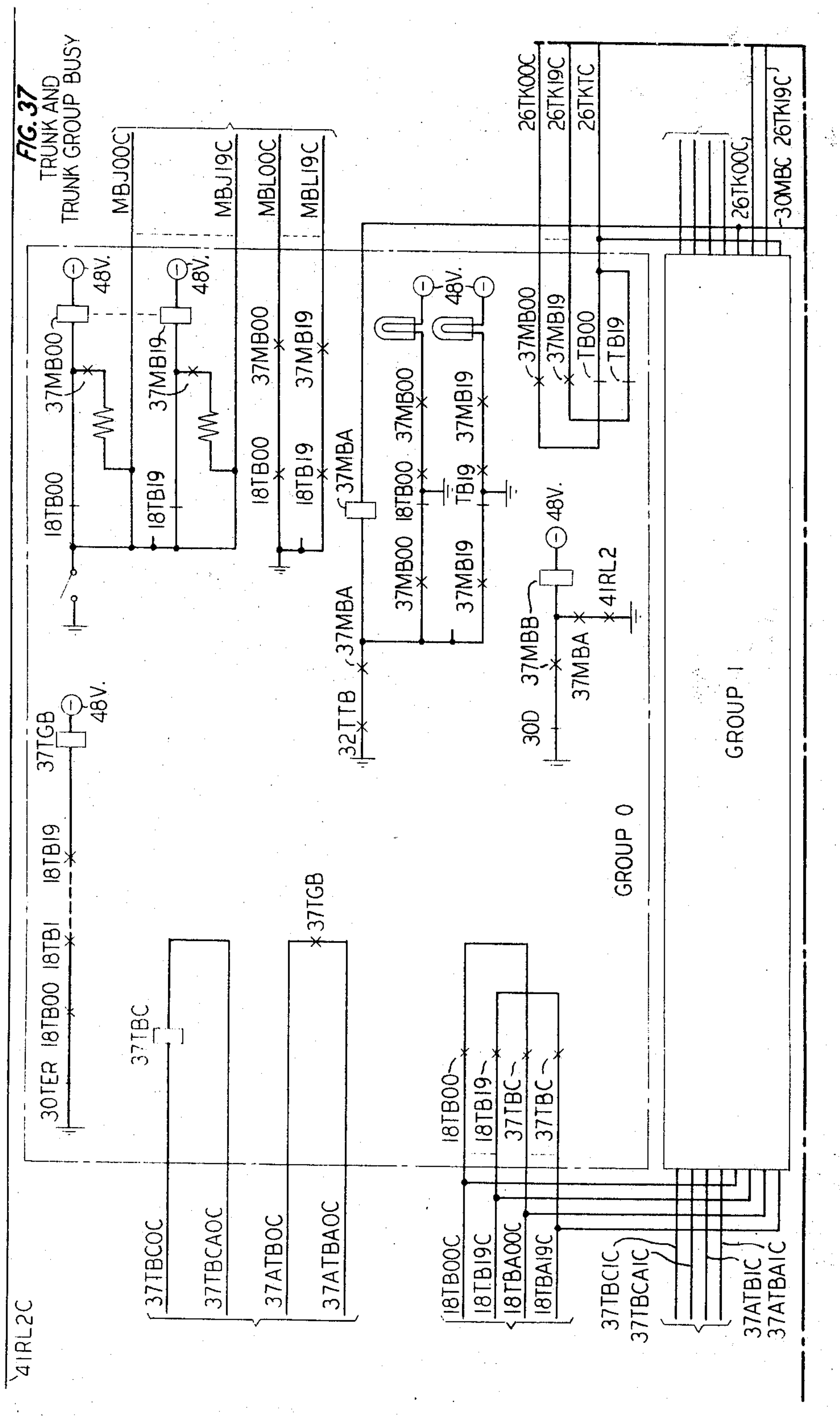
Figure 38:
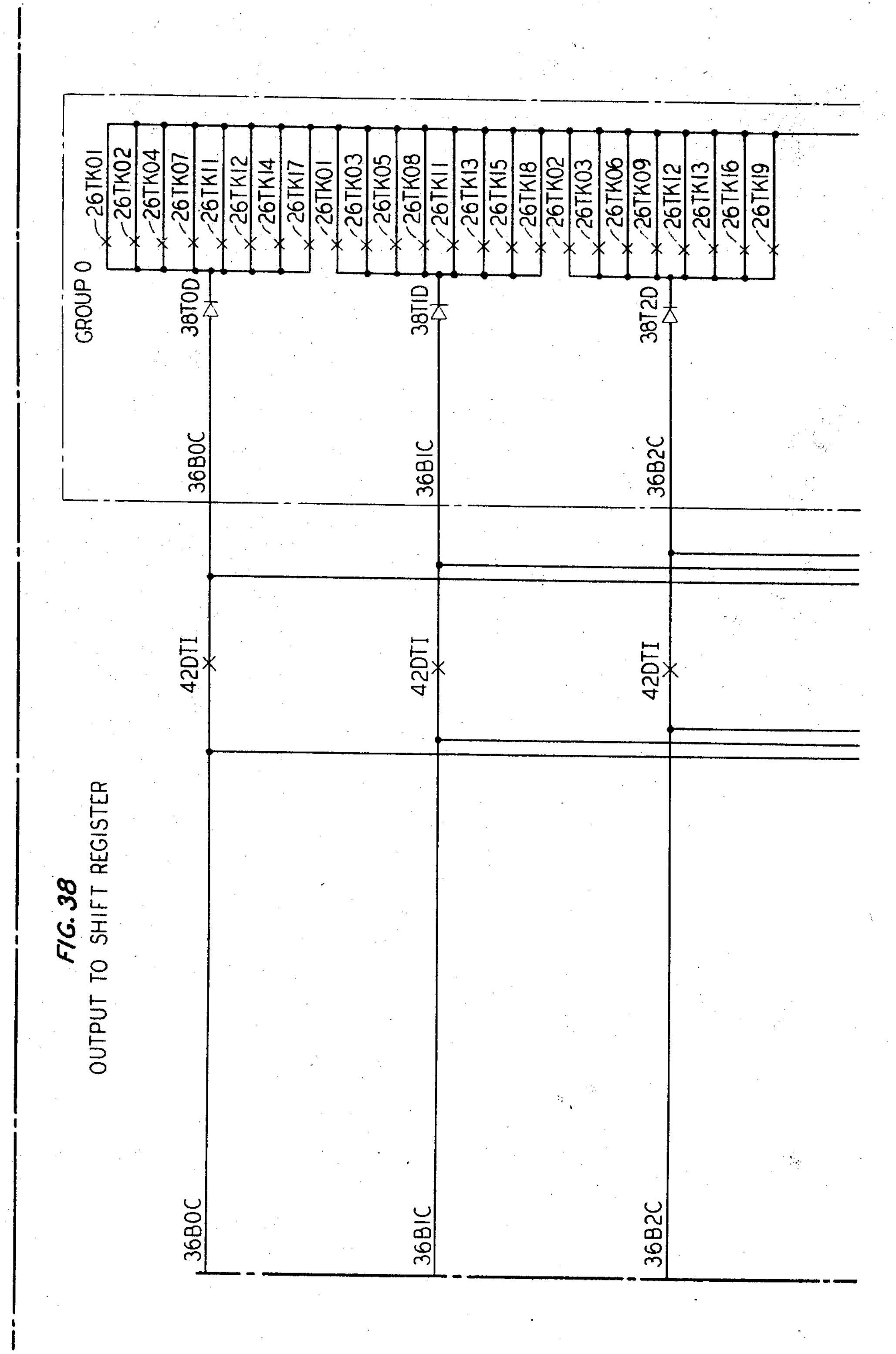
Figure 39:
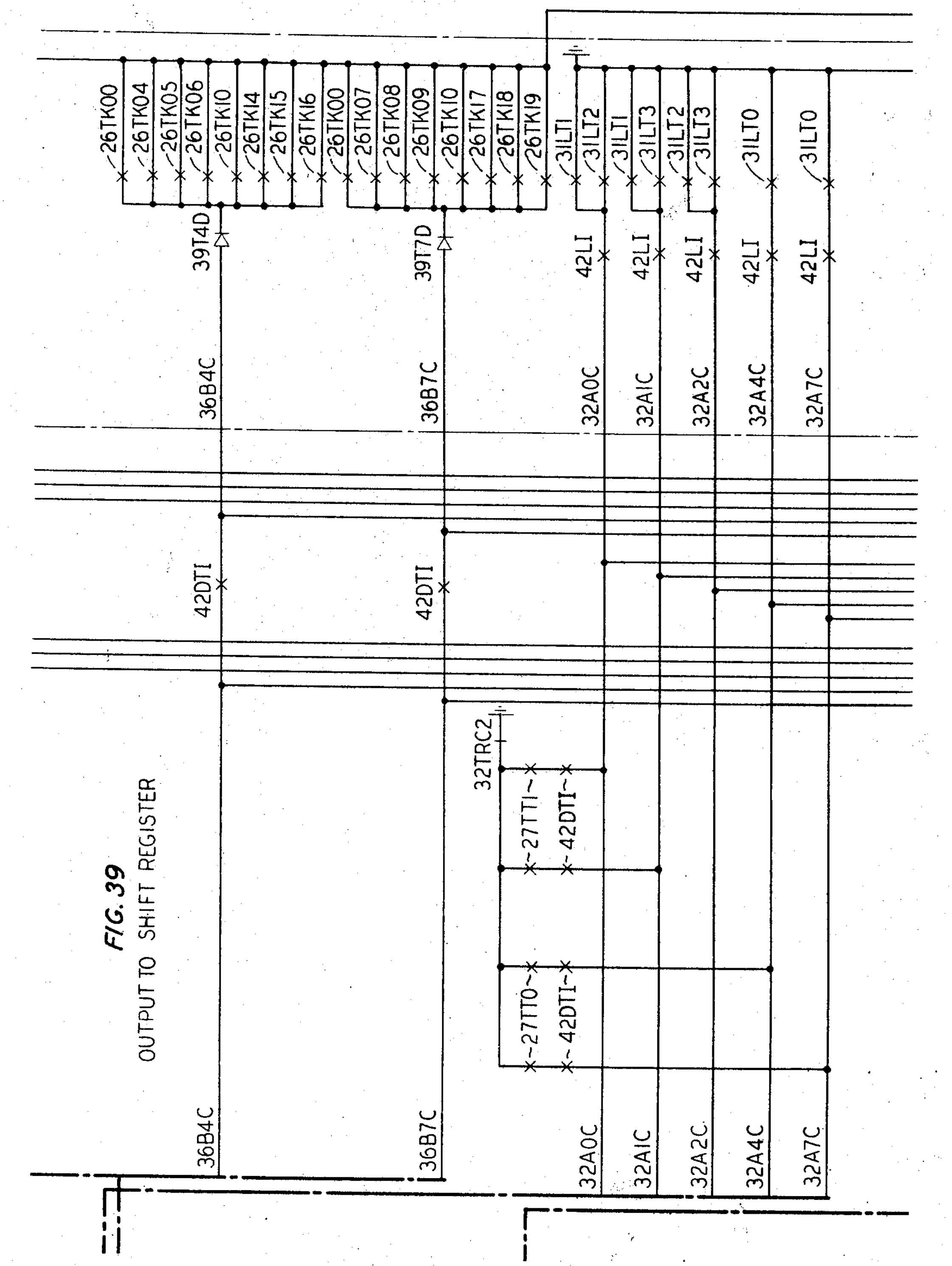
Figure 40:
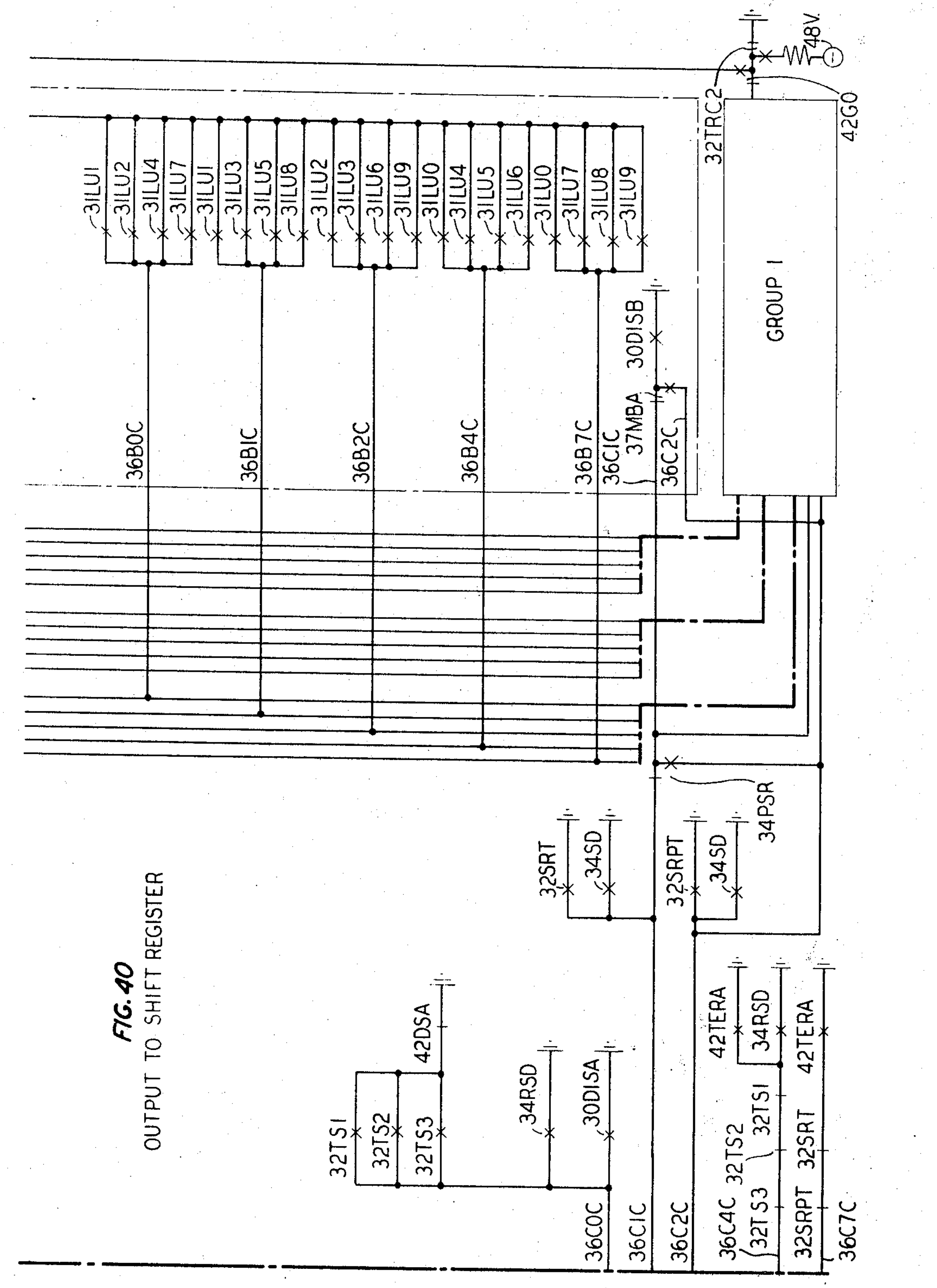
Figure 41:
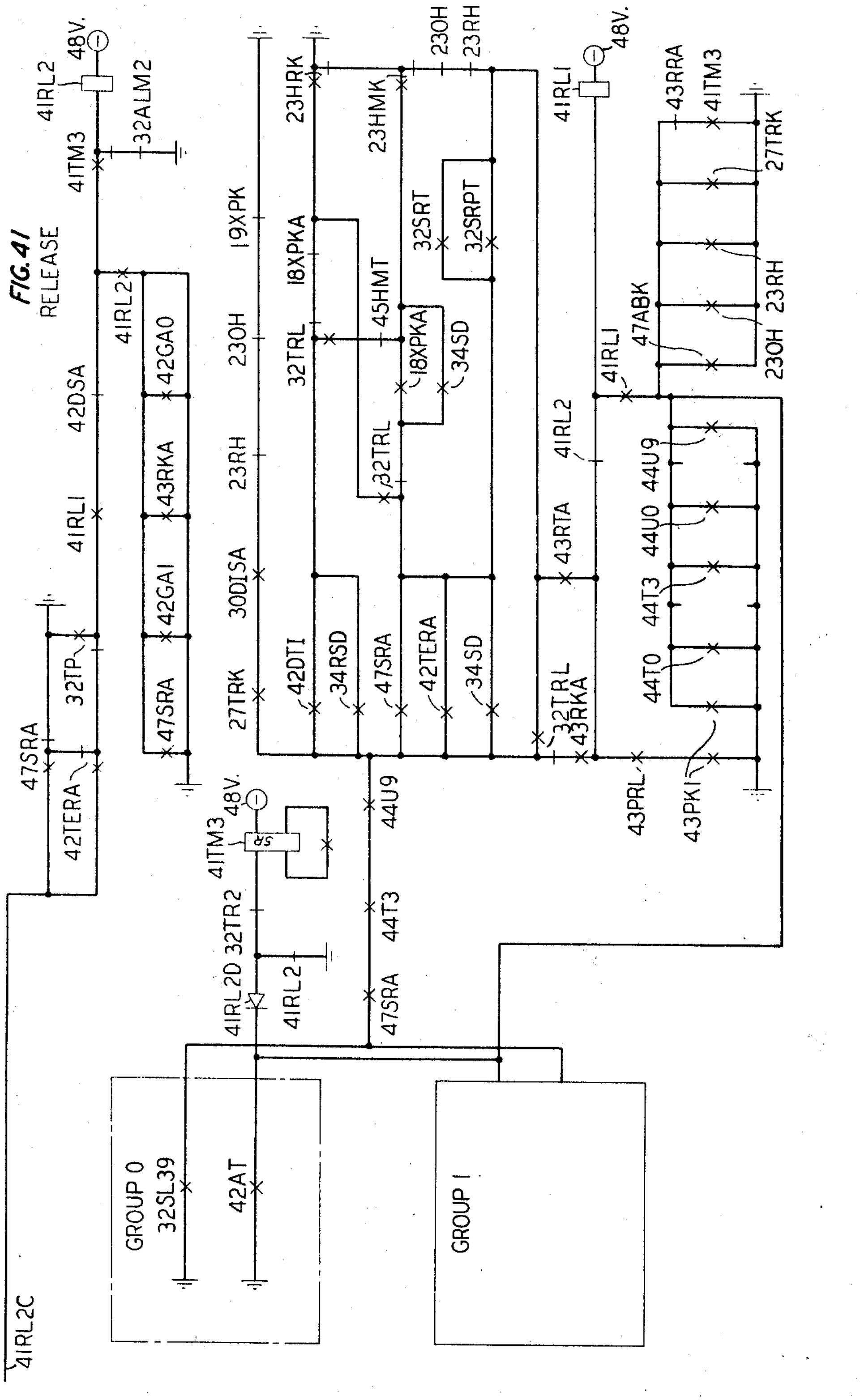
Figure 42:
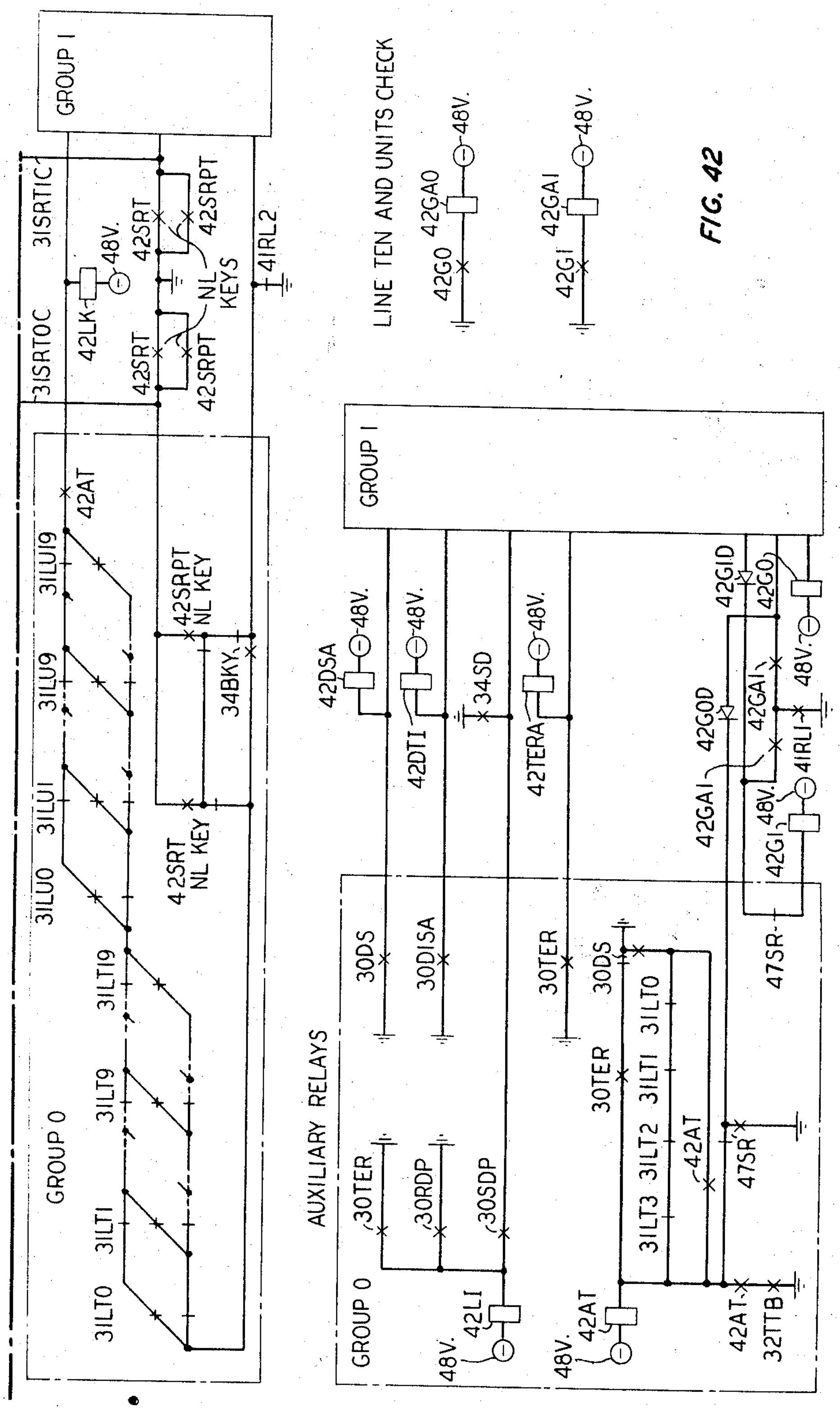
Figure 43:
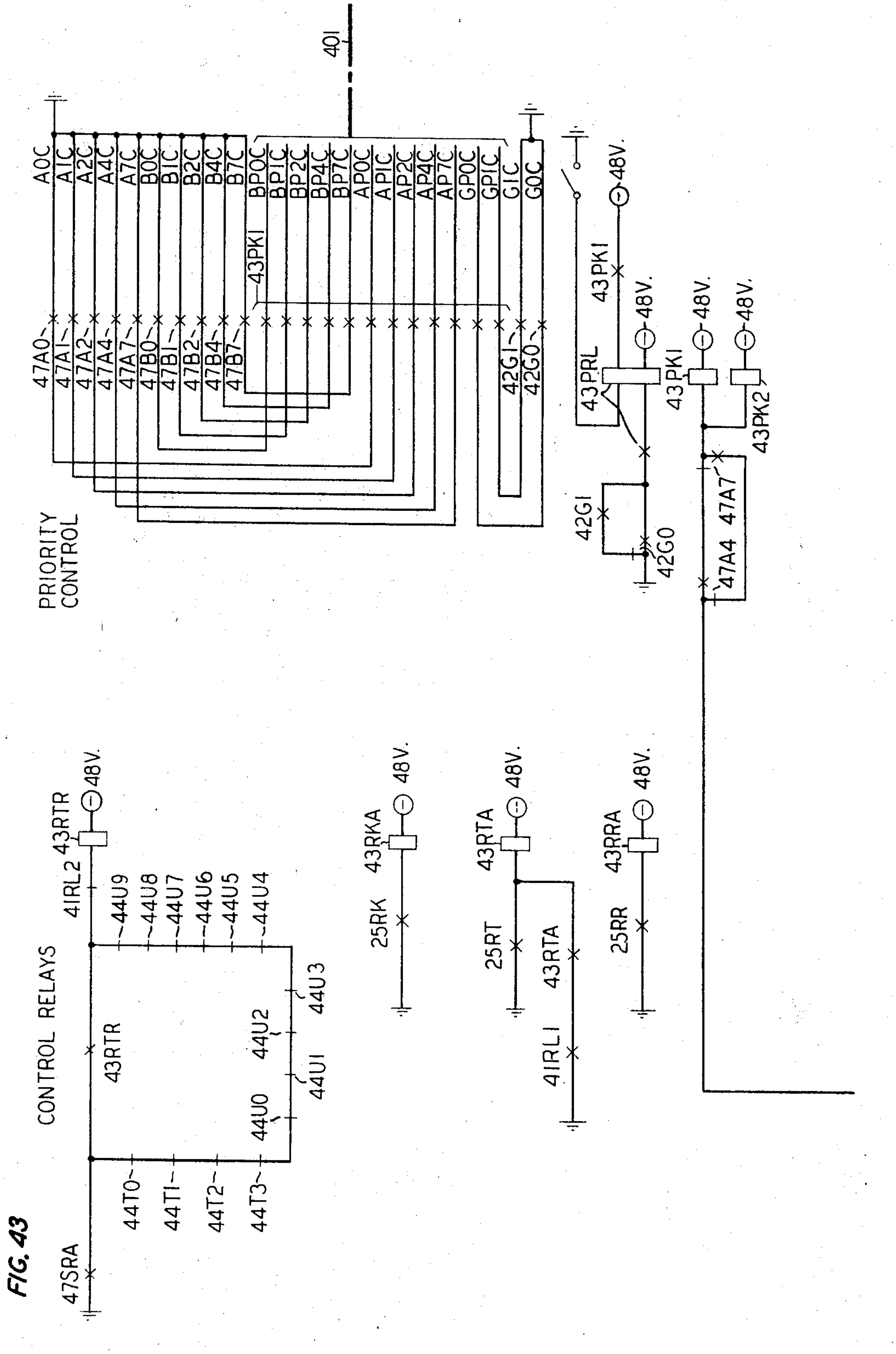
Figure 44:
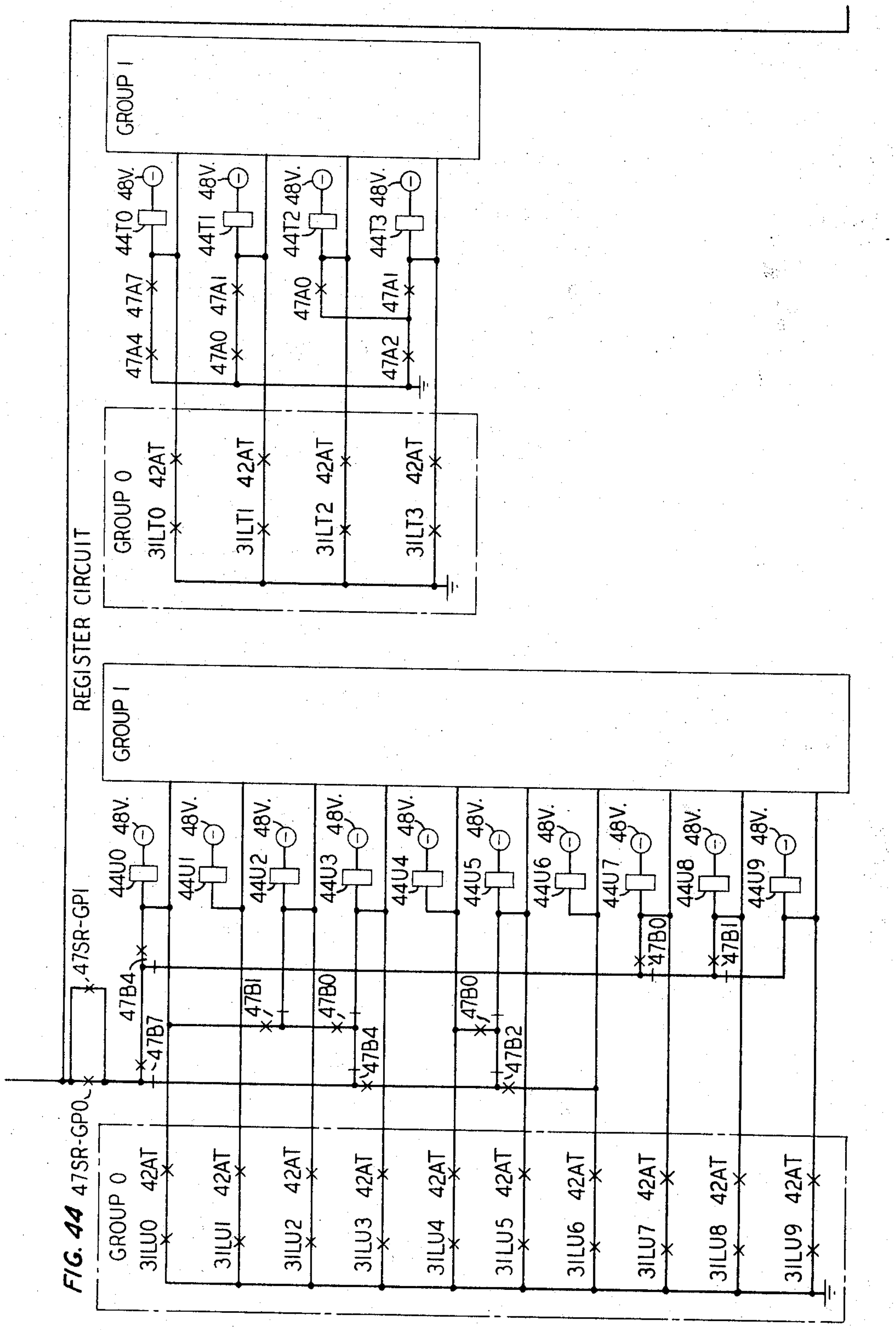
Figure 45:
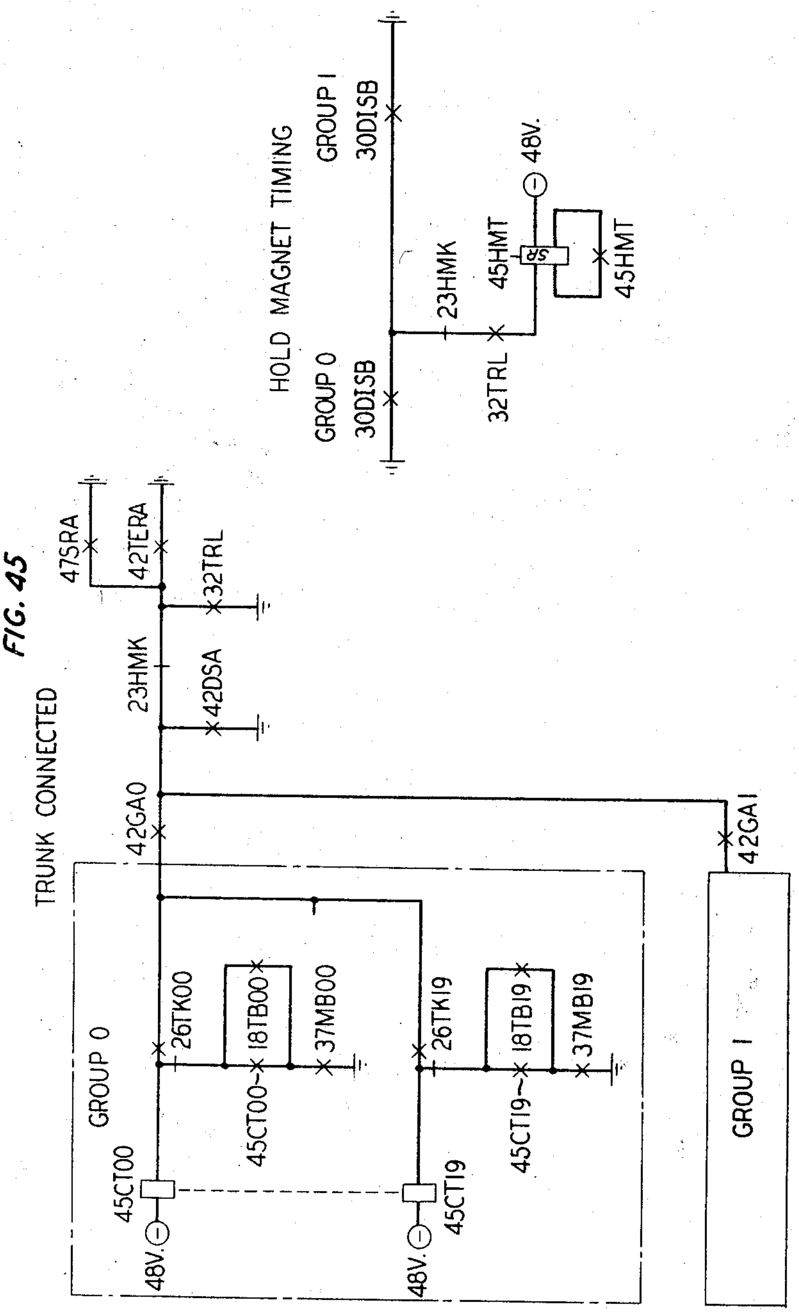
Figure 46:
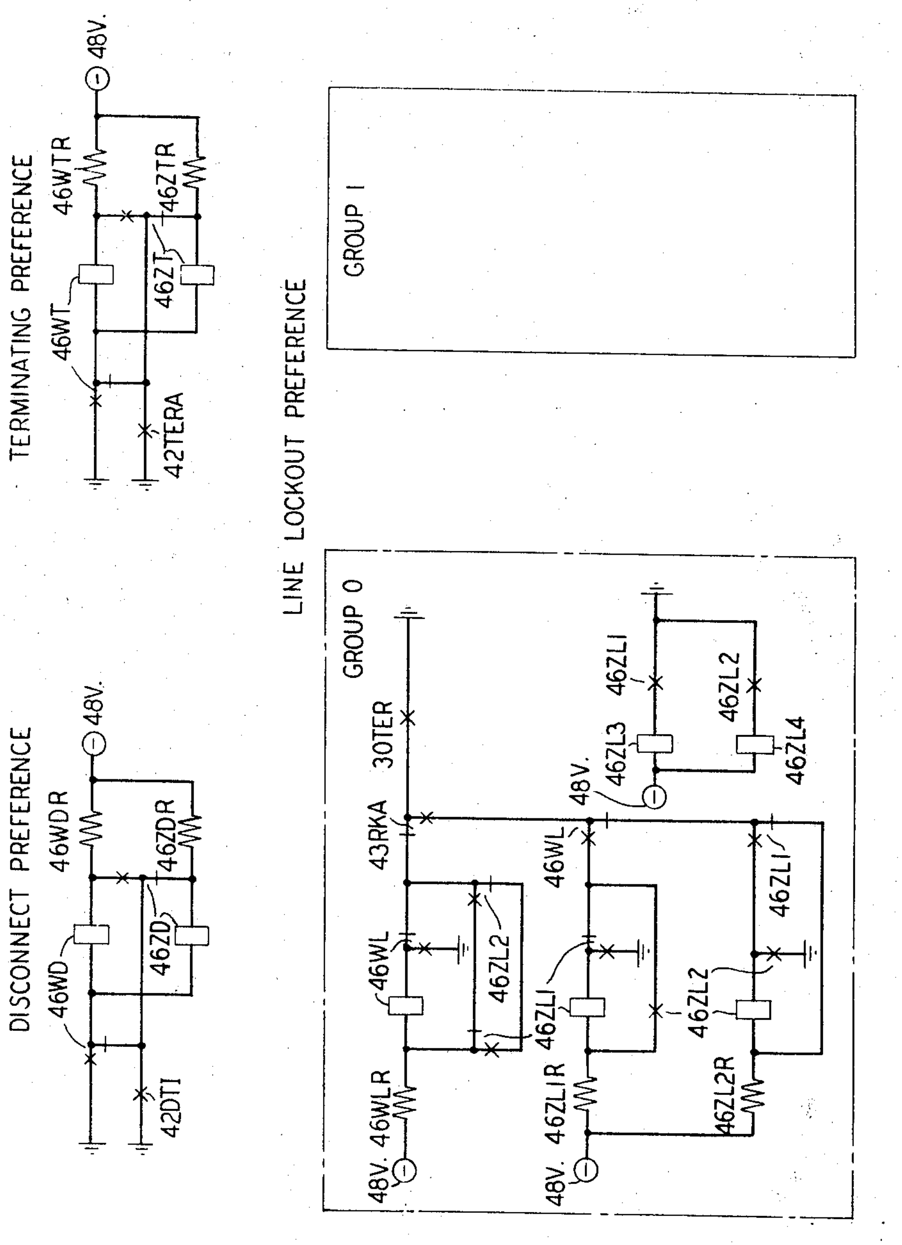
Figure 47:
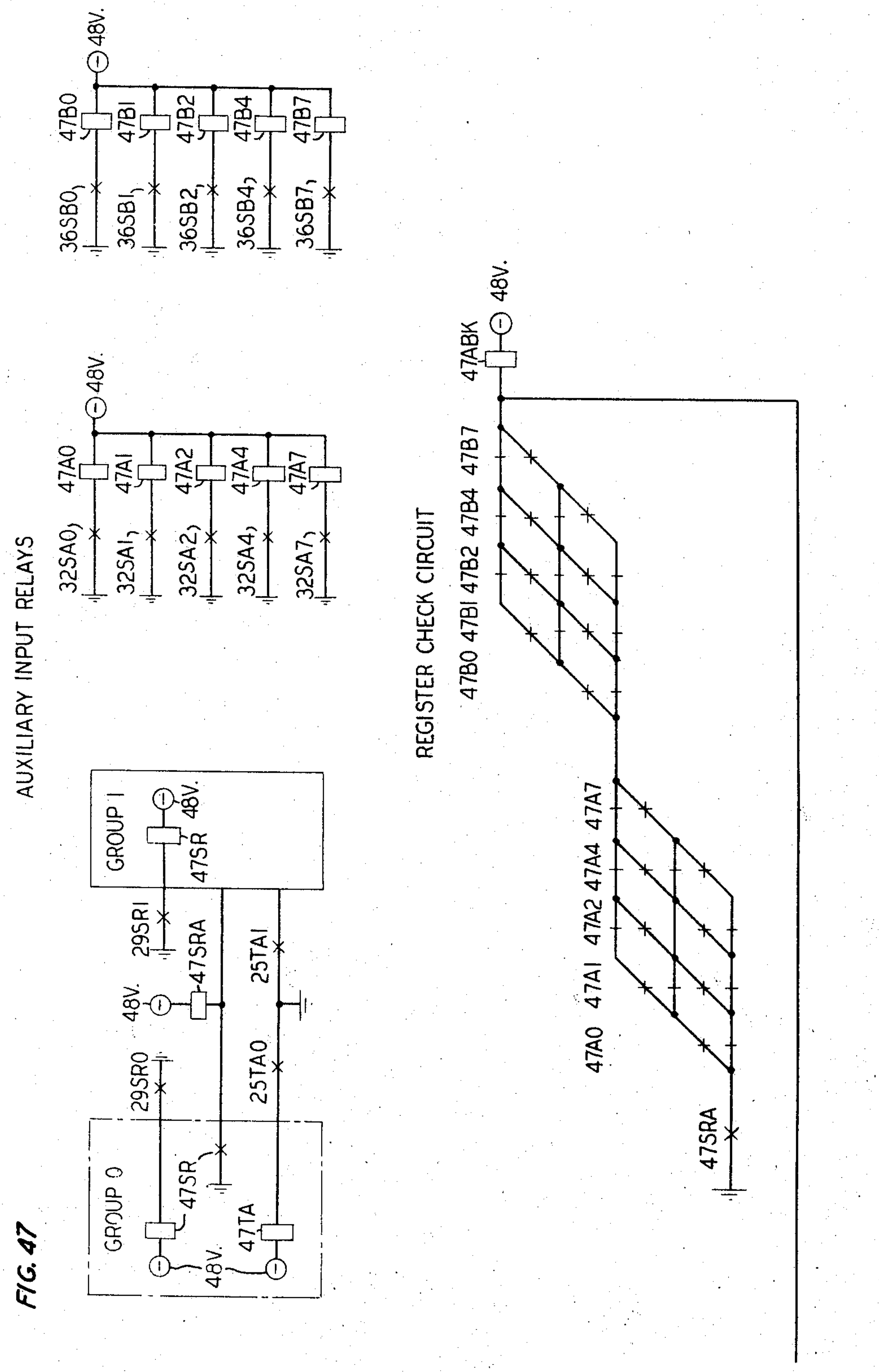

FIG. 3 discloses an additional portion of the remote unit switch as well as a group of line relays individual to the customer lines;

FIG. 4 shows a portion of the remote unit switch and the "theoretical" line relays associated with priority calls;

FIG. 5 shows a further portion of the line switch at the remote unit as well as additional line relays individual to the customer line;

FIG. 6 includes the select and hold magnet circuits for operating the crossbar switches of FIGS. 2–5;

FIG. 7 includes a line lockout circuit for identifying the line relays and "theoretical" relays;

FIG. 8 includes a portion of the shift register circuit at the remote unit;

FIG. 9 includes control flip-flops indicative of service request and terminating calls;

FIG. 10 includes the register circuit for storing the identification of the line as identified by the circuitry of FIG. 7 and also for storing a trunk identification;

FIG. 11 includes the checking circuitry for the hold magnets of FIG. 6 as well as the control relays for determinating the direction of current through the hold magnets;

FIG. 12 includes an additional portion of the shift register and the register output relays;

FIG. 13 includes the clock pulse counter which records the number of operations of the multivibrator of FIG. 17;

FIG. 14 includes checking circuitry for the register of FIG. 10;

FIG. 15 illustrates in block outline the receiving equipment for detecting signals incoming from the control unit;

FIG. 16 shows in block outline the sending circuitry for delivering control signals from the remote unit to the central office control unit;

FIG. 17 shows the clock control circuitry for operating the shift register of FIGS. 8 and 12;

FIGS. 18–47 and FIG. 65 show the control unit equipment of the concentrator;

FIG. 18 shows a portion of the 6-wire crossbar switch as the control unit;

FIG. 19 shows an additional portion of the crossbar switch as well as the equipment for opening the sleeve conductor of selected trunks to simulate disconnect calls;

FIG. 20 shows a further portion of the crossbar switch at the control unit and also the sleeve relays individual to the customer lines;

FIG. 21 shows the remainder of the crossbar switch as well as indicating the corresponding switch for group 1 in outline;

FIG. 22 includes the select magnets and hold magnets for the crossbar switch of FIGS. 18–21;

FIG. 23 includes the hold magnet checking circuitry and hold magnet current direction circuitry;

FIG. 24 shows the send circuits for group 0 and group 1 in outline form;

FIG. 25 shows the receive circuits for group 0 and group 1 in outline form;

FIGS. 26 and 27 include the trunk selection circuitry for selecting an idle trunk;

FIG. 28 shows the clock pulse counter for counting the cycles of operation of multivibrator 33K;

FIG. 29 includes the control flip-flops indicative of service requests and terminating calls at both remote units;

FIG. 30 shows the circuitry for allocating preference among different types of calls;

FIG. 31 shows the identification circuitry for identifying lines associated with the sleeve relays of FIG. 20;

FIG. 32 shows a portion of the shift register circuitry at the control unit;

FIG. 33 shows the clock control circuitry for operating the shift register;

FIG. 34 includes circuitry for initiating testing;

FIG. 35 includes trunk preference circuitry;

FIG. 36 shows the remaining portion of the shift register at the control unit;

FIG. 37 includes the trunk group busy circuitry at the control unit;

FIGS. 38, 39 and 40 include the buffer facilities between electromechanical equipment and the shift register;

FIG. 41 includes the release circuitry;

FIG. 42 includes the checking circuitry at the line identification;

FIG. 43 includes the priority control circuitry for priority calls;

FIG. 44 includes a register circuit for the line identification;

FIG. 45 includes the cut-through relays;

FIG. 46 includes preference circuits;

FIG. 47 includes checking circuitry for the register of FIG. 44;

FIG. 48 indicates the manner in which FIGS. 2–47 and 65 may be arranged to conveniently disclose the present invention; and FIGS. 49–64 and 49A–64A include the details of equipment shown in outline form in FIGS. 2–47 and the respective symbolic representations.

Figure 65:
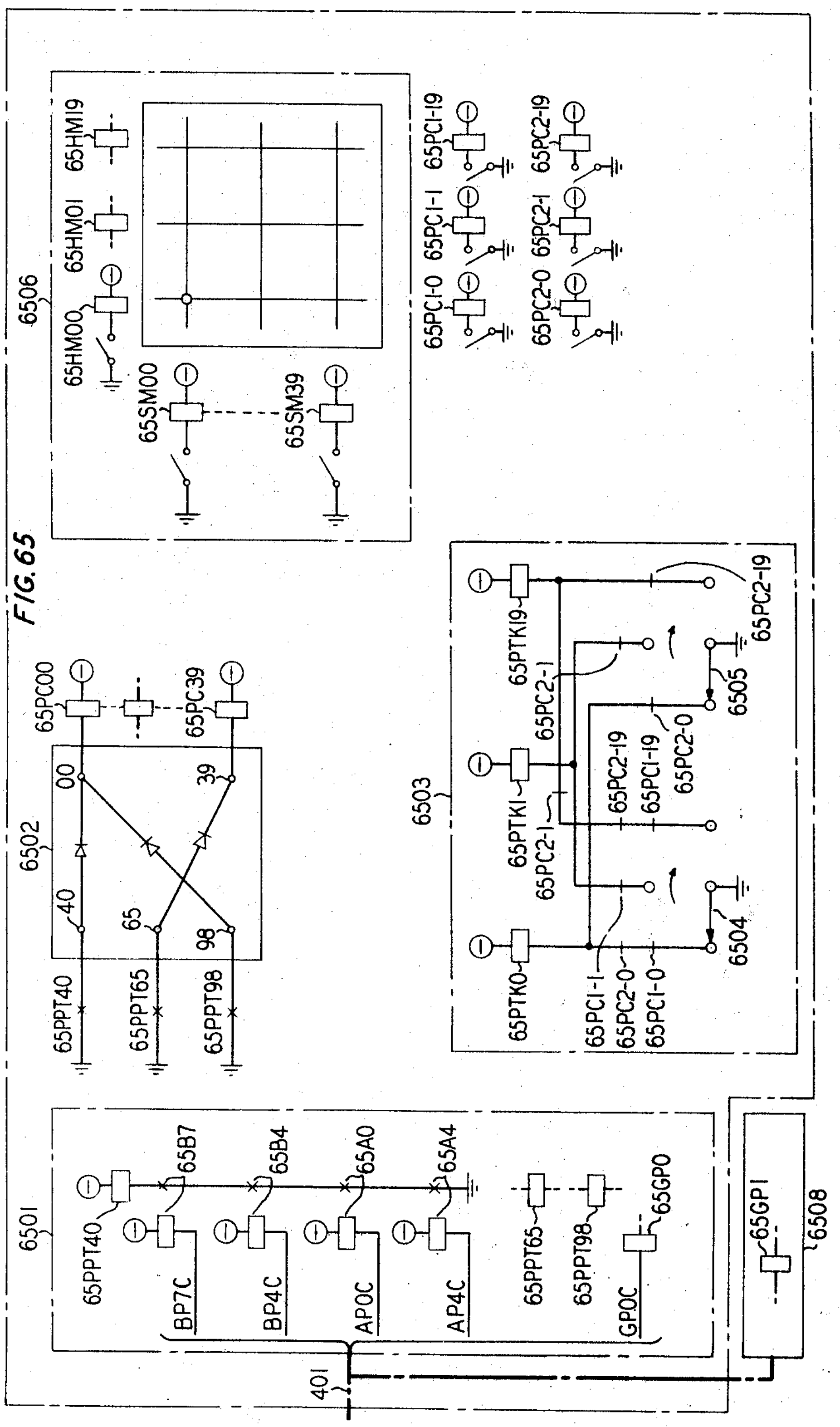
Figure 66:
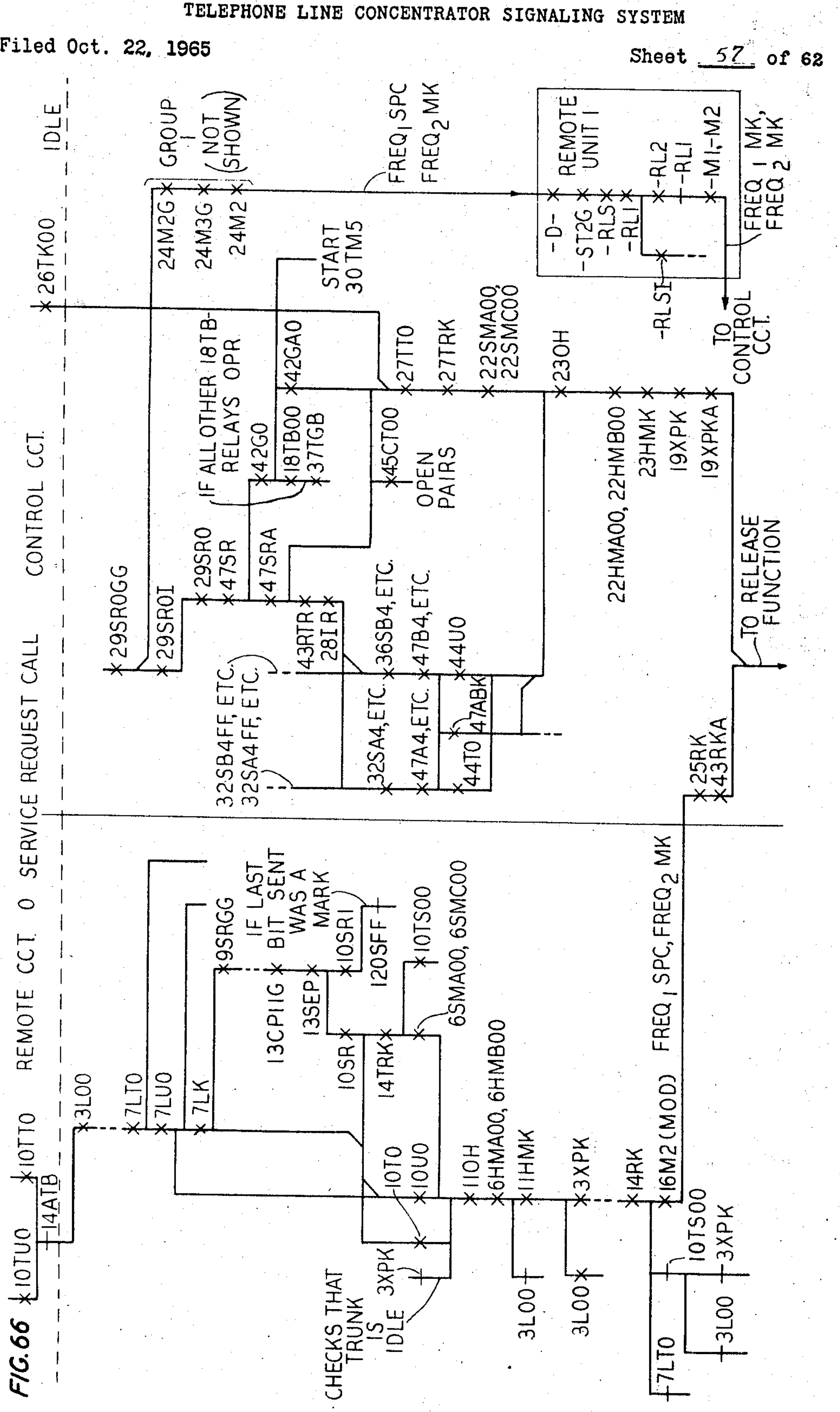
Figure 67:
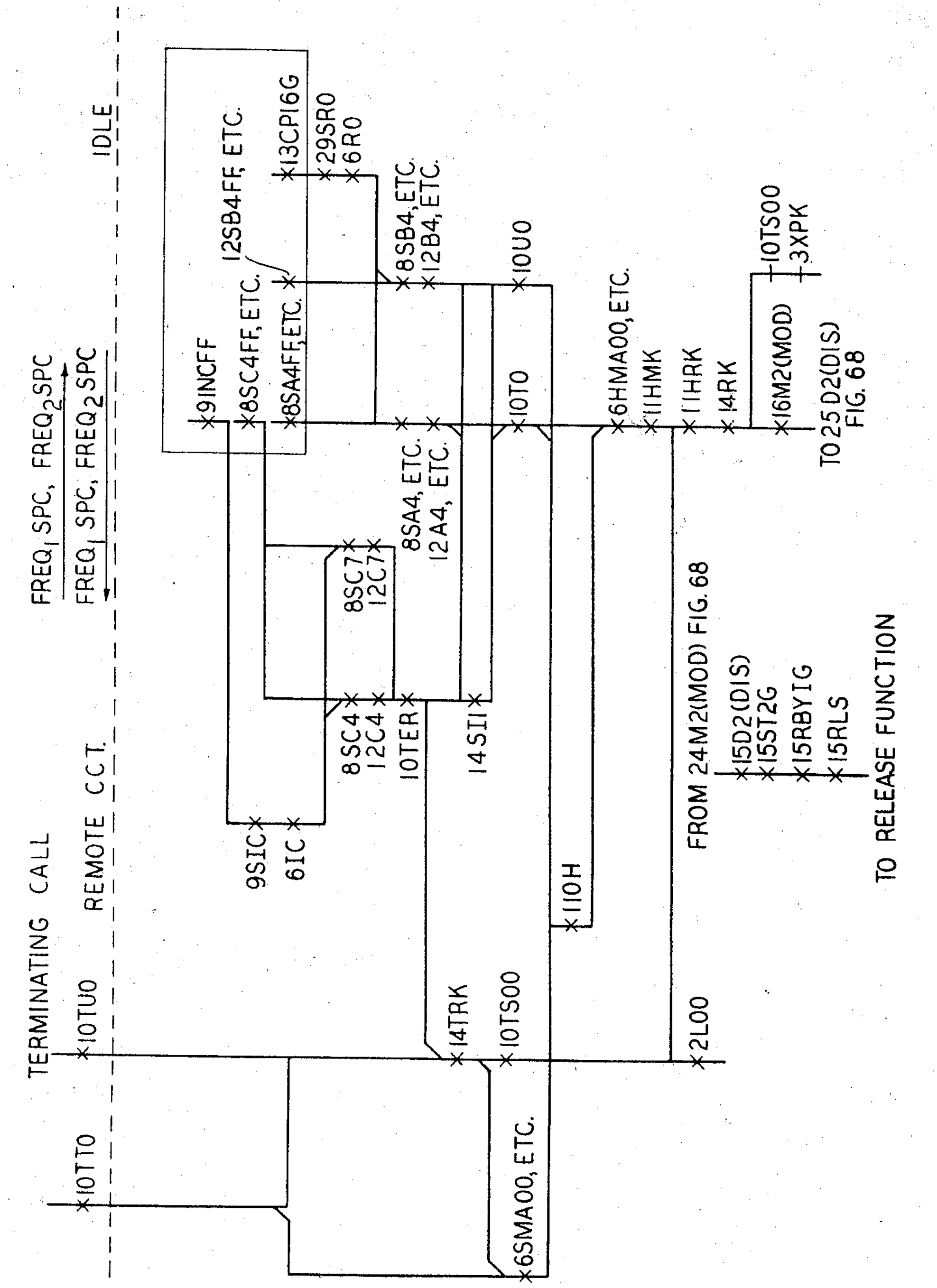
Figure 68:
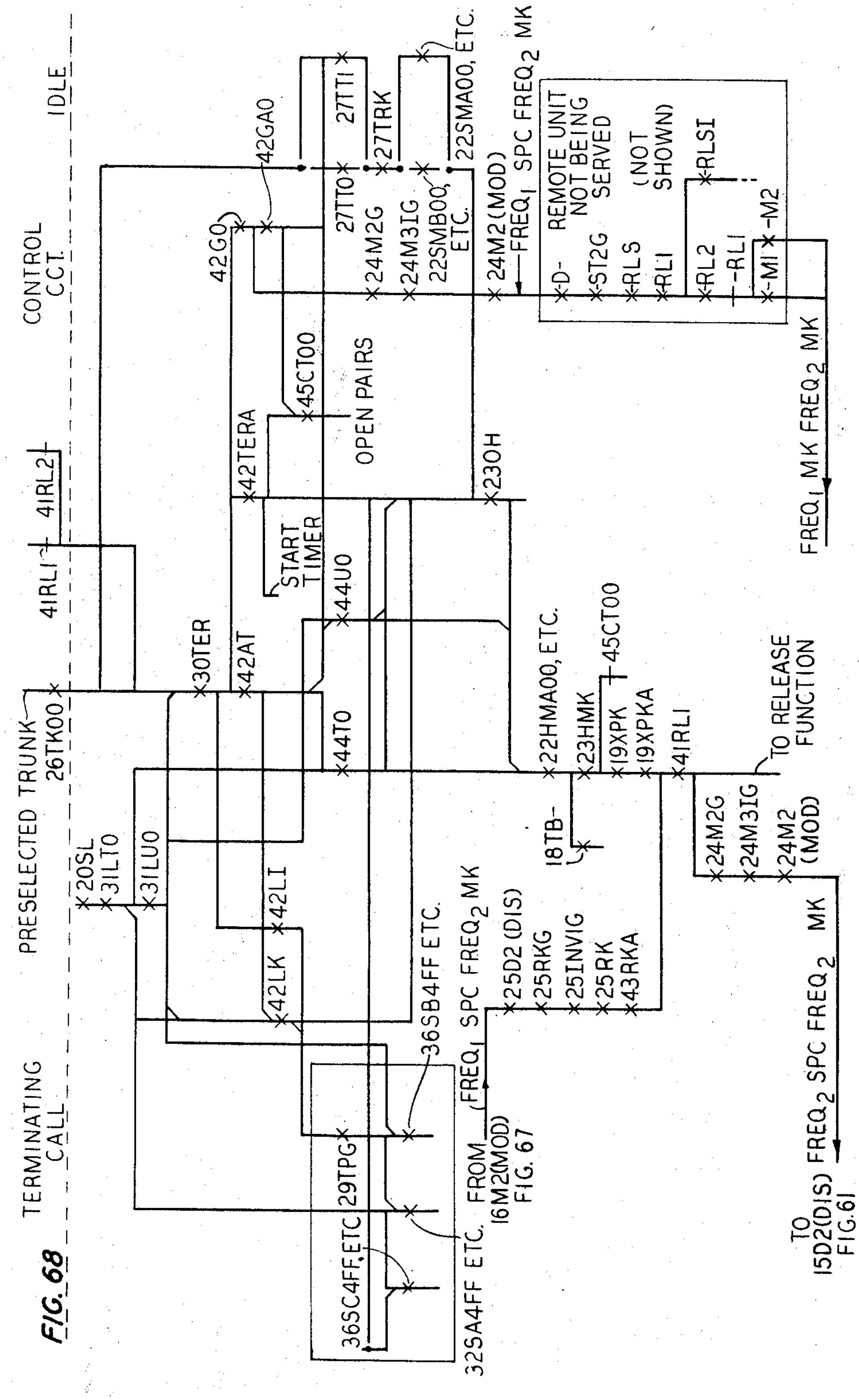
Figure 69:
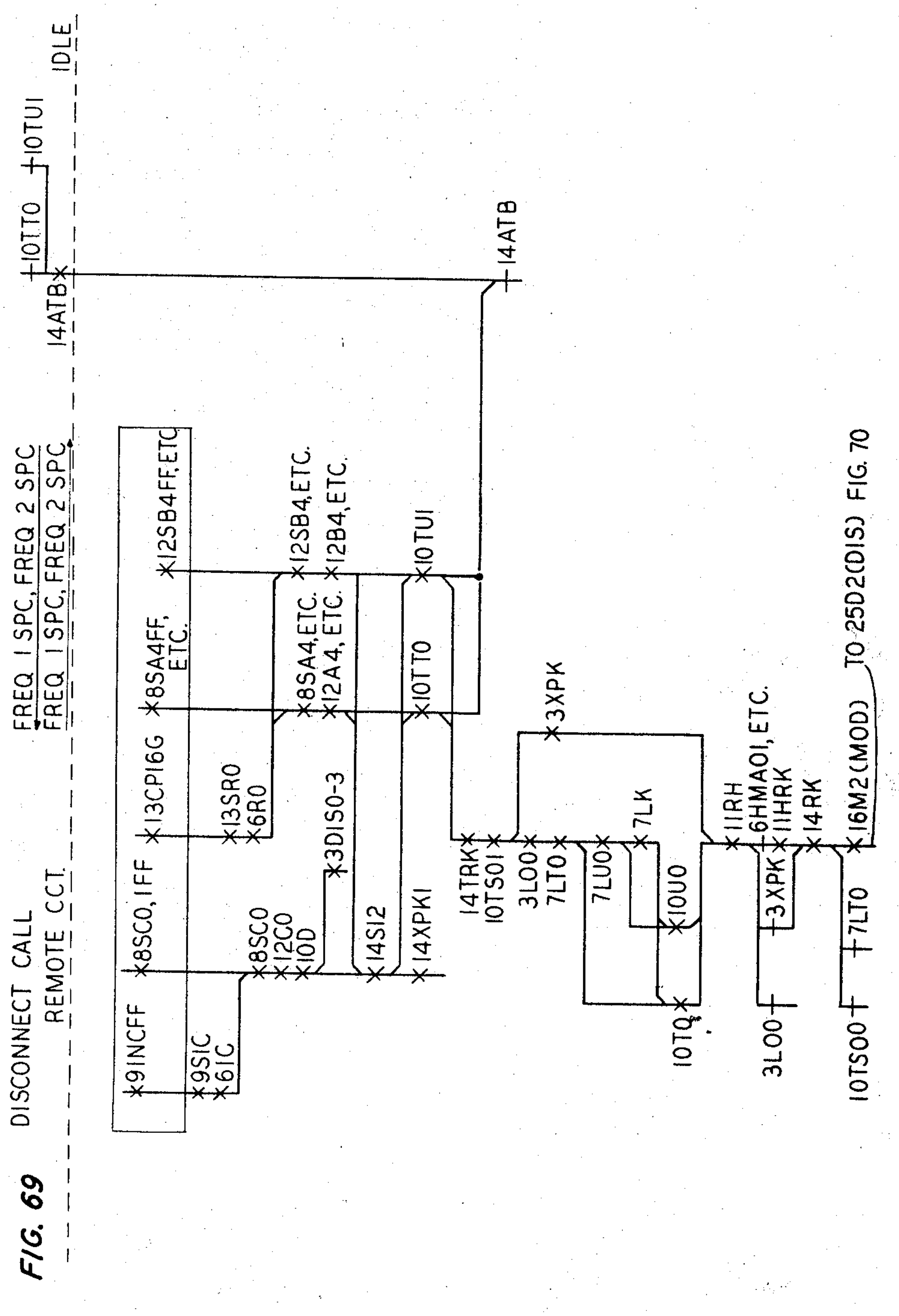
Figure 70:
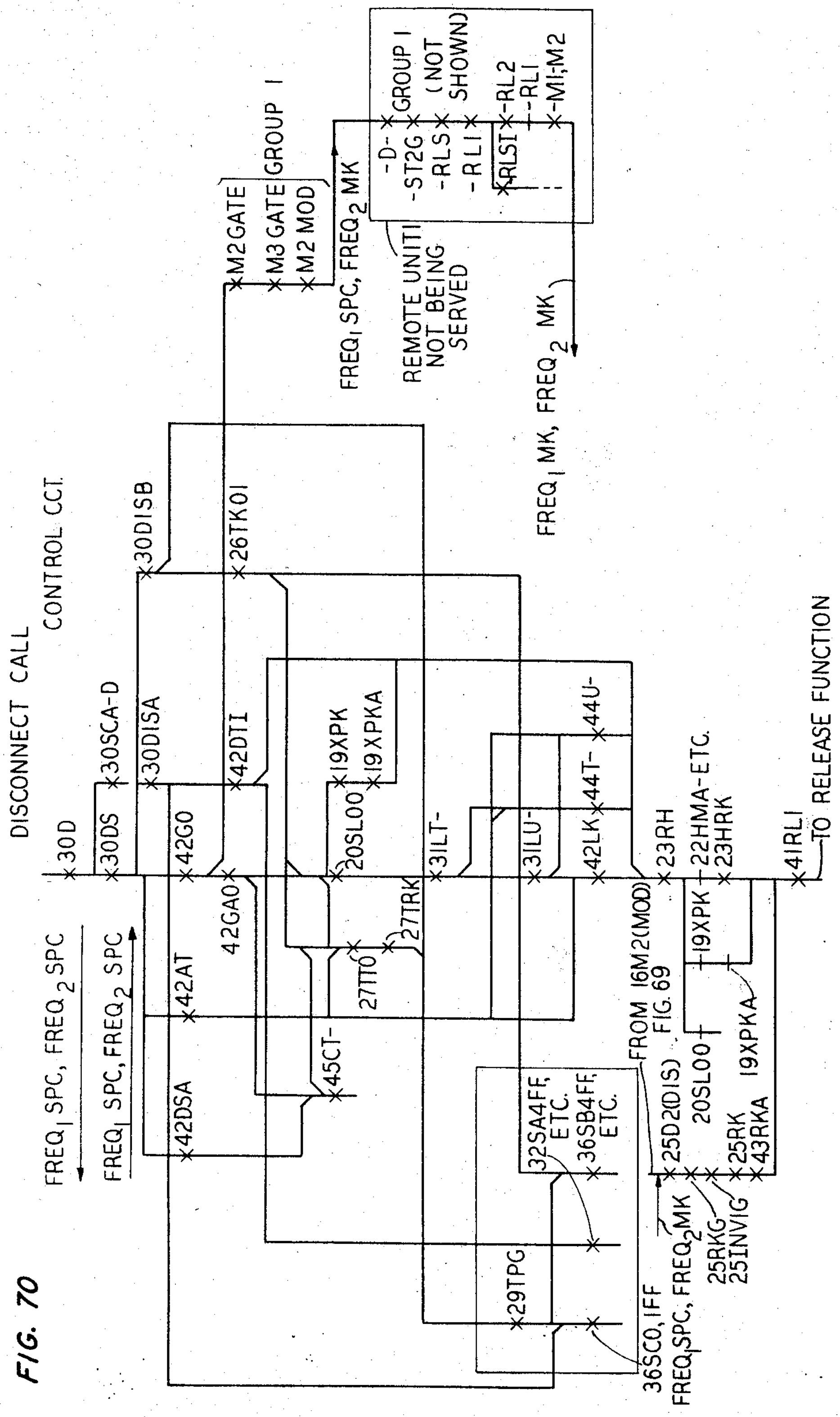
Figure 71:
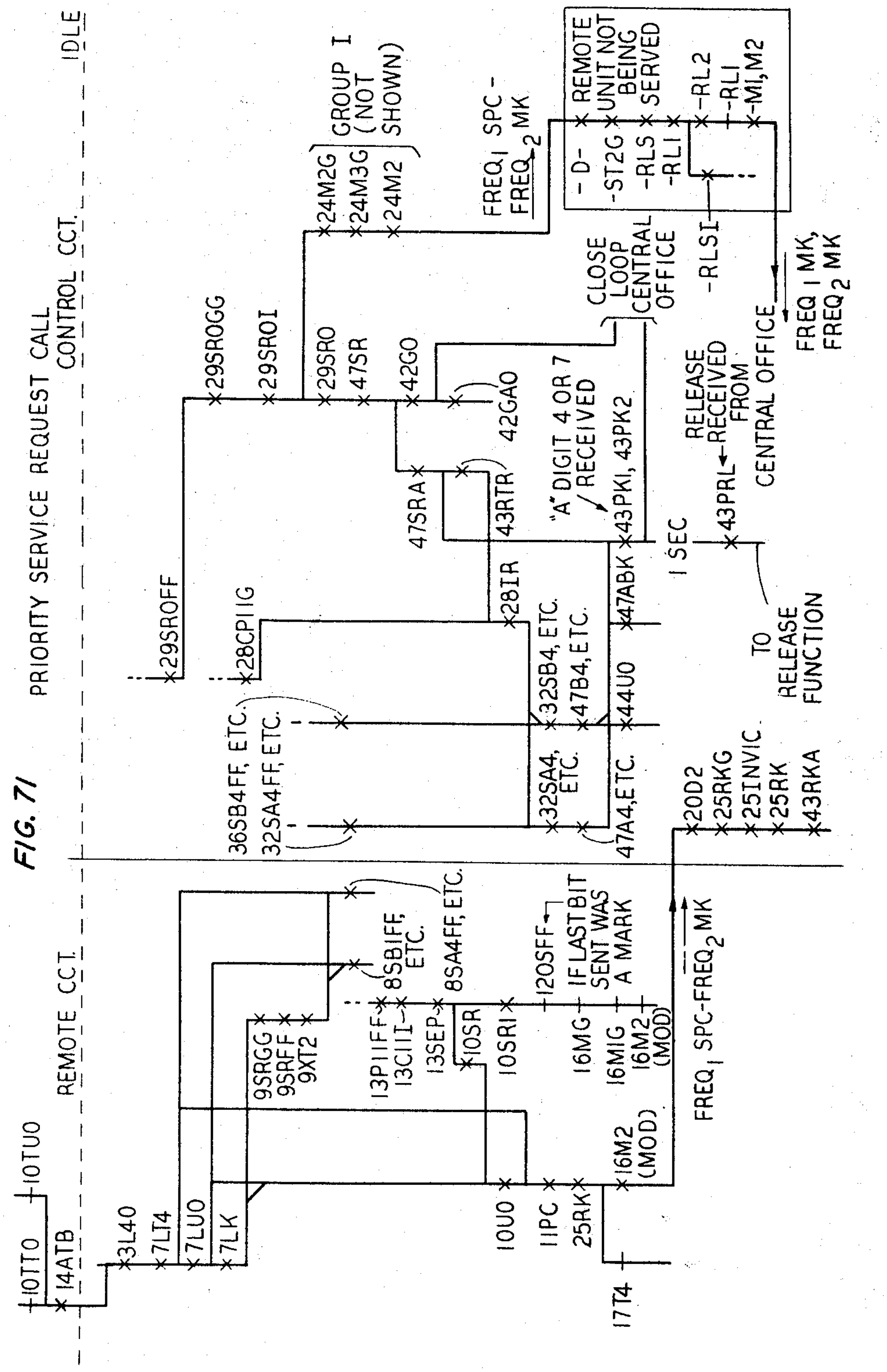

FIG. 65 includes priority call control equipment responsive to priority class calls;

FIGS. 66–71 illustrate the sequence of operation of the equipment of FIGS. 2–47.

In disclosing the invention the subject matter has been generally described and then described in detail as follows:

INDEX

1. *General description—General description of remote unit*
   - 1.1 Line and Line Switch Circuit
   - 1.2 Register Circuit
   - 1.3 Checking Circuit
   - 1.4 Signal Control Circuit
   - 1.5 Select and Hold Magnet Operation
   - 1.6 Shift Register Circuit
   - 1.7 Release Circuit
   - 1.8 Signal Circuit
   - 1.9 Sequence Control Circuit
2. *General operation*
   - 2.1 Service Request Call
   - 2.2 Terminating Call
   - 2.3 Disconnect Call
   - 2.4 Priority Service Request Call
3. *Detailed description of major components*
   - 3.1 Line and Trunk Switching
     - 3.11 Remote Unit
     - 3.12 Control Unit
   - 3.2 Signaling
     - 3.21 Send Circuit, Modulator
     - 3.22 Send Circuit, Filter and Power Amplifier
     - 3.23 Receive Circuit, Filter and Limiter
     - 3.24 Discriminator
     - 3.25 Signal Present Detector
     - 3.26 Guard Interval Timer
   - 3.3 Synchronization
     - 3.31 Shift Pulse
     - 3.32 "Write" Pulse
     - 3.33 Call Progress Pulse
   - 3.4 Trunk Selection
   - 3.5 Line Identification
   - 3.6 Electronic Logic Circuitry
     - 3.61 Basic Or-Not Gate
     - 3.62 Flip-Flop
     - 3.63 Shift Register
     - 3.64 Monopulser
     - 3.65 Oscillator
     - 3.66 Binary Cell
4. *Detailed description of service request call*
   - 4.1 Line Relay and Lockout Relay Operation
   - 4.2 Transfer of Information to Shift Register
   - 4.3 Transmission of Line Identification to Office
   - 4.4 Reception of Line Identification at Office Control Unit
   - 4.5 Select and Hold Magnet Operation
   - 4.6 Release of Control Unit
5. *Terminating call*
   - 5.1 Transmitting Line Information
6. *Disconnect call*
7. *Priority service request call*

1. *General description*

Figure 1A:
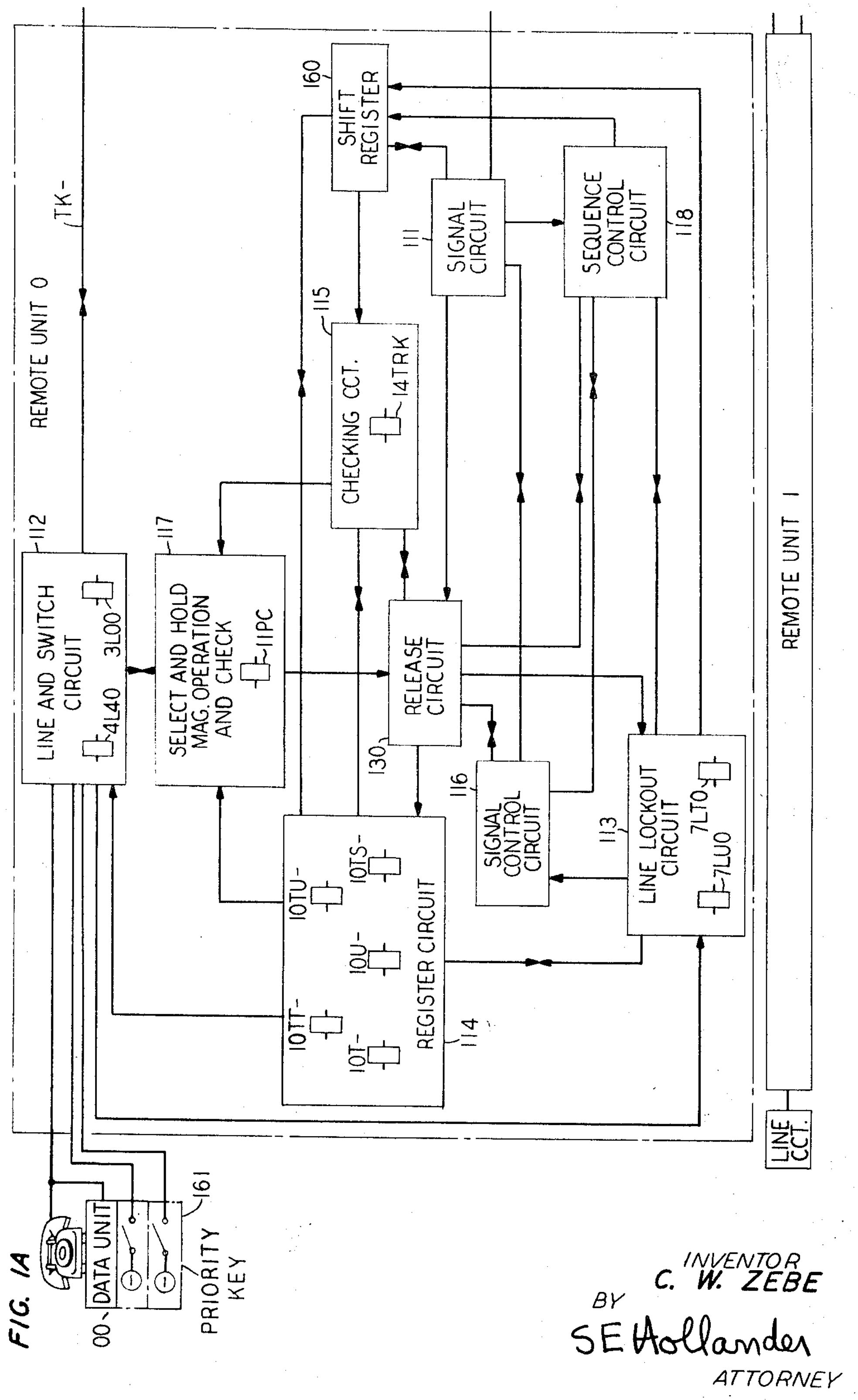
Figure 1B:
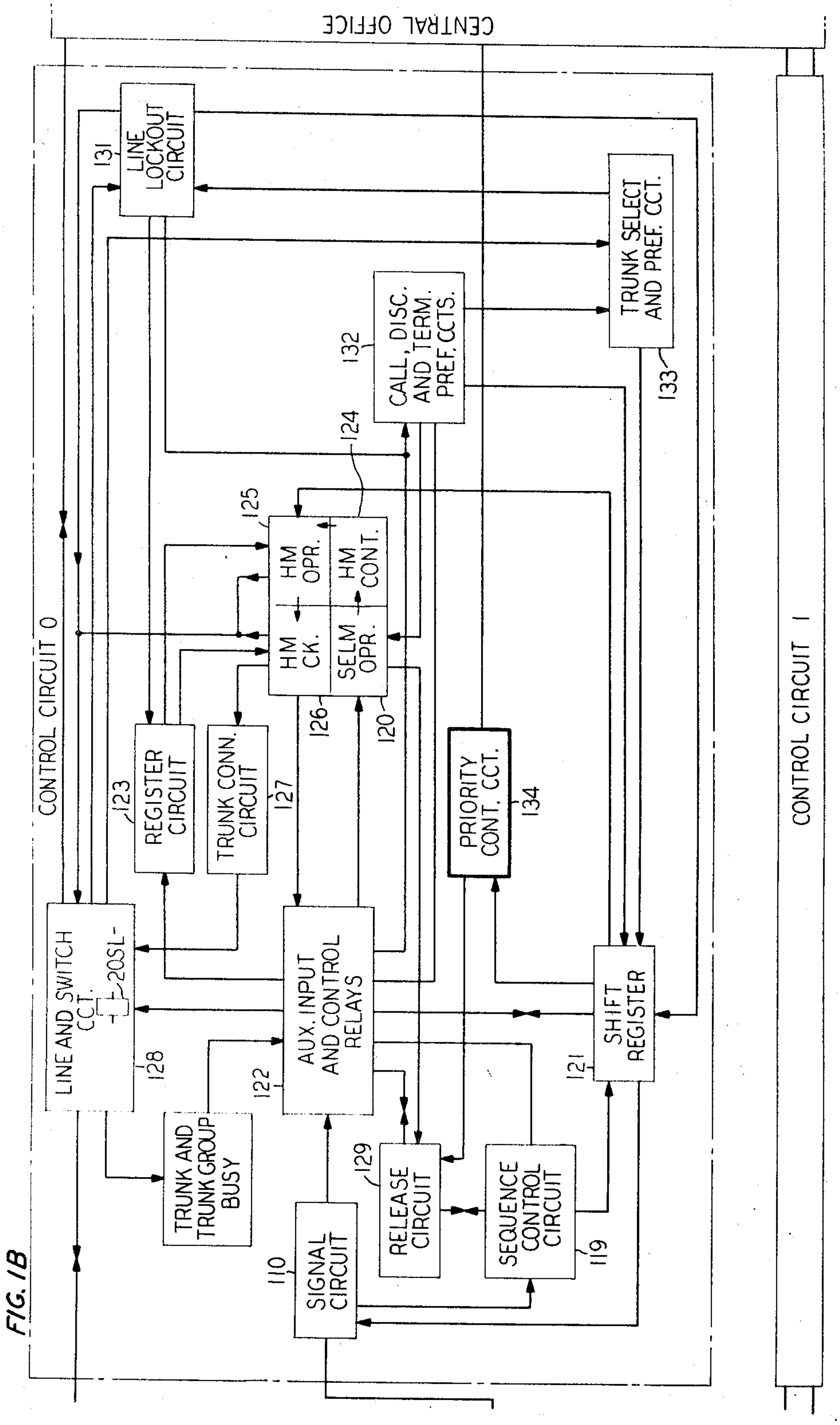

As shown in FIGS. 1A and 1B, a 4-wire line concentrator having an illustrative 40-line capacity at each remote unit 0 and 1 is shown. Essentially the concentrator includes remote units 0 and 1 shown in FIG. 1A and a control unit in FIG. 1B. Both the remote unit and the control units include magnetically latching crossbar switches described in further detail herein. The signaling circuit 110 uses frequency shift pulsing for communication with the corresponding signaling circuit 111 at the remote unit.

Certain details of the structure and operation of the instant concentrator arrangement have been omitted to preserve clarity. Reference may be made to a patent, No. 3,335,230, issued Aug. 8, 1967 to J. F. Rettig et al., now Patent No. 3,335,230, for a more comprehensive explanation of the operation of such equipment.

Reference may be made to an application Ser. No. 501,878 of G. F. Clement et al. relating to the extension of priority calls from the central office to the concentrator filed on even date herewith. Moreover, applications Ser. Nos. 500,774, now Patent No. 3,419,683, and 501,882 of H. J. Michael et al. and C. E. Morse et al., respectively, both filed on even date herewith disclose related equipment some of which is not shown herein in detail.

As shown herein in further detail, the concentrator is arranged to initiate priority calls. Illustratively, priority lines extend from the substations to the remote unit of the concentrator, wherein they are terminated on "theoretical" line circuits (see relays 4L40–4L99). These circuits are termed "theoretical" since no physical appearance of corresponding lines in the switching network 112 is provided. The "theoretical" line relays are used for identifying the degree of priority and the particular line involved in a priority call.

*General description of remote unit*

The component circuits for the remote units will be reviewed prior to a general description of operation. Related facilities are available at the control unit as will be apparent herein.

1.1 Line and line switch circuit

As shown in block outline in FIG. 1A and in detail in FIGS. 2–5, the line and switch circuit 112 includes 40 physical relays and 60 theoretical line relays. The physical lines are coupled to four magnetically latching crossbar switches. Lines are included on the switch verticals and trunks on the horizontals. Full access is provided. The line lock-out circuit 113 includes relay lock-out circuits for the physical lines and for the theoretical lines (see FIG. 7). Two groups of identical relays 7LT– and 7LU– are energizable to uniquely identify each calling line.

1.2 Register circuit

This circuit comprises register relays 10T– and 10U– which are activated from the line lock-out circuit or from the shift register circuit to store the line identity until it is used in the call sequence. The trunk number register relays 10TT– (tens) and 10TU– (units) are activated from the shift register on disconnect calls and store the number of the preselected trunk. On the next call, the relays 10TS– corresponding to the preselected trunk is operated to initiate an early dial tone start over the selected trunk prior to the closure of the remote unit crosspoints. For further details concerning this type of operation, reference may also be made to a patent, No. 3,230,313, issued Jan. 18, 1966 to G. Fishman et al.

The class of call register relays 10TER, 10D etc. (see FIG. 10) for storing an indication of terminating and disconnect calls, are operated by the shift register circuit to indicate the type of call in effect.

1.3 Checking circuit

This circuit 115 provides for two-out-of-five code checks on the operation of relays which are energized from the shift register output. Relay 14TRK checks the registration of the correct trunk number by insuring that one relay 10TT– and one relay 10TU– have operated.

1.4 Signal control circuit

This circuit 116 is arranged to initiate a path for passing line and trunk information between the register circuit 114 and the shift register circuit 160. Moreover, the control circuit 116 governs transmission of check signals to the control unit in response to the completion of functions in the call sequence.

1.5 Select and hold magnet operation

In circuit 117 relay equipment is provided together with the appropriate select and hold magnets for operating the crosspoints. Since the hold magnets are magnetically latching, arrangements are provided for directing current through the hold magnets in both directions. Checking relays are utilized to verify the operation or released condition of the hold magnets. In priority calls, the select and hold magnet operations are by-passed and the priority call registration relay 11PC indicates to the control circuit 116 that a check signal may be sent to the control unit of FIG. 1B.

1.6 Shift register circuit

The shift register circuit includes a group of relays that operate in response to the operation of the shift register to record the type of call, line identity or trunk numbers. The shift register circuit includes monopulsers, gates, flip-flops and reed relays explained and shown in detail herein. When calls are initiated by the control unit the information is received serially from the signaling circuit and delivered to the register equipment 114 on a parallel basis. When calls are originated from the remote unit, the line information is transferred from the register 114 to the shift register 160 on a parallel basis and delivered to the signal circuit 111 in serial form.

1.7 Release circuit

This circuit includes relays for recording the origin of the call as being in either the remote unit or the control unit and additional relays for initiating and checking the release of the circuits at the remote unit. In addition equipment is provided for delivering a first release signal to the control unit when these functions have been completed. Final release of the remote unit is effected upon receipt of a subsequent signal from the control unit.

1.8 Signal circuit

The signal circuit 111 is composed of two major units including the send circuit and the receive circuit explained herein in detail. Frequency shift pulsing is used to transmit information between the remote and control units. Two separate frequency bands are used for signaling. The lower frequency band sometimes hereinafter referred to as *f*1 is used to transmit between the remote and control units. This band includes a space frequency (*f*1*s*) of 1070 c.p.s. and mark frequency (*f*1*m*) of 1270 c.p.s. The higher frequency band *f*2 is used between the control and remote units and includes (*f*2*s*) a space frequency of 2020 c.p.s. and (*f*2*m*) a mark frequency of 2225 c.p.s.

1.9 Sequence control circuit

This circuit 118 is arranged to indicate the type of call being originated as well as controlling the clock pulse generator and the gating of information into and out of the shift register.

A 3200 p.p.s. multivibrator 17K (see FIG. 17) is utilized for timing the functioning of the shift register. Four binary counter cells 17P–BC divide the 3200 p.p.s. rate of the multivibrator to 200 p.p.s. and the counter circuit permits the selection of three pulse positions during every five milliseconds for shift register advance, writing into the shift register, and for advancing the clock pulse counter 13CTR–BC. The latter is a four-stage binary counter which records the number of times that shift, write and call progress counter advance pulses have been generated.

2. *General operation*

2.1 Service request call

It will be assumed for purposes of illustration that line 00 is initiating a call. In response to the off-hook condition a line relay 3L00 shown in detail in FIG. 3 is activated and in turn causes the operation of associated relays 7LUO and 7TLO in the line lock-out circuit 113. The latter identifies the calling line and energizes the signal control circuit 116. Moreover, after the line identification has been completed and checked, the line lock-out circuit 113 transfers the line identification to the shift register circuit 160.

The sequence control circuit 118 activates the signal circuit 111 and causes the serial transmission of the line identification from the shift register to the signal circuit which latter transmits the information serially to the control unit in an eleven bit message comprising a start pulse as well as the line tens and units digit. The start pulse is received in the control unit signal circuit 110 and delivered to the sequence control circuit 119 which controls preference. The sequence control circuit determines whether the remote unit is in group 0 or group 1, and causes a busy signal to be transmitted to the other remote unit. Moreover, the select magnet operation circuit 120 is energized and line information received by the signal circuit 110 is delivered to the shift register 121 on a serial basis.

After the line information has been transmitted, the remote unit recognizes the end of pulsing and activates register circuit 114. The latter causes the line and switch circuit 112 to place a bridge on the preselected trunk TK– to minimize dial tone delay. The checking circuit 115 causes the select magnets in circuit 117 to operate in accordance with the preselected trunk. In addition, the register circuit activates the line lock-out circuit 113 to transfer the line identity to the register circuit 114 where it is stored.

After the checking circuit 115 and the select magnets have been operated, the hold magnet associated with the calling line is operated. Thereupon a crosspoint check in the line and switch circuit 112 is made and, if satisfactory, the signal control circuit 116 is activated to cause the signal circuit 111 to transmit a ready-to-release signal to the control unit.

During the interim, the sequence control circuit 119 at the control unit recognizes the reception of the last bit of line information and causes the line number to be delivered on a parallel basis from the shift register 121 to the auxiliary input circuit 122 which in turn causes the register 123 to store the information.

Thereafter operation of a checking circuit in the shift register 121 and the registration of the line identity in the register 123 enables the hold magnet control circuit 124 which energizes the hold magnet associated with the line which was registered. Here again a crosspoint check is activated which in turn governs the trunk connected circuit 127 and prepares the control unit for the release sequence. When the trunk circuit 127 is energized, the line and switch circuit 128 is operated to connect the central office line circuit, to the selected trunk.

Reception of the ready-to-release signal from the remote unit causes circuit 122 to activate release circuit 129. Operation of the latter causes the signal circuit 110 to transmit an initial release signal to the remote unit. Thereupon release of the preselected trunk relay causes the select magnets in the control unit to release which in turn opens the operating path of the hold magnet. Thereafter the shift register 121 is cleared and the register circuit 123 is released.

The receipt of the initial release signal is recognized by the remote unit signal circuit 111 which activates release circuit 130 and causes release of the preselected trunk number in register 114. Thereafter the select magnet and hold magnet operating paths are opened and shift register 160 is released. The latter causes the release of the line lockout circuit 113 which controls the release of register 114. Release circuit 130 thereupon causes the actuation of signal circuit 111 to deliver an initial-release-completed signal. The latter is received at the control unit which initiates release of shift register 121 through release circuit 129. Thereupon signal circuit 110 delivers a final release signal to be sent to the remote unit being served and a control unit idle signal to be sent to the other remote unit.

The final release signal from the control unit is received at the remote unit and initiates the release of the control circuits 116 and 118. Thereafter, an idle signal is delivered from the remote unit to the control unit and with the control circuits at the control unit released, a new call may be served.

2.2 Terminating call

A terminating call is initiated when the office operates the sleeve relay 20SL– associated with the line being called. Thereupon the line lockout circuit 131 is activated to identify the line tens and units digits of the calling line. Moreover, the call preference circuit 132 prevents other calls from being initiated. Circuit 122 now transfers the line identification from lockout circuit 131 to register circuit 123 and shift register circuit 121. Moreover, the sequence control circuit 119 is activated to transmit from the shift register 121 to the signal circuit 110, the line identification and the class of call preceded as usual, by a start pulse.

During the transmission of the line identity, circuit 122 energizes trunk select circuit 133 to operate the select magnets associated with the preselected trunk in circuit 120. Thereupon circuits 124 and 125 are operated in accordance with the line identity stored in register circuit 123. Operation of the hold magnet associated with the called line is checked in circuit 126.

At the remote unit, the start pulse is recived by the remote unit signaling circuit 111 and delivered to the sequence control circuit 118. Thereafter the class of call and line identification information is transmitted from the signal circuit 111 to the shift register circuit 160. When the class of call information has been received, register 114 records the terminating call indication and causes operation of the preselected trunk check relay. The select magnets in circuit 117 are operated in accordance with the preselected trunk. The sequence control circuit 118 recognizes the last bit of information and causes the registration of the line identity in the shift register 160. Thereupon the line identity is transferred to register 114 to govern the operation of the hold magnet in circuit 117 associated with the called line. The hold magnet operation is checked and the signal control circuit 116 governs the transmission of a ready-to-release signal by the signal circuit 111.

The control unit receives the ready-to-release signal and causes the control relays in circuit 122 to activate release circuit 129. The latter causes the signal circuit 110 to send an initial release signal to the trunk circuit 133. Thereupon the release functions are similar to those described above for a service request call.

2.3 Disconnect call

After every service request or terminating call a disconnect call is initiated in the control unit by the operation of a disconnect relay in circuit 132. Thereupon circuit 132 causes the operation of the preferred trunk relay in trunk select circuit 133 which transfers the preselected trunk number of the shift register circuit 121. The sequence control circuit causes the shift register 121 to store the class of call (disconnect) and the selected trunk identity. Thereafter the shift register 121 delivers the information serially to signal circuit 110. Trunk select circuit 133 also operates the line sleeve relay 20SL– in the line and switch circuit 128 associated wtih the line connected to the selected trunk. This results in the identification of the line by lockout circuit 131 in the manner described for a terminating call. Thereafter hold magnet control circuit 124 is actuated. Since a disconnect call is involved, the hold magnet winding is energized in a direction to release the hold magnet.

In the interim, the start pulse was received by the remote unit signal circuit 111 and delivered over sequence control circuit 118 to the shift register 160. When the information has been received, signal control circuit 116 causes registration of the trunk identity in the register 114. The checking circuit 115 thereupon causes the line relay associated with the line connected to the preselected trunk to be operated and in turn to actuate line lockout circuit 113. The latter identifies the line in a manner similar to that described for a service request call. The register 114 thereupon records the line identification and governs the circuit 117 to release the hold magnet associated with the registered line. Thereupon the ready-to-release signal is delivered to the control unit and the release sequence is similar to that described above for a terminating call with the exception that the preselected trunk number remains recorded in register 114.

2.4 Priority service request call

This type of call is initiated in a remote unit when all the trunks are busy and the subscriber presses his priority service key 161. A priority relay (e.g., 4L40) is operated in circuit 112 and causes the actuation of the line lockout circuit 113. The later identifies the priority line and effects the transfer of this information to the shift register circuit 160. The sequence control circuit 118 activates signal circuit 111 to deliver the priority service line identification to the control unit.

At the control unit, the line identification is received by the signal circuit and delivered to the shift register 121. When the final bit of line identification has been transmitted, the remote unit activates register cricuit 114. Thereupon the priority line identity is stored in register 114 and causes the signal control circuit 111 to govern the transmission of the ready-to-release signal. In the interim the sequence control circuit 119 at the control unit causes the line number to be delivered from the shift register 121 to circuit 122 whereupon register 123 stores the priority line identity. Priority control circuit 134 closes a path to the central office to permit the office to identify the line. When the office has identified the line and delivered a release signal to the priority control circuit 134, the release circuit 129 is activated to cause the signal circuit 110 to transmit the initial release signal to the remote unit. The release sequence is similar to that described above except that the select and hold magnets are not activated or released.

Thereafter the central office selects a trunk on which a disconnect call is simulated. When the disconnect call has been completed in the manner described above, the central office initiates a terminating call to the line requesting service. Through the terminating call, the line is connected to a register to permit the priority customer to dial.

To effect these operations the central office opens the sleeve of the trunk carrying a lower priority call and grounds the sleeve of the line requesting priority service. The concentrator then disconnects the lower priority line from the released trunk and connects the idle trunk to the line requesting the priority call.

3. *Detailed description of major components*

3.1 Line and trunk switching 3.11 Remote unit

Referring to FIGS. 2–5 at the remote unit and corresponding FIGS. 18–21 at the control unit, crosspoint networks of the magnetic latching type described in an article entitled "Magnetic Latching Crossbar Switches" in the Bell System Technical Journal, September 1960 at page 1351, are utilized. The magnetic latching facilities include hold magnets (vertical magnets) which remain operated until deliberately released. No additional power drain ensues once the vertical magnets have been operated. Since the delayed disconnect arrangement described generally above, wherein 19 of the 20 trunks normally will be connected to lines at all times, is utilized, the power savings are apparent.

Figure 2:
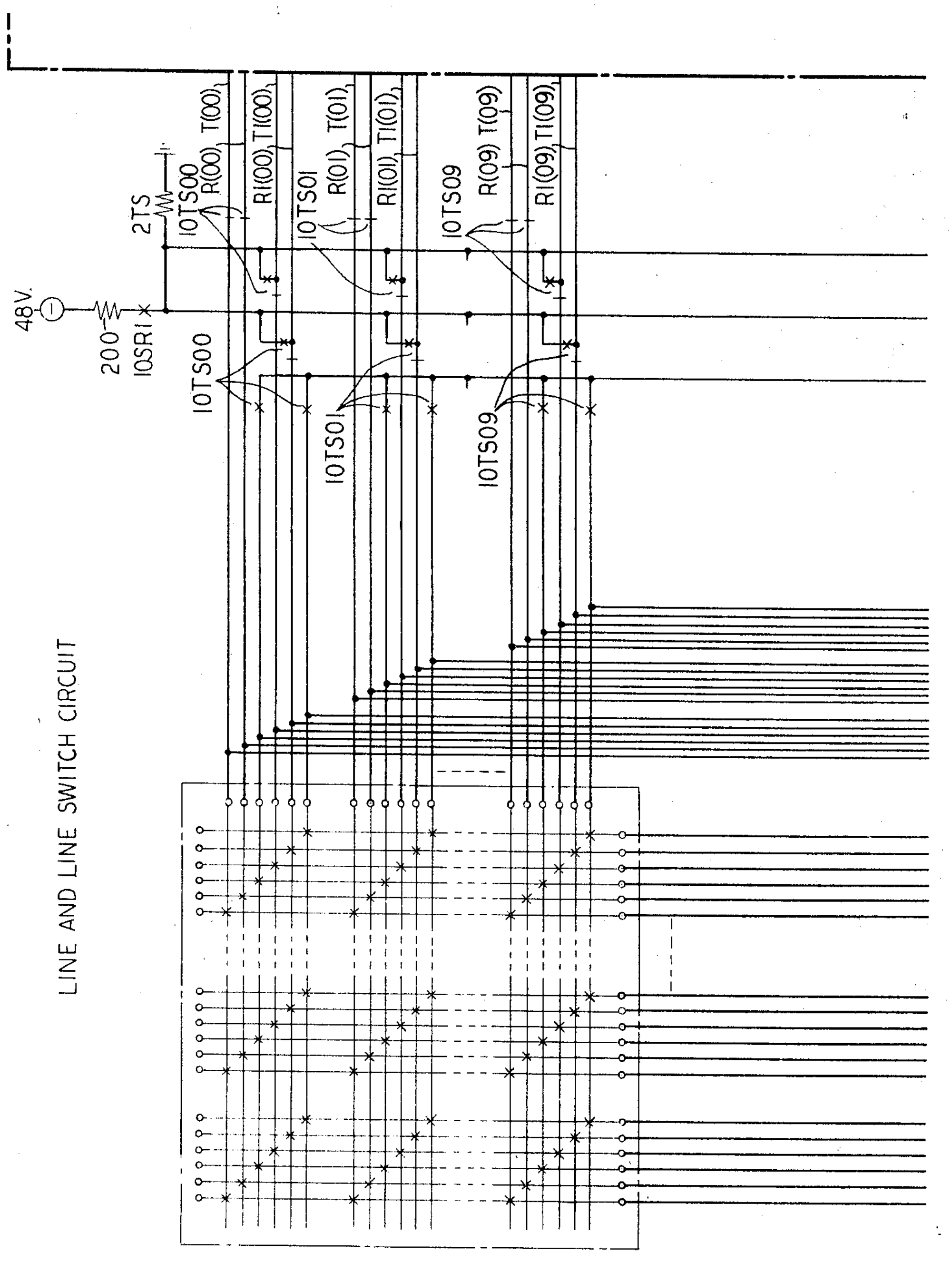
FIGS. 2–17 show the remote unit portion of the concentrator equipment.

As shown in FIGS. 2 and 3 the lines to be concentrated are coupled to the verticals of the crossbar switch whereas the trunks are connected to the switch horizontals. Thus, for switches A and B of FIGS. 2 and 3, 20 lines, 0–19, are coupled to the verticals and 20 trunks including conductors T(00), T1(00) and R(00), R1(00) through T(19), R(19) and T1(19), R1(19) and are coupled to the horizontals. Twenty additional lines, 5L20–5L39, are coupled to switches C and D in a similar manner.

3.12 Control unit

A substantially similar analysis may be made with respect to the switches shown in FIGS. 18 and 19. Here again, 40 line terminations are coupled to the verticals of four switches, A–D. A trunk incoming to switch A of group 0 may be connected to the appropriate line by closing the crosspoint contacts at the switching level corresponding to the selected trunk. The switches at the control unit depart from those at the remote unit in that a full complement must be provided for the lines of remote unit 1 as well as remote unit 0. Thus, the switches for remote unit 0 are shown in detail in FIGS. 18–21 and the switches for remote unit 1 indicated in the drawing as group 1 are shown in outline form in FIG. 21 and are duplicates of the switches shown in FIGS. 18–21. The vertical magnets of the crossbar switches in the control unit are also magnectically latching and may be of the type disclosed in the above-referred-to publication.

3.2 Signaling

The signaling circuits at the remote and control units are equipped to complement each other and since the sending and receiving circuits for both units are similar, only one need be described. The sending and receiving circuits for the remote unit and control unit are shown in outline form in FIGS. 15, 16, 24 and 25 and in further detail in FIGS. 54–60. The sending circuit includes a modulator shown in FIG. 56, a send filter shown in FIG. 58 and a power amplifier shown in FIG. 57.

Figures 54, 54A, 55, 55A:
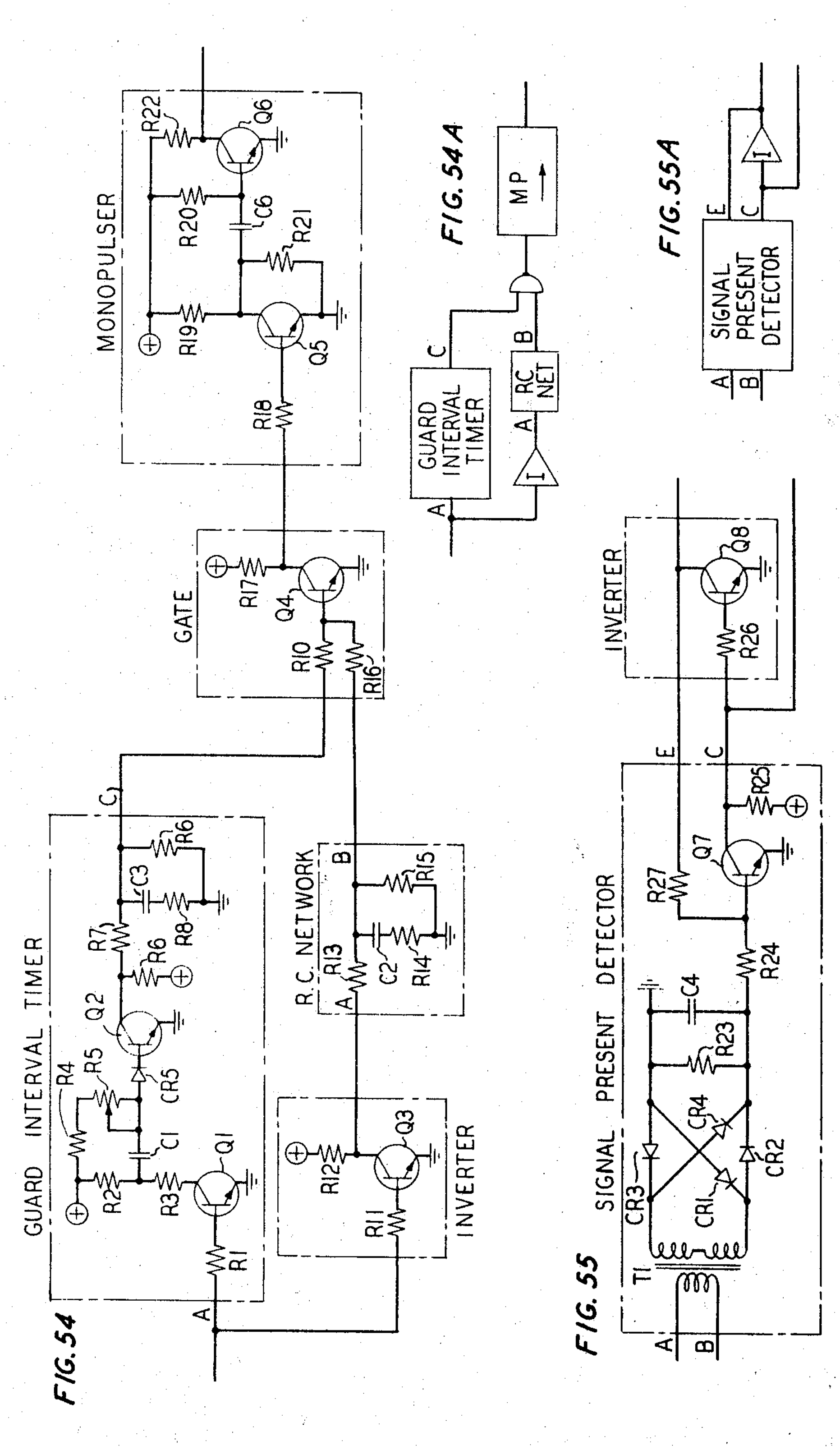
Figure 60A:
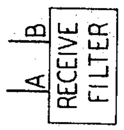
Figure 60:
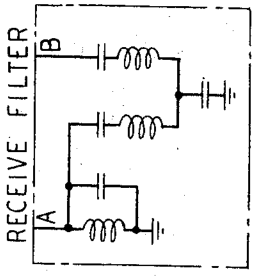
Figure 59:
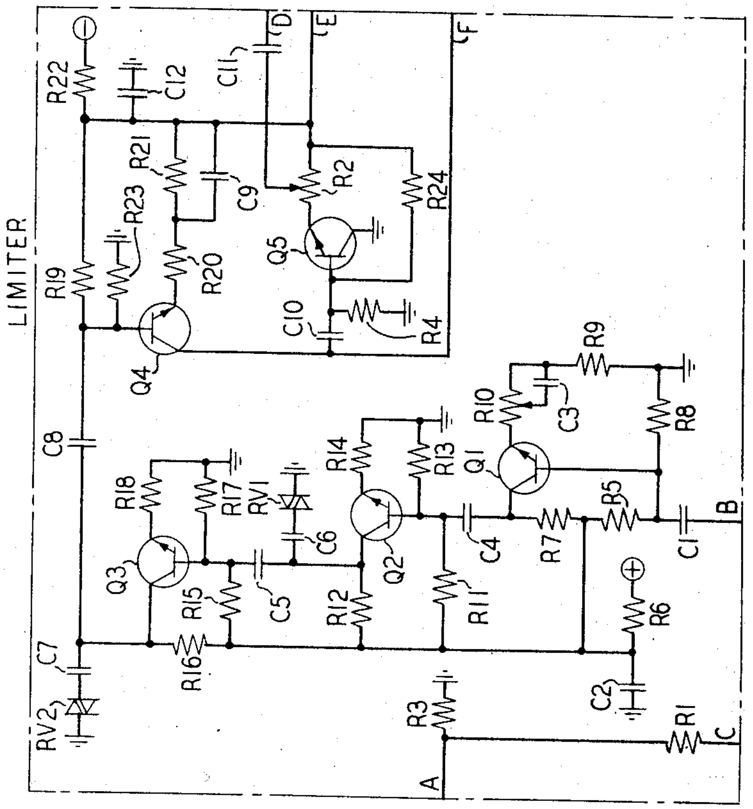

The receiving circuit includes a limiter shown in FIG. 59, a receiver filter of FIG. 60, a signal present detector of FIG. 55 and a guard interval timer of FIG. 54.

3.21 Send circuit, modulator

Figure 56A:
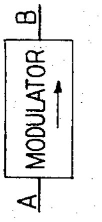
Figure 56:
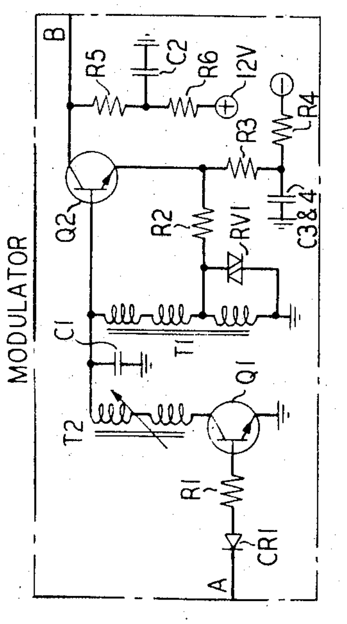

Referring first to the send circuit, the frequency of the modulator of FIG. 56 is controlled by a transistor switch Q1 which has a potential approaching ground applied to the base thereof or an off-normal potential of approximately +6 volts. The tank circuit including inductors T1 and T2 and capacitor C1 is arranged in order that the application of a ground potential to the base of the switch will produce an oscillation frequency of substantially 2025 c.p.s. representing the spacing frequency at the control unit (F2S).

When the input to the base conductor A is changed to +6 volts, the frequency of oscillation is modified to 2225 c.p.s. representing the mark frequency at the control unit (F2M).

Figure 58:
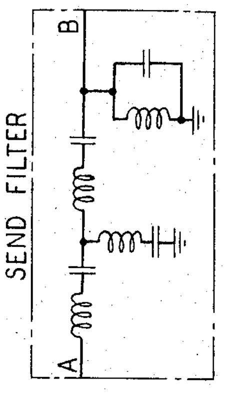
Figure 58A:
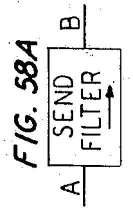
Figure 57A:
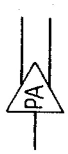

The output of the modulator is delivered in the case of the send circuit 0 to the send filter of FIG. 58.

3.22 Send circuit, filter and power amplifier

Figure 57:
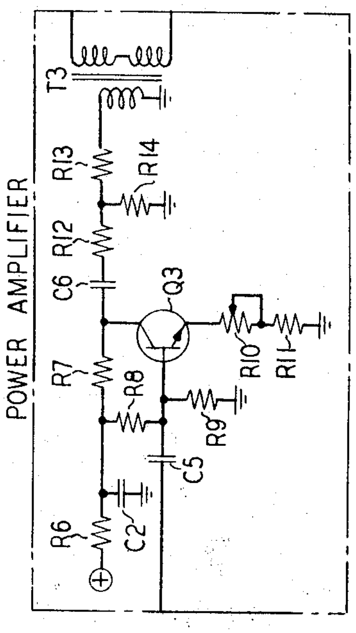
Figure 59A:
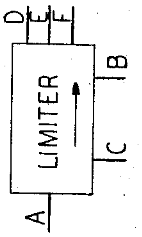

The latter filter is a bandpass filter substantially in the range of 2025 c.p.s.–2225 c.p.s. and prevents undesired signals from reaching the power amplifier stage. As seen in FIGS. 57 and 58, the output of the send filter is delivered to transistor Q3 of the power amplifier over capacitor C5. The output of the power amplifier is delivered over transformer T3 (transformer 24TA) to the control pair extending to the appropriate remote unit.

3.23 Receive circuit, filter and limiter

The receive circuit shown in FIG. 25 is adapted to receive signals from the control pair which are delivered through the input transformer to the receive filter of FIG. 60. The latter delivers the signals to the limiter of FIG. 59. The input to the limiter circuit is at terminal A of FIG. 59. The output from the limiter is derived at terminals D, E and F. There are five transistor amplifier stages and two limiter stages.

Transistor Q1 and its associated biasing resistors R5, R7, R8 and R9 comprise the first stage of amplification along with potentiometer R10 and capacitor C3. Capacitor C3 is an alternating current bypass path and is used with potentiometer R10 to control the gain of transistor Q1. Transistor Q2 with biasing resistors R11, R12, R13 and R14 comprise the second stage of amplification. Capacitor C6 and varistor RV1 are the first stage of limiting. The third stage of amplification consists of biasing resistors R15, R16, R17 and R18 with transistor Q3. Capacitor C7 and varistor RV2 provide the second and final stage of limiting.

Transistor Q4, biasing resistors R19, R20 and R23 and the alternating-current bypass network C9 and R21 make up the fourth stage of amplification. The collector load of transistor Q4 is a tuned circuit combination provided in the discriminator circuits of FIG. 53. The fifth transistor stage (Q5) with biasing resistors R4 and R24 and potentiometer R2 is an emitter follower-stage which feeds the signal present detector of FIG. 55.

3.24 Discriminator

Figures 53, 53A, 53B:
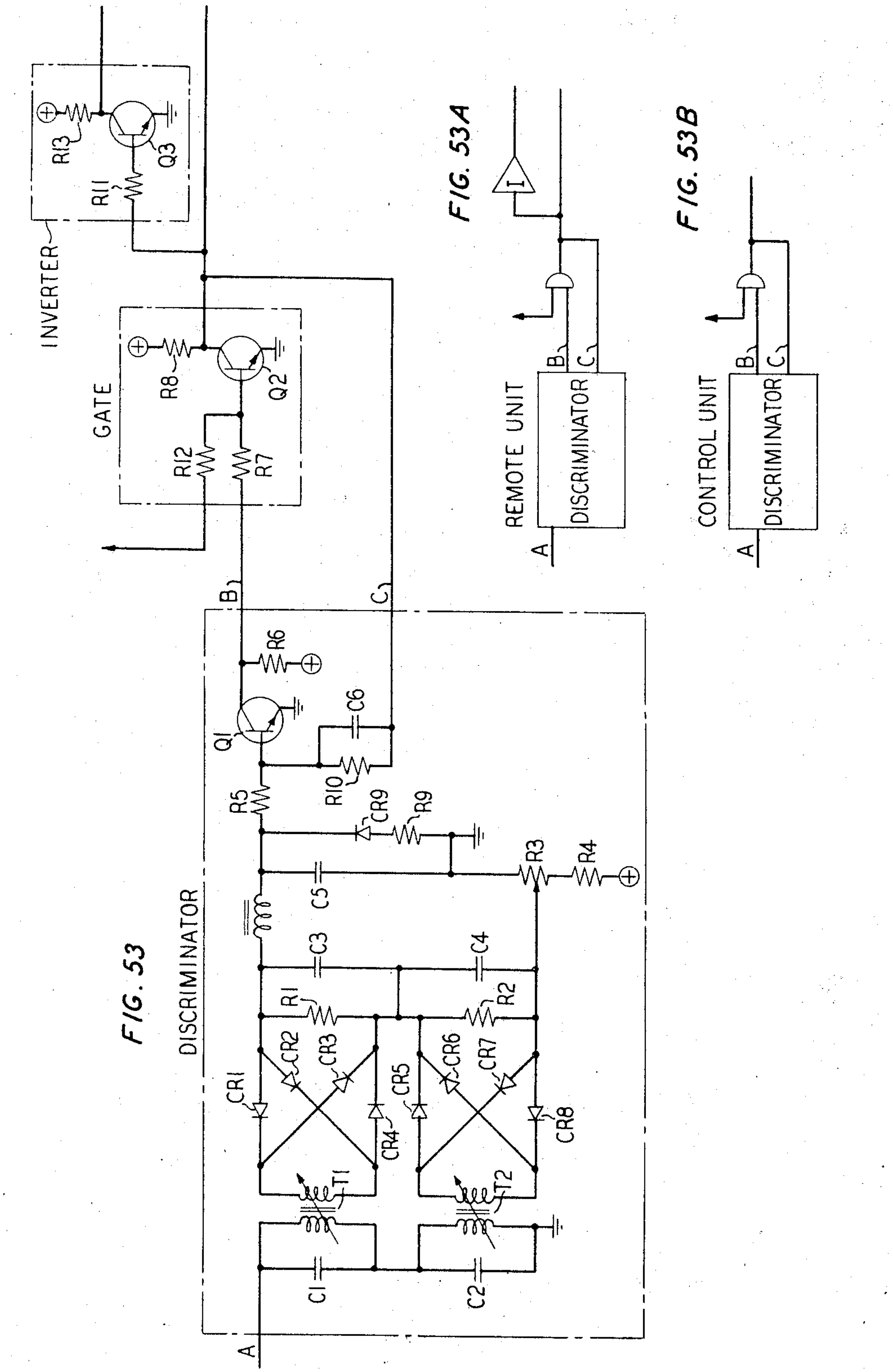

The discriminator of FIG. 53 includes two tuned tank circuits comprising capacitor C1 and transformer T1 for the 1020 c.p.s. frequency, and capacitor C2 and transformer T2 for the 1270 c.p.s. frequency. The two tank circuits in series represent the load for transistor Q4 of the limiter, described in section 3.23.

A diode bridge is across the output side of each transformer. Diodes CR1, CR2, CR3 and CR4 form a negatively polarized bridge for the tuned circuit T1 and C1. This tuned circuit recognizes the 1070 c.p.s. frequency and when it is present develops a negative potential across the load resistor R1.

Diodes CR5, CR6, CR7 and CR8 form a positively polarized bridge for the tuned circuit T2 and C2. This tuned circuit recognizes the 1270 c.p.s. frequency and develops a positive potential across the load resistor R2 when it is present. In each case the discriminating network is tuned such that the frequencies are sufficiently far apart to produce resonance for only one tuned circuit per frequency.

Normally, with 1070 c.p.s. (space frequency) present, the base of transistor Q1 is negative thus holding it in the nonconducting or "off" state. This puts +12 volts through resistors R6 and R7 to the base of transistor Q2 to hold it in the conducting or "on" state. With transistor Q2 "on," the output is "near-ground" potential at the collector of transistor Q2.

When the mark frequency is detected by the discriminator, a positive potential on the base of transistor Q1 turns it "on." Ground through transistor Q1, with "near-ground" potential from the signal present detector to the base of transistor Q2, will now turn transistor Q2 "off." This places +12 volts at the collector of transistor Q2. Thus, a mark input provides on "off-ground" potential output at terminal 1, while a space input provides a "near-ground" potential output.

The purpose of resistor R10 and capacitor C6 is to provide positive feedback to transistor Q1 to give sharp transistions at the collector of transistor Q2 as transistor Q2 switches on and off.

3.25 Signal present detector

Figure 61A:
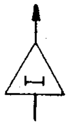
Figure 62A:
Figure 63A:
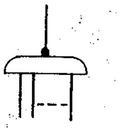
Figure 61:
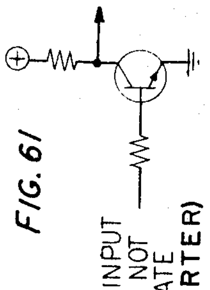

The signal present detector (FIG. 55) is responsive to the space frequency to present a "zero" condition to inverters 25STA1I and 25STA2I (the one input gate, as shown in FIGS. 61 and 61A, is referred to here and hereinafter as an "inverter"). The latter operates relay 25TAO as an indication that the presence of a signal was detected.

The input to the signal present detector comes from the fifth stage of the limiter (FIG. 59). The potentiometer associated with this fifth stage on the limiter controls the input level. This input is coupled through transformer T1 and rectified by the diode bridge of CR1, CR2, CR3 and CR4. Resistor R23 provides the load for the bridge and capacitor C4 provides a smoothing effect. The rectified signal is fed through resistor R24 to the base of transistor Q7.

With no input signal, transistor Q7 is in the "off" state. This presents +12 volts through resistors R25 and R26 to the base of transistor Q8, to turn transistor Q8 "on." The collector load of transistor Q8 normally consists of a reed relay (e.g., relay 25TAO) connected to +12 volts connected to the collector terminal. If the rectified signal at the base of transistor Q7 is sufficiently positive, transistor Q7 will turn "on" deenergizing transistor Q8 to turn it "off." This will remove the "near-ground" potential from the collector to release the relay. Thus, when a valid signal is present, relay 25TAO is released, whereas relay 25TAO is operated when the input to the detector is removed.

3.26 Guard interval timer

The guard interval times 25GITO is triggered by the change from a "zero" condition to a "one" condition, as shown in FIG. 54, and the output thereof changes from a "zero" condition to a "one" condition.

Transistors Q1 and Q2 comprise a monopulser type circuit with a timing interval of 4.06 milliseconds. There is no positive feedback from transistor Q2 to transistor Q1 thus requiring that the input pulse at the base terminal of transistor Q1 be equal to or greater than the timing interval of the monopulser. In this manner, the monopulser guards against a false trigger in response to noise.

In the normal condition "near-ground" potential is present at terminal A holding transistors Q1 and Q3 in the "off" state. With transistor Q1 "off," +12 volts through resistors R4 and R5 to the base of transistors Q2, hold transistor Q2 in the conducting or ON condition. This presents "near-ground" potential through resistors R7 and R10 to the base of transistor Q4. However, with transistor Q3 in the "off" state, +12 volts through resistors R12, R13 and R16 is also presented at the base of transistor Q4. Transistor Q4 is therefore an Or-Not gate and will be turned "on" if presented with an "off-ground" potential from either transistor Q2 or transistor Q3. Therefore, in the normal state, transistor Q4 is "on" and supplies "near-ground" potential to the base of transistor Q5 to hold transistor Q5 in the "off" state.

Transistors Q5 and Q6 comprise a monopulser type circuit with a timing interval of 20 microseconds. With transistor Q5 turned "off," +12 volts through resistor R20 holds transistor Q6 in the "on" state. This presents "near-ground" potential at the output terminal.

In the normal state, capacitor C1 of FIG. 54 holds a charge with +12 volts on one side and approximately +0.8 volt on the other side at the base of transistor Q2. If a legitimate signal of "off-ground" potential is now applied at terminal A, transistors Q1 and Q3 both change to the "on" state. When transistor Q1 starts conducting, the voltage on each side of capacitor C1 suddenly drops by approximately 12 volts. Thus, diode CR5 is back biased and removes the base current to transistor Q2 to turn transistor Q2 "off." When transistor Q2 is turned "off," +12 volts through resistors R6, R7 and R10 is present at the base of transistor Q4, and with transistor Q3 now in the "on" state, "near-ground" potential through resistors R13 and R16 is also presented to the base of transistor Q4. At this point, to prevent false circuit operation, transistor Q4 should not change its state. This requires that the "off-ground" potential from transistor Q2 turning "off" must be present before the "off-ground" potential from transistor Q3 turning "on" is removed. To ensure that this requirement is met, the delay network of capacitor C2 and resistors R14 and R15 is used to maintain an "off-ground" potential at the base of transistor Q4 until the "off-ground" potential from transistor Q2 is present. In this manner, transistor Q4 remains in the "on" state.

The potential on diode CR5 rises as capacitor C1 charges from +12 volts through resistors R4, R5, and transistor Q1 to ground. After a time interval of 4.06 milliseconds, the potential at diode CR5 is sufficiently positive to forward bias the diode and to turn transistor Q2 back to the "on" state. This replaces the "off-ground" potential provided to the base of transistor Q4 with a "near-ground"

potential. The Or-Not condition of transistor Q4 is now satisfied with "near-ground" potential supplied from both transistors Q2 and Q3, and transistor Q4 turns "off." This presents a high potential to the base of transistor Q5 to turn transistor Q5 "on." In the normal state, capacitor C6 was charged from approximately +0.8 volt at the base of transistor Q6 to +6.4 volts at the collector of transistor Q5. The 6.4 volts is determined by the voltage divider resistors R19 and R21. When transistor Q5 turns "on," its collector drops to a "near-ground" potential. Capacitor C6 couples this drop in voltage to the base of transistor Q6 to turn transistor Q6 "off." Capacitor C6 now charges from +12 volts through resistor R20, capacitor C6 and transistor Q5 to ground causing the base voltage of transistor Q6 to rise until it is sufficiently positive to turn transistor Q6 back "on." The time interval to return transistor Q6 to the "on" stage is nominally 20 microseconds. Thus, a legitimate input signal at terminal A results in a 20 microsecond positive output pulse which is delayed by 4.06 milliseconds.

A delay circuit in the guard interval timer including capacitor C3 and resistors R8 and R6 ensures that the inverter 25G1TI presents a "zero" condition to gate 25MTG prior to the time that the guard interval timer delivers a "one" condition to the same gate. At the conclusion of the predetermined interval (4.06 milliseconds), the guard interval timer converts back to a "zero" condition since transistor Q2 is again energized over resistors R4 and R5. At this time, gate 25MTG has a "zero" condition applied to both input leads and therefore delivers a "one" condition to monopulser 25MTMP. The latter in turn is arranged to provide a 20 microsecond pulse over conductor 25MTOC to the electronic logic circuitry. As explained above in general terms and hereinafter in detail, this pulse enables the remote unit to be synchronized with the control unit.

3.3 Synchronization

In order to synchronize the remote unit and control unit, a multivibrator is provided at each of the units and is shown in outline form for the control unit at FIG. 33 as oscillator 33K and for the remote unit at FIG. 17 as oscillator 17K. The multivibrator is shown in detail at FIG. 51.

Referring to the operation of the equipment at the control unit, the oscillator 33K delivers pulses at a 3200 p.p.s. rate to the binary cells 33P1BC, 33P2BC, 33P4BC and 33P8BC. The latter divides the 3200 p.p.s. rate by 16 to give the desired 200 p.p.s. rate with a pulse period of 5 milliseconds. The binary cells permit the selection of up to 16 pulses during each pulse period. In the present arrangement, of the 16 pulse positions available, only three are utilized.

3.31 Shift pulse

When the oscillator 33K is energized to deliver its 3200 p.p.s. output to the binary counter cells, the four-stage counter acts as a frequency divider to provide a 200 p.p.s. output. In consequence, every 5 milliseconds a pulse sequence is produced from gates 33PG1G, 33PG2G and 33PG3G. A shift pulse is provided whenever gate 33PG1G is energized. As seen from FIG. 33, this condition obtains when binary cell 33P1BC is in the "one" condition, binary cell 33P2BC is in the "zero" condition, binary cell 33P4BC is in the "one" condition and binary cell 33P8BC is in the "zero" condition. At this time, gate 33PG1G will be energized and deliver a pulse over conductor 33SPC, monopulser 29T5MP, gate 29RSG, inverter 29INV8I, and conductor 29RC to the reset inputs of the shift register to advance the information stored in the register.

3.32 "Write" pulse

Gate 33PG2G may similarly be shown to be energized when the binary cells 33P1BC–33P8BC are respectively in the condition 0110. When gate 33PG2G is enabled, a pulse is delivered over inverter 33INV5I, conductor 33KC, gate 29WGG, monopulser 29T3MP, conductor 29T3C to the input of the first shift register stage 32SA7FF to write a "one" in the first shift register stage.

3.33 Call progress pulse

Similarly, whenever gate 33PG3G is enabled by virtue of the binary number 1110 in the cells 33P1BC–33P8BC, respectively, a pulse is delivered over conductor 33CAC. This signal extends to monopulser 29T4MP, conductor 29T4C, and in turn to the input stage of the clock pulse counter 28CTR1FF–28CTR8FF of FIG. 28.

Thus, every 5 milliseconds a pulse sequence is produced from the gates 33PG1G–33PG3G as long as oscillator 33K is operated.

The operation of the corresponding gates 17PG1G–17PG3G in response to the remote unit oscillator 17K is similar to that described above for the control unit. In order to synchronize the distant units with each other, the guard interval timer 25GITO (see section 3.26 supra) is arranged to establish a predetermined state in the binary cells equivalent to the state which would have been achieved after 4.06 milliseconds. Thus, if the remote unit initiates transmission to the control unit, the guard interval timer at the control unit will respond to the start pulse and generate a 4.06 millisecond interval. During this interval, oscillator 33K is not yet energized but oscillator 17K is already operating and triggering the gates 17PG1G–17PG3G in the appropriate sequence. After the predetermined interval of 4.06 milliseconds, the guard interval timer 25GIT0 delivers an output through monopulser 25MTMP and conductor 25MTOC to set cells 33P1BC–33P8BC in accordance with digits 1011, respectively. During this interval, the corresponding binary counter 17P1FF–17P8FF has been set to the same condition by its local oscillator 17K. At this time, oscillator 33K is energized, as explained herein, and begins to cycle the counter at the prescribed rate. Since the binary cells 17P1FF–17P8FF at the remote unit and 33P1BC–33P8BC at the control unit are in the same condition when oscillator 33K is first energized, synchronism is established between the remote unit and the control unit.

3.4 Trunk selection

As explained above in general outline, 19 trunks remain connected through to the office when the concentrator control equipment is idle. As a result, after each service request call or terminating call, all (20) trunks will be connected through and it is essential to disconnect one of the trunks in order to process the next call.

The logic circuitry has been arranged to store the identification of a trunk which is disconnected on a disconnect call for use as the preselected trunk on the next service request or terminating call, thereby enabling the appropriate hold magnets to be operated when the line information is provided.

When battery is first applied to the control circuit and a trunk is not preselected, relay 30D and 35WTK will both attempt to operate. However, relay 30D will operate first and open the operate path of relay 35WTK. Relay 30D is operated over a path from negative battery, winding of relay 30D, contacts of relays 37TGB, 26TK19 through 26TK01, 32TTB, additional contacts of 32TTB, 41RL2 and 41RL1 to ground. Since relays 35PR1 and 35PR6 are normal, relay 35PR1 will operate through contacts of relay 26TK–. This path may be traced from ground through contacts of relays 42GAO, 26TK00 through 26TK19, 42GAO, 35PR6, 35PR1, winding of relay 35PR1, contacts of relay 35PR6, resistance 35PR1 to negative battery. At this time relay 26TK00 will be operated.

Under conditions wherein when battery is first applied to the control circuit and the disconnect relay 30D does not operate, relay 35WTK will operate and will shunt relay 35ZTK. Thus a path may be traced from ground through contacts of relays 30D, 35WTK, winding of relay 35WTK, resistance 35WTK, to negative battery. When relay 30D operates the shunt path across relay 35ZTK is removed and relay 35ZTK operates over the contacts of relay 35WTK. Since relays 35PR1 and 35PR6 are normal, relay 35PR1 will operate over a path including the contacts of relays 35PR6, 35PR1, 42GAO, 26TK00 through 26TK19, additional contacts of 42GAO, contacts of relay 35PR6, 35PR1, winding of relay 35PR1, additional contacts of 35PR6, resistance 35PR1, to negative battery. As shown in FIG. 26 relay 26TK01 will be operated over a path from negative battery, winding of relay 26TK01, contacts of 26TK01, 18TB01, conductor 01, 35ZTK, 35PR2, 35PR1, 35WTK, 35ZTK, 32TTB, 30DISB, 27TRK, 26TK19 through 26TK00 and thence to ground in FIG. 27 over conductor 270.

After each disconnect call the preference will be changed in accordance with the following table.

transistor to conduct and provide a ground potential at the collector electrode thereof.

Since these gates are turned on if one or more inputs are off ground or high, and since the output potential is substantially at ground, the gate circuits perform a logical OR function and they also invert. For this reason they have been denominated Or-Not Gates.

3.62 Flip-flop

Figure 49A:
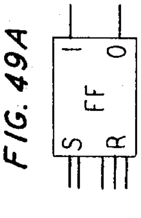
Figure 49:
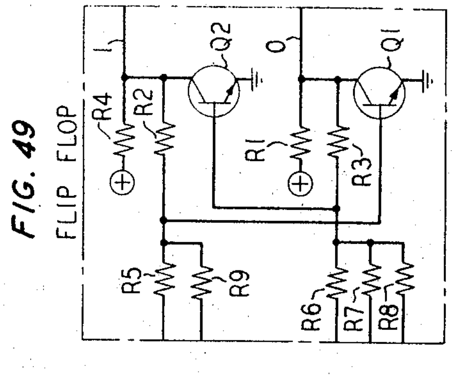

A typical flip-flop circuit is shown in FIG. 49 and includes transistors Q1 and Q2 connected in the conventional arrangement with feedback between the collector and base electrodes of the transistors. Outputs are obtained at the conductors labeled "1" and "0." It being understood that a "one" condition is represented by an "off-ground" potential and a "zero" condition by a ground

TABLE

| Call | 35PR-relay operated from previous call | Condition of relay 35WTK at start of call | Condition of relay 35ZTK after relay 30D operated | Preferred trunk | After trunk selection the following relays will— Operate | Release | Between calls the following relays will— Operate | Release |
|---|---|---|---|---|---|---|---|---|
| 1 | 1 | R [1] | R [2] | 00 | | | 35WTK | |
| 2 | 1 | O [2] | O | 01 | 35PR2 | | | 35WTK |
| 3 | 1,2 | R | R | 02 | | | 35WTK | |
| 4 | 1,2 | O | O | 03 | 35PR3 | | 35PR0 | 35WTK |
| 5 | 1,2,3 | R | R | 04 | | | 35WTK | |
| 6 | 1,2,3 | O | O | 05 | 35PR4 | | | 35WTK |
| 7 | 1,2,3,4 | R | R | 06 | | | 35WTK | |
| 8 | 1,2,3,4 | O | O | 07 | 35PR5 | | | 35WTK |
| 9 | 1,2,3,4,5 | R | R | 08 | | | 35WTK | |
| 10 | 1,2,3,4,5 | O | O | 09 | 35PR6 | 35PR0,1 | | 35WTK |
| 11 | 2,3,4,5,6 | R | R | 10 | | | 35WTK | |
| 12 | 2,3,4,5,6 | O | O | 11 | | 35PR2 | | 35WTK |
| 13 | 3,4,5,6 | R | R | 12 | | | 35WTK | |
| 14 | 3,4,5,6 | O | O | 13 | | 35PR3 | 35PR0 | 35WTK |
| 15 | 4,5,6 | R | R | 14 | | | 35WTK | |
| 16 | 4,5,6 | O | O | 15 | | 35PR4 | | 35WTK |
| 17 | 5,6 | R | R | 16 | | | 35WTK | |
| 18 | 5,6 | O | O | 17 | | 35PR5 | | 35WTK |
| 19 | 6 | R | R | 18 | | | 35WTK | |
| 20 | 6 | O | O | 19 | 35PR1 | 35PR0,6 | | 35WTK |
| 21 | 1 | R | R | 00 | | | 35WTK | |

[1] Released. [2] Operated.

3.5 Line identification

The line identification at the remote unit is determined by the line relay individual to the line at the remote unit, relay 3L– etc. in the case of remote unit 0, whereas the identification at the control unit is determined by the sleeve relay thereat, i.e., relay 20SL– etc. individual to the line.

In consequence, on a call originating at the remote unit (a service request call) a line identification is obtained in response to the operation of the line relay unique to the line. For example, for relay 3L00 the lockout chains in FIG. 7 indicate the operation of a specific tens relay 7LTO and a specific units relay 7LUO as explained in the above referred to application of J. F. Rettig et al.

3.6 Electronic logic circuitry

The electronic circuitry is adapted to provide temporary storage of line and trunk information for transmission between the signaling circuit, as described herein, and the electromechanical equipment. In addition, it controls the flow of information between the remote unit and the control unit and determines when all of the information has been transmitted.

3.61 Basic Or-Not gate

Referring to FIG. 61, an Or-Not gate is shown. As seen in FIG. 61, a positive "off-ground" input to the base electrode of the transistor will cause collector current to flow and will change the potential at the output conductor connected to the collector electrode from a potential approaching positive battery to a potential approaching ground.

Conversely, a ground potential applied to the base electrode would cause the transistor to be nonconducting.

Figure 62:
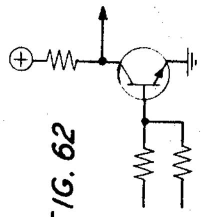
Figure 63:
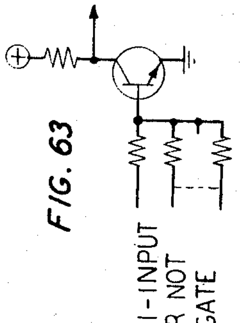

Reference to FIGS. 62 and 63 indicates that a positive potential applied to either of the two inputs of FIG. 62 or the plural inputs of FIG. 63 will cause the respective or "near-ground" potential. Application of an "off-ground" potential to the terminals connected to resistor R5 or R9 applies a positive voltage to the base electrode of transistor Q1 and turns that transistor on and transistor Q2 off. The condition in which transistor Q2 is nonconducting and transistor Q1 is conducting, represents the "set" state of the flip-flop. The "0" output conductor is "near-ground" and the "1" output conductor is "off-ground." The removal of the input pulse will have no effect since transistor Q1 remains conducting over load resistor R4 and coupling resistor R2.

If at this time an "off-ground" potential is applied to resistor R6, R7 or R8, transistor Q2 is driven into conduction and the collector potential drops to "near-ground" thereby lowering the base potential of transistor Q1 to "near-ground" and diverting current from the base electrode of transistor Q1. In the interim, additional base drive current is supplied to the base electrode of transistor Q2 over resistances R1 and R3. This supply will maintain transistor Q1 in the conducting condition after the input pulse is removed.

3.63 Shift register

Each stage of the shift register includes a flip-flop circuit and a monopulser which is used to transmit the information which is stored in a cell to the next succeeding cell. Information is stored in a shift register stage by providing a pulse input, for example to resistor R9 of FIG. 49, which as disclosed in section 3.62 above sets the flip-flop to a "one" condition. As will be seen herein, the insertion of the "one" condition may be in a serial manner from the preceding stage or by a parallel insertion through a gate associated with the flip-flop.

Figure 52A:
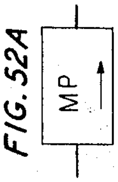
Figure 52:
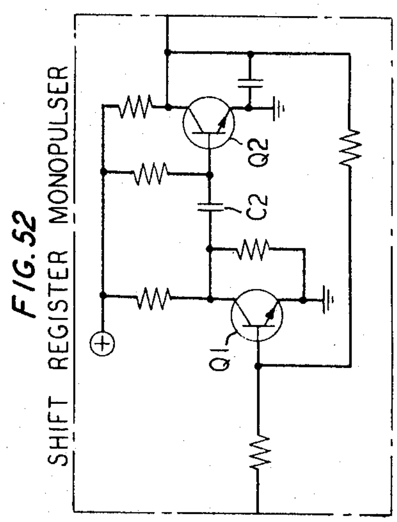
Figure 50A:
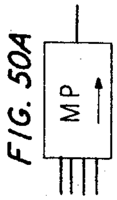

To reset a flip-flop in the shift register, an "off-ground" potential may be applied to resistors R6–R8 as described above. For shifting information between register stages, a shift register monopulser in accordance with FIG. 52 is utilized.

It will be assumed for purposes of illustration that a "one" condition is to be transferred from a shift register stage to a succeeding stage. Assuming that the flip-flop is already in the "set" or "one" condition, transistor Q1 will be in the ON condition and transistor Q2 of FIG. 49 will be in the OFF condition. The input to the monopulser of FIG. 52 which is taken from the "0" output of FIG. 52 will be "near-ground."

When a reset pulse is applied momentarily to resistors R6–R8, the flip-flop is reset in the manner described above. The collector potential of transistor Q1 rises to an "off ground" potential in FIG. 49 and turns on transistor Q1 of FIG. 52. This triggers the monopulser of FIG. 49 which proceeds to generate an output pulse at the collector electrode of transistor Q2. As capacitor C2 discharges, current is delivered to the base electrode of transistor Q2 and when sufficient current flows, transistor Q2 turns ON. Since the output of transistor Q2 is coupled to the input of the following shift register stage, the flip-flop in the following stage is set, representing a transfer of information between the first and second stages of the shift register.

3.64 Monopulser

Figure 50:
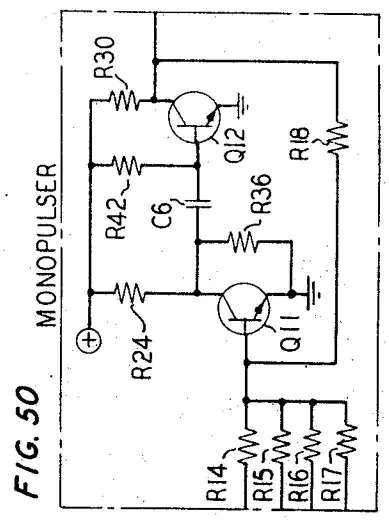

A monopulser circuit used in the solid state logic circuitry is disclosed in detail in FIG. 50. Although monopulsers of different duration are utilized, the overall format is the same. When a ground potential or no potential is applied to all of the inputs to transistor Q11 of FIG. 50, that transistor will be in the OFF or nonconducting condition. Transistor Q12 is energized from positive battery over resistor R42 and the potential at the output terminal connected to the collector electrode of transistor Q12 is substantially at ground. The potential across capacitor C6 at this time is substantially the difference in potential between the collector electrode of transistor Q11 and the base electrode of transistor Q12. Since transistor Q11 is in the OFF condition, the collector potential thereof is determined by a voltage divider action of resistors R24 and R36.

An "off-ground" or positive pulse input to any of the resistors R14–R17 causes transistor Q11 to conduct. As a result, a negative pulse is applied at the base of transistor Q12 to drive that transistor to the OFF condition whereupon the collector potential rises above ground. Since a feedback is provided between the collector electrode of transistor Q12 and the base electrode of transistor Q11 over resistance R18, the input pulse may be removed without affecting the monopulser operation. The output potential at the collector of transistor Q12 remains "off-ground" until transistor Q12 is again conducting. The duration of the OFF period is determined by resistance R42 and capacitor C6. Transistor Q12 is energized when the voltage at capacitor C6 rises above the potential of the base electrode of transistor Q12. When transistor Q12 is energized, the potential at the output terminal connected to the collector electrode thereof goes toward ground. Moreover, as the collector electrode moves toward ground, the base current to transistor Q11 through resistance R18 is reduced and as a result, transistor Q11 turns off. Thereupon, the collector potential of transistor Q11 begins to rise. However, the rise is controlled by an R–C network including resistors R24 and R36 and capacitor C6. This time duration constitutes the recycle time of the monopulser.

3.65 Oscillator

Figure 51:
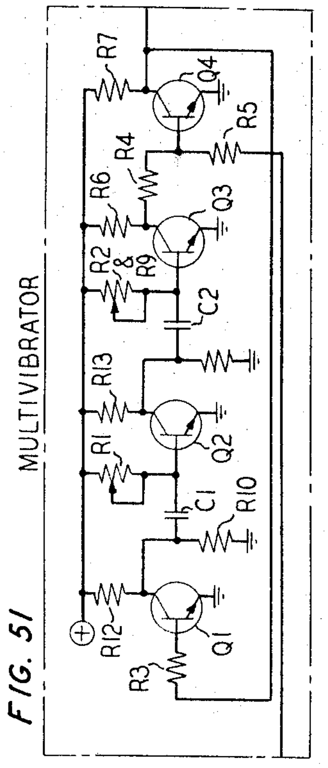
Figure 51A:
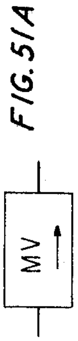

The oscillator shown in outline form in FIG. 17 (17K) and in FIG. 33 (33K) is shown in detail in FIG. 51. As indicated above, the purpose of the oscillator is to generate a frequency of 3200 p.p.s. which in conjunction with a four-stage binary counter provides a 200 p.p.s. clock rate.

Basically, the circuit includes a multivibrator which uses an amplifier and an inverter in the feedback path. Transistors Q1 and Q2 are the active elements of the multivibrator. Transistor Q4 is an output amplifier and transistor Q3 is an inverter for completing the feedback path. The input to this circuit is at resistance R5 and the output is connected to the collector of transistor Q4. A ground condition turns the circuit on and an "off-ground" condition turns the circuit off.

If resistance R5 has an "off-ground potential applied thereto, transistor Q1 is off and transistors Q2–Q4 are on.

When a ground potential is applied to the input, transistor Q4 turns off. When transistor Q4 turns off, a positive pulse at its collector electrode is delivered over resistance R3 to turn on transistor Q1. The latter experiences a negative pulse at the collector electrode which is supplied over capacitor C1 to turn off transistor Q2. Transistor Q2 remains off until capacitor C1 has discharged sufficiently to allow the voltage at the base of transistor Q2 to go positive.

Since transistor Q3 was initially in the ON condition, transistor Q2 in turning off has no effect on transistor Q3.

When transistor Q2 turns on after the discharge of capacitor C1, transistor Q3 is turned off and remains off throughout the discharge period of capacitor C2. This time for discharge is determined by capacitor C2 and resistors R2 and R9. When transistor Q3 turns off, transistor Q4 is turned on and the output at the collector electrode thereof is once more at "near-ground" potential. This potential is transferred over resistance R3 to turn off transistor Q1. Capacitor C1 is now prepared to time again when transistor Q1 is turned on. Transistor Q1 turns on when transistor Q3 turns on as controlled by capacitor C2. Under these conditions, a full cycle is completed and subsequent operations continue in the same manner as long as a "near-ground" condition is applied to the terminal coupled to resistor R5.

3.66 Binary cell

Figure 64:
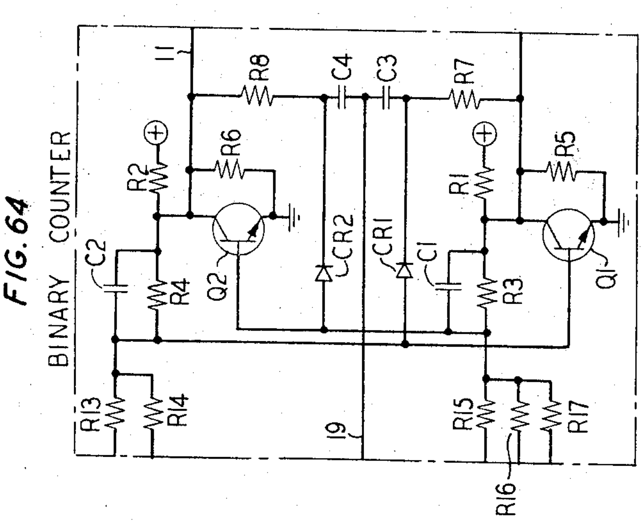
Figure 64A:
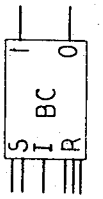

The binary counters of FIGS. 28 and 33 at the control unit and FIGS. 13 and 17 at the remote unit include as a basic element a binary cell shown in detail in FIG. 64. The cell is equipped with an output amplifier which is arranged to prevent undesirable "loading" of the cell in driving the succeeding stages.

The cell includes transistors Q1 and Q2 connected in feedback relationship. "Set" inputs are applied to resistors R13 and R14 and "reset" inputs to resistors R15–R17.

Essentially, the cell is a flip-flop circuit with the inclusion of a pulse steering network which provides a memory for steering the negative-going transient of the input pulse to the base of the "on" transistor of the flip-flop.

The steering network includes capacitors C3 and C4 and diodes CR1 and CR2. The input to the steering network is between capacitors C3 and C4.

Initially, it may be assumed that transistor Q1 is conducting and transistor Q2 is nonconducting. The application of a pulse to conductor 19 of FIG. 64 will result in a reversal of conduction in both transistors. The positive portion of the input pulse has no effect since diodes CR1 and CR2 will both oppose positive current flow to the bases of the respective transistors. During the negative-going portion of the input pulse (when the input level drops), this voltage change is reflected as a drop below ground potential through capacitors C3 and C4. Since transistor Q2 is not conducting, the negative pulse will have no effect thereon. However, transistor Q1 in receiving a negative pulse at the base electrode thereof will experience a current diversion from the base of transistor Q1 which therefore becomes nonconductive. The collector potential of transistor Q1 rises and current is steered through resistance R3 to the base of transistor Q2. Regenerative action causes transistor Q2 to turn on and transistor Q1 to turn off. Capacitors C3 and C4 are arranged with a sufficiently small capacitance to insure that the negative potential causing the state change is applied for a duration limited to that needed for switching.

In connecting these stages in cascade, the drive to a succeeding stage is taken directly from a collector of one of the transistors in the flip-flop and not from the amplifier. This output lead is shown as conductor 11 in FIG. 64 and corresponds to the "one" condition output of the binary cell. The amplifiers are utilized to supply outputs to all other circuits comprising the load on the binary cell.

4. *Detailed description of service request call*

4.1 Line relay and lockout relay operation

Appropriate reference may be made to the sequence charts in FIGS. 66–71 as an aid in following the subsequent detailed description.

The operation of the line relay (e.g., relay 3L00) unique to the customer's line results in the operation of a particular tens relay (7LTO) and a particular units relay (7LUO) which collectively uniquely identify the calling line. The over-all manner of operation is discussed in Section 3.5 supra.

Thereafter, relay 7LK operates to verify that one, and only one, tens relay and units relay were operated. This path may be traced from ground, winding of relay 7LK, normally closed contacts of relays 7LU9–7LU1, contacts of relay 7LU0, normally closed contacts of relays 7LT9–7LT1, contacts of relays 7LTO, 10PSD, 6IC, 6RL2, resistance 7L to negative battery.

The operation of relay 7LK results in the establishment of a locking path for relay 7LTO which may be traced over the contacts of relay 7LTO, contacts of relay 7LK to ground. Moreover, a locking path may be traced for relay 7LUO over the contacts of relay 7LUO, contacts of relay 7LK to ground.

The operation of relay 7LK applies a ground signal to gate 9SRGG to initiate the operation of the logic circuitry.

4.2 Transfer of information to shift register

The operation of relays 7LTO and 7LUO, as described, applies a ground potential to selected gates to the shift register. For example, the operation of relay 7LTO results in the application of a ground potential to gates 8SA4G and 8SA7G. This procedure represents the transmission of information from the electromechanical circuitry through the interface to the electronic logic circuitry. The operation of relay 7LK which applied a ground potential to gate 9SRGG results in the energization of that gate (if flip-flop 9INCFF is in the reset condition). The energization of gate 9SRGG results in the setting of flip-flop 9SRFF whereupon the "1" output of the flip-flop changes to a "one" condition as described in section 3.72 supra. This signal at the "1" output energizes inverter 9SRI and results in the operation of monopulser 9T2. This pulse is applied over conductor 9T2C to the four cells 17P–BC of the clock pulse generator causing them to be reset.

The inverted output of monopulser 9T2 is applied from inverter 9INI and conductor 9INC to all of the input gates to the shift register. Thus, at gates 8SA4G and 8SA7G, an output is produced which sets flip-flops 8SA4FF and 8SA7FF respectively. In a similar manner, flip-flops 12SB4FF and 12SB7FF are set in view of the application of ground potential from the contacts of relay 7LUO.

Thus, information representing the identification of the calling line 00 has been transferred into the shift register at the remote unit. It will be noted that flip-flop 12BSFF is also set at this time over conductor 9INC. The energization of flip-flop 12BSFF represents the insertion of preliminary or "start" pulse of the shift register which precedes the line identification transmission.

When flip-flop 9SRFF was set, a "zero" condition at the "0" output the thereof was transmitted over conductor 9SRC to gate 17CC2G to energize that gate as well as gates 17CC1G and oscillator 17K. This oscillator produces 3200 p.p.s. as described in section 3.75 and in section 3.3 supra. Moreover, gate 17CIGG is enabled from the output of gate 17CC1G and the oscillator 17K. The output of the oscillator is inverted by gate 17CIGG and coupled to the input of binary cell 17P1BC. As indicated in section 3.76, these cells change state when the inputs at terminal I change from a "one" to a "zero" condition. Since the gate 17CIGG inverts the output of oscillator 17K. Cell 17P1BC changes state when the oscillator changes from a "zero" condition to a "one" condition. Moreover, when oscillator 17K changes from a "zero" condition to a "one" condition, gates 17PG1G, 17PG2G and 17PG3G are disabled. When the oscillator changes from a "one" condition to a "zero" condition, the same gates are enabled permitting the binary cells 17P1BC–17P8BC to be monitored when they are in a stable condition.

The input to gate 17PG1G is such that conductor 9SPC will have a "one" condition thereon when cells 17P1BC an 17P4BC are set and when cells 17P2BC and 17P8BC are reset.

Similarly, gate 17PG2G provides a "1" output to inverter 17KI when cells 17P2BC and 17P4BC are set and cells 17P1BC and 17P8BC are reset.

Moreover, it may be seen that gate 17PG3G provides a "1" output to inverter 17CAI when cells 17P1BC, 17P2BC and 17P4BC are set and cell 17P8BC is reset.

It may be shown from the binary conditions assumed by the cells that these outputs represent respectively the fifth, sixth and seventh outputs of oscillator 17K. Since, as indicated above, the oscillator operates at a 3200 p.p.s. rate and the binary cells provide a frequency division to 200 p.p.s., the period is 5 milliseconds. During each 5 milliseconds, gates 17PG1G–17PG3G provide a pulse sequence in that order. The pulses in the sequence are substantially 156 microseconds and are separated by an interval of equal amount. The output from the gate 17PG1G causes a shift register advance; the output from gate 17PG2G gates information into the shift register; and the output from gate 17PG3G advances the binary counter 13CTR–BC.

4.3 Transmission of line identification to office

As explained above, the information representing calling line 00 has now been stored in the shift register and the clock circuit of FIG. 13 is operating. The first output from gate 17PG1G energizes monopulser 9T1 to produce a 10 microsecond "one" condition pulse. This causes gate 9RSG to produce a "0" output which is inverted by inverter 9RI and supplied over conductor 9RC to the reset input of all of the shift register stages.

Since flip-flops 12SB4FF, 12SB7FF, 8SA4FF, 8SA7FF and 12BSFF were all shown to have been storing a "one" condition, they are in consequence of the reset pulse shifted to the "zero" state while the remaining stages are unaffected. Each flip-flop which is reset, produces a transition from a "zero" condition to a "one" condition at the "0" output terminal. (See section 3.73 supra.) This causes the associated monopulsers 8A–MP, 12B–MP and 120–SMP to produce a "1" output for a period of 26 microseconds. (See section 3.74 supra.) This output from the monopulser is applied to the next succeeding flip-flop "set" input terminal. The flip-flop is not set at this time since the input still remains over conductor 9RC. However, since the latter is only 10 microseconds in duration and the monopulser output is 26 microseconds, eventually the input to the reset terminal of each flip-flop is removed and the monopulser output causes the appropriate flip-flops to be set.

Thus, after the termination of the reset input, flip-flops 8SA4FF, 8SA2FF, 12SB4FF and 12SB2FF are set as well as flip-flop 120SFF. The output of flip-flop 120SFF is applied over conductor 12Q4C to the modulator gate 16MG and is inverted by gate 16MII and presented to the sender circuit for remote unit 0. The application of the input to the modulator 16M1 results in the transmission of a signal through send filter 16FS1 as well as power amplifier 16PA1I, pad 16CP and transformer 16TA to the central office representing a start signal. For an explanation of the operation of the sender circuit, reference may be made to section 3.8 supra.

It will suffice at this time to indicate that the signal is transmitted over conductors 16TSOC to the receive circuit for remote unit 0 at the control unit.

This 5 millisecond mark frequency start pulse is interpreted in the control unit after passage through transformers 25TC and 25T, limiters 25L1 and 25L2 and signal present detectors 25SPD1 and 25SPD2.

4.4 Reception of line identification at office control unit

Since the mark frequency start pulse is a valid signal, the output of the signal present detector 25SPD1 (section 3.25 supra) does not change. In addition, the discriminator 25D1 detects the shift from the normal space frequency to the mark frequency and the output thereof changes from a "one" condition to a "zero" condition. This causes the output of gate 25ST1G to change from a "zero" condition to a "one" condition and the output of inverter 25STA3I to change from a "one" condition to a "zero" condition. When the "one" condition signal is applied to guard interval timer 25GITO through gate 25DMOG, the output changes from a "zero" condition to a "one" condition. As shown above, (section 3.26), the timer measures a 4.06 millisecond interval and the output thereof changes from a "one" condition to a "zero" condition. Gate 25MTG is energized and in turn energizes monopulser 25MTMP to generate a 4.5 microsecond signal which is delivered over conductor 25MTOC to set flip-flop 29SROFF. When the latter flip-flop is set, the output of gate 29TPG shifts from a "one" condition to a "zero" condition.

It will be noted that the setting of flip-flop 29SROFF indicates a service request call in remote unit 0. Had the call originated in remote unit 1, flip-flop 29SR1FF would have been set.

Gate 29SROGG enables inverter 29SROI which effects the operation of relay 29SRO. The latter in turn causes the operation of relay 47SR over an obvious path.

The operation of relay 47SR, as described above, completes an operating path for relay 47SRA and for relay 43RTR which may be traced from ground, contacts of relay 47SRA, contacts of relays 44T–, 44U–, 41RL2, winding of relay 43RTR to negative battery.

An operating path is closed for relay 45CTOO which may be traced from ground, contacts of relays 47SRA, 23HMK, 42GAO, 26TKOO, winding of relay 45CTOO to negative battery. Relay 42GAO operated in consequence of the operation of 42GO which in turn operated in consequence of the operation of relay 47SR over a path not shown specifically for group 1 but similar to that shown for relay 42G1. Operation of relay 42GO delivers a signal to the modulator circuit of FIG. 24 for transmission to remote unit 1 and causes the operation of relay 18TBOO.

The operation of relay 42GO completes a path for the operation of relay 27TTO which may be traced from negative battery, winding of relay 27TTO, contacts of relay 42GO, 26TK09 through 26TKOO, 42AT, 42GA1, 42GAO to ground.

As noted above, the operation of flip-flop 29SROFF delivers a signal from the "1" output thereof which prevents the control circuit from initiating an outgoing call.

The "1" output of gate 29SROGG causes the output of gate 29SRAG to enter the "zero" condition. A path may be traced over conductor 29SRC to gate 33CC2G which in turn energizes gate 33CC1G and starts oscillator 33K. Gate 33CIGG is also enabled but the output remains at "zero" condition since the output of oscillator 33K has changed to a "one." After 150 microseconds oscillator 33K shifts to a "zero" condition and causes the output of gate 33CIGG to enter the "one" condition. The output of gate 33CIGG is coupled to the input of the first binary cell 33P1BC. As described above, oscillator 33K drives the binary cells 33P1BC–33P8BC which in turn energize gates 33PG1G–33PG3G.

When flip-flop 29SROFF was set as described above by monopulser 25MTMP a pulse was also delivered to the counting circuit 33P1BC–33P8BC over conductor 25MTOC to set the counting circuit to the state corresponding to the elapsed time of timer 25GITO. Since as described above the latter does not produce an output until 4.06 milliseconds have elapsed, the counting circuit of FIG. 33 is set to a count of 13 ($^{13}/_{16} \times 5.00$). Thus, when oscillator 33K is energized, the counting circuit is already at a count of 13 and the remote and control circuits are synchronized (section 3.33 supra). Thereafter, the clock control gates 33PG1G–33PG3G will function in the manner described above to gate information from the demodulator into the shift register. Gate 25DMG will have a "zero" or a "one" condition, respectively, indicating a mark or space detected in the receiver circuit. When a zero is persent, a pulse is delivered over conductor 25DMC to monopulser 29T3MP through gate 29WGG. A further pulse may be traced over conductor 29T3C to the input to stage 32SA7FF. If instead a space was present in the receive circuit and the output of 25DMG was a one, the output of gate 29WGG would remain a zero whereupon flip-flop 32SA7FF would not be set. Subsequently, the counter 28CTR–BC is advanced as explained above and the gates 33PG1G–33PG3G continue to shift information, gate new information, and advance the counter until a count of 11 is reached. At this time gate 28CP11G is energized, in turn disabling gate 33CC2G. The latter in turn deenergizes oscillator 33K. Relay 28IR is also energized over inverter 28P11I and the contacts of relay 43RTR. The operation of relay 28IR is an indication that all of the line identification information has been received and is ready for transfer to the electromechanical section. Operation of relay 28IR causes the operation of relays 32SA7, 32SA4, 36SB7 and 36SB4, it being assumed that line 00 is initiating the call.

When relays 32SA7 etc. are operated, the associated relays 47A4, 47A7, 47B4 and 47B7 are operated over an obvious path. Relay 47ABK is operated to check the "two out of five" operation of the respective relays 47A– and 47B–.

It will be noted that the information registered at the control unit is identical to that which was stored in the shift register at the remote unit, where the advance is controlled by oscillator 17K. Thus, both shift registers are advanced with the shift register at the remote unit being cleared of line identification information and the corresponding shift register at the control unit being loaded with the same information.

4.5 Select and hold magnet operation

The operation of relay 27TTO described above completes an operating path for relay 27TRK from ground, contacts of relays 27TTO, 27TT1, winding of relay 27TRK to negative battery. Operation of the latter relay causes the select magnets associated with the preselected trunk (assumed to be 26TKOO) to be operated. Thus a path may be traced in FIG. 22 from ground, winding of relays 22SMAOO, and 22SMCOO, contacts of relay 37MBOO, 26TKOO, 42G1, 42DSA, 32TRL, 32RPT, 34SD, 34RSD, 32SRT, 27TRK, resistance 22SM to negative battery. After the select magnets have operated, relay 23OH is operated over a path from ground, winding of relay 23OH, contacts of relays 23RH, 22SMAOO, 22SMCOO, 18XPKA, 32TRL, 47SRA, 42LK, 44U9 through 44U1, 44UO, 44T3 through 44T1, 44TO, resistance 23HMR to negative battery. Previously, relays 44TO and 44UO were operated over the contacts of relays 47A7, 47A4, 47B7 and 47B4, respectively. In consequence, a path is available in FIG. 22 from negative battery, resistance 22OHR, contacts of relays 23OH, 42G1, 44TO, 44UO, hold magnet 22HMAOO, diode 22HMBD, resistance 22HMBR to ground.

Relay 19XPK operates over a path from ground, winding of relay 19XPK, contacts of relays 23HMK, 23OH, 42GAO, 26TKOO, 65PTKOO, conductor SBOO, sleeve crosspoints of switch A to negative battery at relay 20SLOO.

In the interim the select and hold magnets 6SMAOO, 6SMCOO, 6HMAOO and 6HMBOO have operated in a manner analogous to that described for the control unit and when the discriminator 25D2 detects a signal from the remote circuit indicating the completion of the call in the remote circuit, the discriminator output goes to zero. Relay 25RK is operated over a path from battery, winding of relay 25RK, gate 25INVIG, gate 25RKG, inverter 25STA4I, gate 25ST2G, and discriminator 25D2.

4.6 Release of control unit

The operation of relay 25RK causes the operation of relay 43RKA and the latter completes an operating path for relay 41RL1. Operation of the latter relay causes the release of relay 26TKOO. Relay 41RL2 is operated in consequence of the release of relay 26TKOO. Thereupon the select magnets are released as well as the hold magnet and relay 23OH. In the interim, at the remote unit a signal is received, in consequence of the operation of relay 41RL1 whereupon discriminator 15D2 and gate 15ST2G are energized as well as inverter 15RBY1 to operate relay 15RLS. The latter in turn causes the operation of relay 6RL1 over a path from ground, contacts of relay 15RLS, 6TM4, 6RL2, winding of relay 6RL1 to battery. Operation of relay 6RL1 causes the release of relays 10TU– and 10TT–. Moreover, inverter 13RLSI is energized to apply a reset pulse over conductor 13RLSC to clear all of the flip-flops in the shift register as well as the counter circuit. The release of relays 10TT– and 10TU– causes the release of the select magnets as well as relay 14TRK. Release of the remaining relays follows and after a "down check" is performed, relay 6RL1 is itself released at the contacts of relay 6RL2. Release of relay 6RL1 delivers a signal to the control unit indicating completion of the initial release sequence.

At the control unit the discriminator detects this signal and the input of gate 25ST1G becomes zero which causes the output of inverter 25STA3I to shift to the "one" condition. Gate 25RKG is deenergized in turn releasing relay 25RK as well as relay 43RKA. Relay 25RR is operated over gate 25ST1G, inverter 25STA3I, gates 25RRG and 25INV2G. Relay 43RRA is operated over an obvious path and causes the release of relay 41RL1. At this time inverter 28RLSI is energized to apply a release signal to reset counter 28CTR–BC as well as flip-flop 28CP11FF, 29SR1FF, 29SROFF, and gate 29RSG. The latter delivers a pulse over inverter 29INV8I and conductor 29RC to reset all of the shift register stages. Subsequently, relay 29SRO is released in consequence of the deenergization of flip-flop 29SROFF. In turn this causes the release of relays 47SR, 42GO and 42GAO. Thereafter relay 41RL2 is released and a signal is delivered to the remote unit as shown in FIG. 24 which causes the remote unit to release the remaining relays thereat including relay 15RLS. Moreover, the corresponding relays at the control unit are also released and both the remote unit and control unit are returned to the idle condition.

5. *Terminating call*

A terminating call is initiated when the conductors SA– and SB– of a particular line are closed in the central office to operate the associated sleeve relay as shown symbolically by the operation of switch 202. The switch 202 represents supervisory equipment in the office which is responsive to interconnect the appropriate conductors, SA– and SB– when the corresponding line is engaged in a service request or terminating call. Similar facilities (not shown) exist for the remaining lines. Operation of the sleeve relay (for example sleeve relay 20SLOO), completes an operating path for the associated relay 31LTO. This path may be traced from ground, contacts of relay 20SLOO, winding of relay 31LTO, contacts of relay 31LTO, contacts of relay 46ZL3, additional contacts of 46ZL3, resistance 31LL to negative battery. Operation of relay 31LTO completes a path for the operation of 31LUO which may be traced from negative battery, resistance 31LLR, contacts of relay 46ZL4, 31LUO through 31LU9, 46ZL2, 31LUO, winding of relay 31LUO, contacts of relay 20SLOO, diode 31SLOOD, contacts of relay 31LTO to ground.

Operation of relay 31LUO as well as relay 31LTO uniquely identify the line to which a terminating call is being extended. Relay 30TER is operated at this time over a path from negative battery, contacts of relay 47SRA, 30DS, additional contacts of relays 30DS, 46ZT, additional contacts of 46ZT, 30TER, winding of relay 30TER, contacts of relays 30D, 31LUO, 26TKO9 through 26TKOO, contacts of relays 32TTB, additional contacts of 32TTB, 41RL2 and 41RL1 to ground. Thereafter relay 42AT is operated over a path from negative battery, winding of relay 42AT, contacts of relays 30TER, 30DS to ground. Relay 42GO is operated at this time in a manner similar to that described above for a service request call and the operation of relay 42AT completes operating paths for relays 44T– and 44U– associated with relays 31LTO and 31LUO. Thus a path may be traced in FIG. 44 from ground, contacts of relays 31LUO and 42AT, and winding of 44UO to negative battery. A similar path may be traced for the operation of relay 44TO. Operation of relay 42GO results in the application of a signal to the modulator gate 24M2G, in turn causing the energization of inverter 24M3I and actuating modulator 24M2 to deliver a signal to the remote unit not being served.

Operation of relay 30TER and the auxiliary relay 42TERA controls the appropriate leads C4 and C7 to the shift register as shown in FIG. 40 in order to indicate a terminating class call.

5.1 Transmitting line information

Flip-flop 290TGFF is set at this time in view of the "one" condition at the output of gate 29TPG causing monopulser 29T1MP to deliver a signal to inverter 29INV7I. The latter delivers a signal over conductor 29INC to all of the gates 32A7G, 36B7G, etc, thence to the gates 32SA7G, 36SB7G, etc. to set the flip-flops, which have additional inputs in those last-mentioned gates. Prior thereto relays 31LTO and 31LUO have applied signals to conductors 36B4C and 36B7C in FIG. 40, and 32A4C and 32A7C in FIG. 39 which in turn are extended to the respective shift register gate inputs.

The zero signal from flip-flop 290TGFF is extended over gate 29M4G and conductors 29M4C and 29OTGOC to gate 33CC3G. This procedure energizes the oscillator in the manner described above for a service request call. The sequence of operations for transmission of the line information stored in the shift register is analogous to that described above for a service request call. When the preliminary pulse and the subsequent information including type of call and line number have been sent, the shift register will be cleared.

At the remote unit the reception of the initial signal in the receiver circuit of FIG. 15 causes the energization of flip-flop 9INCFF over conductor 15MTC via discriminator 15D1. Energization of flip-flop 9INCFF causes the operation of relay 9SIC and in turn the operation of relay 6IC. Flip-flop 9INCFF also delivers a signal over conductor 9INCOCO to gate 17CC3G to enable oscillator 17K over gates 17CC1G. Thereafter, the application of shift, and counter advance pulses to the shift register are the same as those described above for a service request call, although the information is now being loaded into the shift register rather than being transmitted from it as above. Since a terminating call is involved, the control unit had priorily stored a zero at the control unit shift register by the energization of conductors 36C7C and 36C4C in FIG. 40, over the contacts of relay 42TERA. The information is received by the remote unit and stored by relays 8SC4 and 8SC7, in turn causing the operation of relays 12C4 and 12C7.

Similarly the remaining information representing the line identification (assumed to be line 00) is stored in flip-flops 8SA7FF, 8SA4FF, 12SB7FF and 12SB4FF, in turn causing the operation of relays 8SA7, 8SA4, 12SB7 and 12SB4. Subsequently relays 12A4, 12A7, 12B4 and 12B7 are operated. At the remote unit relay 14TRK is operated in consequence of the operation of relay 10TER which in turn was energized in view of the operation of relay 12C7 and 12C4. Relay 14TRK checks the operation of relays 10TU– (e.g., 10TUO) and 10TT– (e.g., 10TTO). Thereafter relay 10TSOO associated with the preselected trunk will operate from ground, contacts of relays 14RK, 14TRK, 10TTO, 10TUO, winding of relay 10TSOO to negative battery.

Here again the select magnets of FIG. 6 are operated in consequence of the operation of relay 14TRK over a path from negative battery, resistance 6SM, contacts of relays 10D, 14TRK, 10TTO, 10UO, winding of relays 6SMAOO and 6SMCOO in parallel to ground. Moreover, the completion of reception of the line identification causes the operation of the appropriate relays 10TO and 10UO over the contacts of the respective relays 12A–, and 12B–. Thereupon hold magnets 6HMAOO and 6HMBOO are operated over the contacts of relays 10TO and 10UO. This procedure is similar to that described above for a service request call.

In the interim at the control unit the operation of the select and hold magnets is also predicated on the information representing the selected trunk and line identification, respectively. Thus the energization of relay 27TRK results in the actuation of select magnets 22SMAOO and 22SMCOO whereas the operation of relays 44TO and 44UO described above results in the actuation of hold magnets 22HMAOO and 22HMBOO. The release procedures and transmission of check signals between the remote and control units is similar to that described above for a service request call.

6. *Disconnect call*

As shown on FIG. 30, relay 30D is operated when relays 41RL1 and 42RL2 are released and a trunk relay 26TK– has not been preselected. Thus a path may be traced from negative battery, winding of relay 30D, contacts of relays 37TGB, 26TK19 through 26TKOO, 32TTB, additional contacts of relay 32TTB, 41RL2, 41RL1 to ground. Operation of relay 30D completes an operating path for relays 30DS as well as 30SCA through 30SCD in parallel. Relays 30DISA and 30DISB are operated over the contacts of relay 30D and 30DS. The operation of relays 30SCA through 30SCD in parallel opens the leads SA– to the central office and the operation of relay 30DISB completes a path to operate a particular relay 26TK–. Thus, if trunk TK01 is the next trunk to be selected, a path may be traced from negative battery in FIG. 26, winding of relay 26TK01, contacts of relays 26TK01 and 18TB01, conductor 01, contacts of relays, 35ZTK, 35PR2, 35PR1, 35WTK, 35ZTK, 32TTB, 30DISB, 27TRK, 26TK19 through 26TKOO to ground on conductor 270 in FIG. 27. Relay 42GO operates and closes the operating path for relay 42GAO.

Thereafter a path is available for operating relay 20SLOO which may be traced from ground in FIG. 19 through contacts of relays 47SRA, 42GO, 26TK01, conductor SA01, crosspoint contacts of switch A, to conductor 00 in FIG. 20 and winding of relay 20SLOO to negative battery. Relay 19XPK is operated at this time from ground, winding of relay 19XPK, contacts of relays 23RH, 23OH, 42GAO, 26TK01, conductor SB01, crosspoint contacts of switch A, conductor 00 in FIG. 20 to negative battery through the winding of relay 20SLOO. The operation of relay 20SLOO causes the operation of relays 31LTO and 31LUO in the manner similar to that described above for the terminating call. In response to the operation of relay 27TRK, information is stored in the shift register indicative of the trunk identification of the trunk to be disconnected. More specifically, as shown in FIG. 38, signals are delivered over the contacts of relays 26TK01 to conductors 36B0C and 36B1C to store information in the corresponding stages of the shift register. Thereafter the transmission of trunk identification information is similar to that described above for the transmission of line identification information service request calls and terminating calls. Moreover, the information at the remote unit is received in the shift register thereat in a manner analogous to that described for a terminating call. In this case flip-flop 9INCFF is energized followed by relays 9SIC and 6IC. The shift register stages 8SA–FF and 12SB–FF are respectively filled with the tens digit and units digit of the trunk number. Ultimately, relays 12AO and 12B1 are operated, in turn causing the operation of relays 10TTO and 10TU1. Thereupon relay 14TRK is operated to check for one relay 10TT– and one relay 10TU–.

When relay 14TRK is operated, relay 14PK1 is released by the contacts of relay 14TRK opening the operate path extending from negative battery, winding of 14XPK1, contacts of relay 14TRK, 14SI2, additional contacts of 14SI2 to ground. Moreover, relay 10TSO1 is operated from ground, contacts of relays 14RK, 14TRK, 10TTO, 10TU1, winding of relay 10TSO1 to negative battery. Moreover, a path is extended to operate relay 3LOO (assumed to be the line connected to trunk TKO1) from ground, winding of relay 3XPK, sleeve crosspoints, contacts of relays 10TSO1, 11OH, 11RH, resistance 3XPKR to negative battery. The operation of 3XPK interrupts the release of relay 14XPK1.

When relay 3LO0 is operated, the corresponding relays 7LTO and 7LUO are operated in the manner described above for a service request call. Thereupon, check relay 7LK is operated and ultimately relays 10T0 and 10U0 are operated providing a path for the operation of relay 11RH from ground, winding of relay 11RH, contacts of relays 11OH, 3XPK, 11HMF, 10D, 10T0–10T3, 10U0–10U9, resistance 11HM3 to negative battery. When relay 11RH is operated, a potential is applied from negative battery, in FIG. 6 resistance 6RH, contacts of relays 11RH 10T0, 10U0, winding of relays 6HMAO0, and 6HMBO0 in parallel, contacts of relays 110H to ground. It will be noted that the direction of current through the hold magnets is opposite to that described above for the operation of the same hold magnets and consequently results in the release of these magnetically latching hold magnets. Thereafter, relay 11HRK checks the release of the hold magnets and relay 14RK is operated over a path from ground, contacts of relays 3XPK, 11HRK, winding of relay 14RK to negative battery. Operation of the latter relay delivers a signal through modulator 16M2 which is transmitted to the control unit in a manner similar to that described above for a service request call.

The release mode of the remote unit is similar to that described above for a terminating call with the exception that relays 10TT0 and 10TU1 are not released and instead store the preselected trunk number for the next service request or terminating call.

A the control unit the operation of relay 20SLO0, as described above, causes the operation of relays 31LTO and 31LUO which in turn energizes relay 42LK. Thereupon relay 23RH is operated and causes a signal to be delivered in a path opposite to that utilized in operating the hold magnet in order to cause the release of hold magnets 22HMAO0 and 22HMBO0 in a manner similar to that described for the release of the hold magnet at the remote unit. Thereafter, relay 23HRK is operated to check the release of the hold magnet and in turn causes the operation of relay 41RL1 over a path from negative battery, winding of relay 41RL1, contacts of relays 41RL2, 43RKA, 32TRL, 27TRK, 30DISA, 23RH, 23OH and 19XPK to ground.

Operation of relay 41RL1 causes the release of relay 30D which in turn releases relay 30DS and 42AT. The pattern of release of the remaining relays is similar to that described above.

*7. Priority service request call*

As indicated above, it is ordinarily not possible in a telephone line concentrator to originate a call when all trunks are busy. However, in the present arrangement if the customer at substation 00 goes off hook and discovers that all trunks are busy (in view of failure to receive dial tone), he may operate a priority key 300 which in turn causes the actuation of a priority relay, for example relay 4L40, at the remote line concentrator over a separate signaling path 301 individual to the priority switch. Operation of relay 4L40 causes the energization of the line lockout circuit of FIG. 7 in a manner similar to that described for service request calls. In this case relays 4LT3 and 7LU0 are energized to identify the priority relay (or "theoretical" line relay) 4L40. Thereafter, the identification thus established is delivered to the shift register for outpulsing to the control unit in a manner identical to that described for a service request call.

At the control unit the line identification is received by the signal circuit and delivered to the shift register of FIGS. 32 and 36. When the last bit of line identification has been transmitted, the line identity is stored in the register circuit of FIG. 44.

At this time relays 43PK1 and 43PK2 are operated during the checking action of the register circuit since the tens digit of the line identity must be in the group 40–99. Operation of relay 43PK1 extends a path over cable 401 to FIG. 65 and translator 6501. Thus, in the case of "theoretical" line relay 4L40, contacts of relays 47A4, 47A0, 47B4, 47B7 and 43PK1 extend a path to translator 6501 where a conventional two-out-of-five to one-out-of-ten translation is performed as shown in detail only for priority preference relay 65PPT40.

Strapping field 6502 provides a retranslation which establishes the identity of the calling line from its theoretical line identity. Thus the operation of relay 65PPT40 completes a path which may be traced from ground, contacts of relay 65PPT40, terminal 40, terminal 00, relay 65PC00 to negative battery identifying line 00 as the physical line originating the call.

It is now apparent that the control unit at the central office has been supplied with the line identity of the physical calling substation 00 although the initial translation was of a priority relay identity i.e., "theoretical" line relay 4L40.

Since all trunks to the office are busy, it is necessary for one of the trunks to be disconnected in order to provide a priority path for calling line 00. Therefore, it is required that a particular trunk and the line connected thereto be selected and the connection freed (disestablished) to provide a trunk path for the calling line. Priority selecting circuit 6503 performs this function in conjunction with memory circuit 6506. The latter may be of any suitable class which records the connections between lines and trunks and may, for example, be similar to that shown in Patent 2,894,072 of July 7, 1959 of G. F. Abbott, Jr. et al. Thus, each of the verticals of a crossbar switch represented by hold magnets 65HM00 through 65HM19 may represent the trunks 0–19 extending from remote unit 0 to the concentrator (a separate priority calling circuit similar to that shown in FIG. 65 is required for remote unit 1). Moreover, select magnets 65SM00 through 65SM39 are individually representative of the physical lines individual to substation 00 through substation 39.

It will be seen that although only 40 physical lines are utilized that 60 theoretical line relays are employed. In this manner varying degrees of priority may be assigned to individual lines. Thus, a particular line may have a number of priority switches similar to switch 300, each of which represents a different degree of priority. In this manner it is possible to allocate to different theoretical line relays relative degrees of priority. For illustrative purposes, only, two degrees of priority are shown in FIG. 65 as represented by priority class relays 65PC1–0 through 65PC1–19 for priority class 1 and 65PC2–0 through 65PC2–19 for priority class 2. Assuming that trunk 00 is engaged in a connection to line 39, hold magnet 65HM00 and select magnet 65SM39 would be operated in memory circuit 6504 in a manner similar to that explained in the above identified Abbott, Jr. et al. patent. Moreover, by virtue of connections between the priority class relays 65PC1–0 etc. and the translator 6502, different priority class relays would be operated. For simplicity, these relays are shown as being operated symbolically by manual switches. Assuming that the call which exists on trunk 00 is a routine or nonpriority call, both relays 65PC1–0 and 65PC2–0 would be released. Thereupon, selector 6503 in scanning for an available trunk would effect the operation of relay 65PTK0 over a path including the contacts of priority class relays 65PC1–0 and 65PC2–0. This action effects a selection of the trunk to be released in order to establish a connection to the line requesting service. This procedure is implemented by contacts of relay 65PTK0 as shown in FIG. 20 which interrupt the sleeve path to trunk 00 (similar connections, not shown, are provided for relays 65PTK–) to simulate a disconnect condition thereon (after first sending a tone on the trunk to alert those presently connected to the impending disconnect operation). In consequence of the disconnect condition, which has been simulated, an operation is performed which is identical to that described above for a disconnect call. Ultimately line 39 is disconnected from trunk 00. Thereupon a terminating call is initiated to the line originally requesting priority service by placing a ground condition on the sleeve of the substation line circuit in the control unit to operate relay 20SL00 (individual to the calling priority line). This procedure is shown symbolically by operation of switch 201. At this time a path exists between the calling priority line and the control unit which is thereafter extended in a conventional manner to a dial pulse register at the office whereupon the call may be completed in response to the dialing of the called telephone directory number in a routine manner.

If trunk 00 had been engaged in a priority class call, at least one of the priority class relays would have been operated. For example, if a priority call had been initiated by the subscriber at substation 39, relay 65PC39 would have been operated in the manner explained above for relay 65PC00. Moreover, a priority class relay, for example 65PC1–0, would have been operated over a simple logic circuit, for example, over the contacts of relay 65PPT65 and 26TK00 (not shown). Under these conditions the selector circuit 6503 would select relay 65PTK0 only if a class 2 or higher priority call was being initiated by calling line 00. Selector switch 6504 would scan each of the trunks for the class of priority of the conversation taking place thereon. If a nonpriority call was in effect on any trunk as evidenced by the respective relay 65PC– being released for that trunk, a selection would be effected of the first trunk on which a nonpriority call was being made. If no trunks are available on which nonpriority calls are being made as indicated by a full sweep of selector 6504 without the operation of any relay 65PTK–, the priority class call of substation 00 could not be completed.

However, if the class of call is of a degree which warrants preempting class 1 priority calls, the customer at substation 00 may depress a further key 302 in order to operate a different theoretical line relay, for example 4L98, which in turn is cross-connected to a priority class 2 designation. (It is understood that the customer may proceed by initially depressing key 302). Under these conditions, selector switch 6505 would be activated in order to scan all of the trunks for any trunk which is being utilized for a class of call which is lower than priority class 2, i.e., those engaged in nonpriority calls or priority class 1 calls. Since in the assumed illustration, trunk 00 is engaged by line 39 on a priority class 1 call, selector 6505 will effect the operation of relay 65PTK0 over the contacts of relay 65PC2–0 in order to open the sleeve path of trunk 00 in the manner explained above. Thus, although trunk 00 is engaged in a priority class call, it will be displaced by a higher priority class call being initiated at substation 00. The subsequent extension of a terminating call to substation 00 after the disconnect call has been established is similar to that described above. Ultimately the substation is extended to a register at the central office whereupon the call may be completed in a routine manner.

It is to be understood that the above-identified arrangements are illustrative of the application of the principles of the invention. Numerous other arrangements may be devised by those skilled in the art without departing from the spirit and scope of the invention.

What is claimed is:

1. A telephone line concentrator system including a plurality of remote substation lines having substations connected thereto, a telephone central office, a plurality of speech trunks extending from said office, remote switching means for coupling said lines to said speech trunks under control of said office, a first group of bistable devices at said remote switching means, one of said devices being individual to each line and energizable responsive to the initiation of a normal service request condition on the line individual thereto, a second group of bistable devices at said remote switching means energizable responsive to the initiation of a priority service request condition, energizable selecting means at least one remote substation for initiating said priority service request condition, and means responsive jointly to an all-speech-trunks-busy condition and to the energization of said selecting means for energizing a particular bistable device in said second group preparatory to transmission of priority signals to said office.

2. A telephone line concentrator system in accordance with claim 1 including in addition operable indicating means coupled to said first and second groups of bistable devices for indicating the identity of a particular substation line in response to the energization of said first group of bistable devices and further responsive to the energization of said second group of bistable devices to indicate priority calls.

3. A telephone line concentrator system in accordance with claim 2 including in addition control trunks extending between said remote switching means and said office and transmitting means responsive to the operation of said indicating means for delivering, over said control trunks to said central office, signals corresponding to the identity of service requesting lines and to the priority order of said lines on priority calls.

4. A telephone concentrator system including a plurality of substation lines, a telephone central office, a plurality of trunks extending from said office, remote switching means for coupling said trunks to said lines under control of said office, a control channel coupling said remote switching means to said office, first and second groups of relays, means for coupling each of said lines to an individual relay in said first group, means for coupling selected ones of said lines to relays in said second group in accordance with the priority order of said lines, common translating means for identifying said lines in response to the operation of said relays in said first and second groups, and transmitting means for delivering identifying information to said office over said control channel.

5. A telephone line concentrator system including a plurality of remote substation lines, a telephone central office, a plurality of trunks extending from said office, remote switching means for coupling said lines to said trunks under control of said office, first and second groups of relays at said remote switching means, means for coupling said lines to said first group of relays in accordance with a code indicative of the directory numbers of said lines, additional means for coupling said lines to said second group of relays in accordance with a code indicative of different directory numbers for selected ones of said lines to represent the priority order of said lines, and common transmitting means for delivering information to said office in accordance with the energization of said relays in said groups.

6. A priority preempt telephone line concentrator including a telephone central office, a plurality of remote substation lines having substations connected thereto, a plurality of trunks extending from said office less in number than said lines, remote switching means for coupling said lines to said trunks under control of said office, first and second groups of energizable bistable devices at said remote switching means operable respectively to indicate calling line identification and calling line priority order, first means at said substations for operating said first group of bistable devices, second means at said substations for operating said second group of bistable devices, identification storage means at said remote switching means including third and fourth groups of energizable bistable devices, means responsive to the energization of a bistable device in said first group for energizing said devices in said third and fourth groups to uniquely indicate the identification of a calling line, and additional means responsive to the energization of a bistable device in said second group for energizing bistable devices in said third and fourth groups to uniquely indicate the priority order and line identification of a calling line.

7. A priority preempt telephone line concentrator in accordance with claim 6 including in addition electronic shift register means responsive to the energization of said third and fourth groups of bistable devices for storing line identification and priority order identification, and means effective thereafter for serially outpulsing the information stored in said shift register to said central office.

8. A telephone line concentrator system including a telephone central office, a plurality of remote substation lines having substations connected thereto, a lesser plurality of trunks extending from said office, remote switching means for coupling said lines to said trunks under control of said office, means at said substations for initiating priority calls, means at said substations for initiating normal calls, means at said remote switching means for identifying in accordance with a first coded signal a substation line initiating a normal call, and means at said remote switching means for identifying in accordance with a different coded signal the same substation line initiating a priority call.

9. A telephone line concentrator system including a telephone central office, a plurality of remote substation lines having substations connected thereto, a lesser plurality of trunks extending from said office, remote switching means for coupling said lines to said trunks under control of said office, a plurality of energizable bistable devices at said remote switching means responsive to the initiation of normal and priority calls at said remote substations, operable all-trunks-busy indicating means at said remote switching means, means at said remote switching means for energizing said bistable devices in accordance with a particular coded identification in response to the initiation of a normal call at one of said substation lines, and additional means for energizing said bistable devices in a plurality of different coded indications responsive to the operation of said all-trunks-busy indicating means and in accordance with a corresponding number of priority order indications by said calling lines, said coded indications being representative of the relative priority order of said calling lines.

10. A telephone line concentrator system in accordance with claim 9 including in addition means at said substations for energizing said bistable devices in response to initiation of a normal call and keying means at said substations for energizing, in response to the initiation of a priority call, said bistable devices in a plurality of coded identifications corresponding to the number of priority order indications available to said lines.

11. A telephone line concentrator system including a telephone central office, a plurality of remote substation lines having substations connected thereto, a plurality of speech trunks extending from said office, remote switching means for coupling said lines to said trunks under control of said office, means including means at said substations for initiating a normal call, additional means including means at said substations for initiating a priority call, means for detecting an inability to extend a normal call due to the absence of an available trunk and for giving an indication of such an all-trunks-busy condition, and means jointly controlled by said additional means and said detecting means for extending a priority call during said all-trunks-busy condition.

12. A telephone line concentrator system in accordance with claim 11 wherein control trunks are provided extending between said remote switching means and said office and wherein said additional means includes means effective when all said speech trunks are busy for energizing said control trunks to transmit priority calling indications to said central office.

13. A telephone line concentrator system including a telephone central office, a plurality of remote substations, a lesser plurality of trunks extending from said office, remote switching means, a plurality of substation lines comprising speech conductors individually coupling said substations to said remote switching means, said remote switching means being controllable for coupling said speech conductors individual to each substation to said trunks under control of said office, means for initiating normal calls over said speech conductors to said remote switching means, a plurality of control conductors individually coupling said substations to said remote switching means, means for initiating priority calls over said control conductors to said remote switching means during an all-trunks-busy condition, means at said remote switching means for identifying in accordance with a first coded identification a particular substation line initiating a normal call, and additional means at said remote switching means for identifying in accordance with a different coded identification said particular substation initiating a priority call.

14. A telephone line concentrator system in accordance with claim 13 including in addition common means at said remote switching means for transmitting said normal identification and said priority identification to said central office.

15. A telephone line concentrator system in accordance with claim 14 including in addition a first and a second group of energizable relays at said remote switching means, said first group of relays being responsive to initiation of a normal call to indicate a first coded designation of said particular substation line and said second group of relays being responsive to initation of a priority call to indicate a different coded designation of said particular substation line.

16. A telephone line concentrator system in accordance with claim 15 including in addition means at said office responsive to the energization of a relay in said second group of relays for registering a priority calling indication.

17. A telephone line concentrator system in accordance with claim 16 including in addition translating means at said office effective in response to the reception of signals indicative of a priority call to regenerate the physical line identification of the priority calling line.

18. A priority preempt telephone line concentrator system comprising a telephone central office, a plurality of remote substation lines, a lesser plurality of trunks extending from said office, remote switching means for coupling said lines to said trunks under control of said office, energizable control conductors for coupling said substation lines to said remote switching means, means at said remote switching means effective in response to an originating call at one of said substation lines for identifying said calling substation line, additional means at said remote switching means effective in response jointly to an all-trunks-busy condition and to the energization of a particular control conductor for deriving the priority order identification of said substation line coupled to said control conductor, common signaling means at said remote switching means for transmitting the calling line identification of said substation line and said priority order identification of said substation line to said central office, shift register means in said remote unit and in said office for storing signals representative of said identification and additional means for controlling said signaling means and said shift register means for transmitting said calling line identification and said priority order identification from said remote switching means to said office.

19. A priority preempt telephone line concentrator system in accordance with claim 18 wherein said control conductors for coupling a particular substation line to said remote switching means include a plurality of conductors individually representative of varying levels of priority order, and wherein said means for identifying priority calling substation lines includes means for deriving different priority order identifications for a particular substation line in accordance with the respective one of the plurality of control conductors energized.

No references cited.

WILLIAM C. COOPER, *Primary Examiner.*